United States Patent
Harada et al.

(10) Patent No.: US 12,054,571 B2
(45) Date of Patent: Aug. 6, 2024

(54) HOST-GROUP-CONTAINING POLYMERIZABLE MONOMER, POLYMER MATERIAL, METHOD FOR PRODUCING SAME, AND CLATHRATE COMPOUND AND METHOD FOR PRODUCING SAME

(71) Applicant: Osaka University, Suita (JP)

(72) Inventors: Akira Harada, Suita (JP); Hiroyasu Yamaguchi, Suita (JP); Yoshinori Takashima, Suita (JP); Suguru Nomimura, Suita (JP); Hikaru Aramoto, Suita (JP); Ryohei Ikura, Suita (JP); Yuichiro Kobayashi, Suita (JP); Yukie Nakamitsu, Suita (JP)

(73) Assignee: OSAKA UNIVERSITY, Suita (JP)

( * ) Notice: Subject to any disclaimer, the term of this patent is extended or adjusted under 35 U.S.C. 154(b) by 1377 days.

(21) Appl. No.: 16/490,090

(22) PCT Filed: Mar. 1, 2018

(86) PCT No.: PCT/JP2018/007906
§ 371 (c)(1),
(2) Date: Aug. 30, 2019

(87) PCT Pub. No.: WO2018/159791
PCT Pub. Date: Sep. 7, 2018

(65) Prior Publication Data
US 2023/0192931 A1    Jun. 22, 2023

(30) Foreign Application Priority Data
Mar. 2, 2017 (JP) .................. 2017-039908
Aug. 4, 2017 (JP) .................. 2017-152059

(51) Int. Cl.
C08F 251/00    (2006.01)
C08B 37/00     (2006.01)
C08B 37/16     (2006.01)

(52) U.S. Cl.
CPC ........ *C08F 251/00* (2013.01); *C08B 37/0012* (2013.01); *C08F 2800/10* (2013.01)

(58) Field of Classification Search
CPC .................. C08F 251/00; C08B 37/0012
See application file for complete search history.

(56) References Cited

U.S. PATENT DOCUMENTS 5,268,442 A   12/1993  Bradshaw et al.
5,608,015 A    3/1997  Yoshinaga
(Continued)

FOREIGN PATENT DOCUMENTS

CN    103483592 A      1/2014
FR      2806929 A1    10/2001
(Continued)

OTHER PUBLICATIONS

Madison et al., "Carbohydrate/Monomer Complexes in Aqueous Polymerizations: Methylated-β-cyclodextrin Mediated Aqueous Polymerization of Hydrophobic Methacrylic Monomers," Biomacromolecules, 2000, 1, 615-621. (Year: 2000).*
(Continued)

*Primary Examiner* — Catherine S Branch
(74) *Attorney, Agent, or Firm* — Locke Lord LLP; James E. Armstrong, IV; Nicholas J. DiCeglie, Jr.

(57) ABSTRACT

Provided are a host-group-containing polymerizable monomer usable as a starting material for producing a macromolecular material with a high degree of freedom in material design, and excellent toughness and strength; a macromolecular material produced using the host-group-containing polymerizable monomer; and a method for producing the
(Continued)

macromolecular material. The host-group-containing polymerizable monomer according to the present invention is a host-group-containing polymerizable monomer, and the host group is a monovalent group formed by removing one hydrogen atom or hydroxy group from a cyclodextrin derivative. The cyclodextrin derivative has such a structure that the hydrogen atom of at least one hydroxy group of a cyclodextrin is replaced with a group selected from the group consisting of a hydrocarbon group, an acyl group, and —CONHR wherein R represents a methyl group or an ethyl group.

20 Claims, 22 Drawing Sheets

(56) References Cited

U.S. PATENT DOCUMENTS

| | | | |
|---|---|---|---|
| 5,693,768 | A | 12/1997 | Bachmann et al. |
| 5,910,551 | A | 6/1999 | Bowen |
| 6,042,723 | A | 3/2000 | Duval et al. |
| 6,509,323 | B1 | 1/2003 | Davis et al. |
| 6,527,887 | B1 | 3/2003 | Ruebner et al. |
| 6,670,286 | B1 | 12/2003 | Yang et al. |
| 8,222,400 | B2 | 7/2012 | Hattori |
| 9,308,519 | B2 | 4/2016 | Adachi et al. |
| 2006/0029707 | A1 | 2/2006 | Plank et al. |
| 2007/0142324 | A1 | 6/2007 | Perly et al. |
| 2007/0213489 | A1 | 9/2007 | Patil et al. |
| 2009/0188622 | A1 | 7/2009 | Bowen |
| 2009/0213462 | A1 | 8/2009 | Wakizaka et al. |
| 2009/0214871 | A1 | 8/2009 | Fukuda et al. |
| 2010/0209347 | A1 | 8/2010 | Hattori |
| 2013/0172479 | A1 | 7/2013 | Harada et al. |
| 2015/0314266 | A1 | 11/2015 | Adachi et al. |
| 2016/0272768 | A1 | 9/2016 | Harada et al. |
| 2017/0335044 | A1 | 11/2017 | Hayashi |
| 2018/0133986 | A1 | 5/2018 | Harada et al. |

FOREIGN PATENT DOCUMENTS

| | | | |
|---|---|---|---|
| JP | H04-25503 | A | 1/1992 |
| JP | H04-25504 | A | 1/1992 |
| JP | H06-9709 | A | 1/1994 |
| JP | H07-278204 | A | 10/1995 |
| JP | H08-269105 | A | 10/1996 |
| JP | H11-094796 | A | 4/1999 |
| JP | H11-140104 | A | 5/1999 |
| JP | 2003-064103 | A | 3/2003 |
| JP | 2007-509218 | A | 4/2007 |
| JP | 2007-302727 | A | 11/2007 |
| JP | 2008-115282 | A | 5/2008 |
| JP | 2009-035580 | A | 2/2009 |
| JP | 2009-120759 | A | 6/2009 |
| JP | 2009-204725 | A | 9/2009 |
| JP | 2009-204726 | A | 9/2009 |
| JP | 2010-260951 | A | 11/2010 |
| JP | 2011-006695 | A | 1/2011 |
| JP | 2012-020940 | A | 2/2012 |
| JP | 2012-144591 | A | 8/2012 |
| JP | 2012-247267 | A | 12/2012 |
| JP | 2013-136028 | A | 7/2013 |
| JP | 2014-178670 | A | 9/2014 |
| JP | 2016-053152 | A | 4/2016 |
| JP | 2016-069652 | A | 5/2016 |
| JP | 2017-002098 | A | 1/2017 |
| JP | 2017-057269 | A | 3/2017 |
| WO | 92/09637 | A1 | 6/1992 |
| WO | 2007/129747 | A1 | 11/2007 |
| WO | 2009/041666 | A1 | 4/2009 |
| WO | 2012/036069 | A1 | 3/2012 |
| WO | 2014/087838 | A1 | 6/2014 |
| WO | 2015/030079 | A1 | 3/2015 |
| WO | 2016/072356 | A1 | 5/2016 |
| WO | 2016/097211 | A1 | 6/2016 |
| WO | 2016/163550 | A1 | 10/2016 |

OTHER PUBLICATIONS

Office Action dated May 24, 2022, issued for the corresponding Japanese Patent Application No. 2021-121040 and English translation thereof.

Rafael L Bowen et al., "Synthesis of Polymerizable Cyclodextrin Derivatives for Use in Adhesion-Promoting Monomer Formulations", Journal of Research of the National Institute of Standards and Technology, vol. 114, No. 1, Jan.-Feb. 2009, pp. 1-9. (cited in the Feb. 14, 2020 Search Report issued for EP18761556.2).

The extended European Search Report dated Feb. 14, 2020, for the corresponding EP patent application No. 18761556.2.

M. Nakahata et al., "Self-Healing based on Supramolecular Structures," Journal of the Imaging Society of Japan, vol. 54, No. 3, 2015, pp. 213-220 (w/ English abstract).

Internationatl Search Report dated May 1, 2018, issued for PCT/JP2018/007906.

Office Action for corresponding JP Patent Application No. 2019-503133 and English translation thereof.

Office Action dated Jun. 20, 2023, issued for the corresponding JP patent application No. 2021-121040 and English translation thereof.

Office Action dated Nov. 22, 2022, issued for the corresponding Japanese patent application No. 2021-121040 and English translation thereof.

Joachim Storsberg et al., "Cyclodextrins in polymer synthesis: free radical polymerization of cycloclextrin host-guest complexes of methyl methacrylate or styrene from homogenous aqueous solution,"Macromol. Rapid Commun., 2000, vol. 21, No. 5, pp. 236-241. (cited in the Jun. 8, 2020 Office Action issued for JP2019-503133).

A. Du Chesne et al., "Polydimethylsiloxane-cyclodextrin networks synthesized into a porous polystyrene gel—an Investigation by energy filtering transmission electron microscopy," Acta Polymer., vol. 48, 1997m pp. 142-148. (cited In the Jun. 8, 2020 Office Action issued for JP2019-503133).

Office Action dated Jun. 9, 2020, issued for JP Application No. 2019-503133 and English translation thereof.

* cited by examiner (a)

(b)

(9-1)

(9-2)

(8)

(1 1)

HOST-GROUP-CONTAINING POLYMERIZABLE MONOMER, POLYMER MATERIAL, METHOD FOR PRODUCING SAME, AND CLATHRATE COMPOUND AND METHOD FOR PRODUCING SAME

TECHNICAL FIELD

The present invention relates to a host-group-containing polymerizable monomer, a macromolecular material, a method for producing the macromolecular material, a clathrate compound, and a method for producing the clathrate compound.

BACKGROUND ART

In recent years, development of supramolecular materials provided with various functionalities has actively taken place by taking advantage of non-covalent interactions typified by host-guest interaction. For example, Patent Literature 1 discloses a self-restoring material that utilizes the reversibility of host-guest interaction. Even if the entirety of such a self-restoring material is cut, the material can be recovered to a state that is near its original strength by allowing the cut surfaces to come back into contact with each other. Thus, such a self-restoring material holds great promise as a new functional macromolecular material.

CITATION LIST

Patent Literature

PTL 1: WO2015/030079

SUMMARY OF INVENTION

Technical Problem

A recent requirement is to impart various functionalities to macromolecular materials themselves. There is thus a great need to develop a macromolecular material with, for example, further improved mechanical properties such as toughness and strength.

In this respect, for example, in conventional macromolecular materials utilizing host-guest interaction, there is a limitation on changing the composition of the polymer contained in such a macromolecular material; therefore, significantly improving its mechanical properties is considered to be a difficult technique. This is because conventional macromolecular materials utilizing host-guest interaction, which contain as a main component a polymer of a relatively highly water-soluble monomer, have a low degree of freedom in material design to improve mechanical properties. If a macromolecular material utilizing host-guest interaction can contain as a component, for example, a hydrophobic compound that cannot be conventionally used, it develops mechanical properties that conventional macromolecular materials do not have. There is thus a demand for the development of such a new material.

The present invention has been accomplished in view of the above. An object of the present invention is to provide a host-group-containing polymerizable monomer usable as a starting material for producing a macromolecular material with a high degree of freedom in material design, and excellent toughness and strength; a macromolecular material produced using the host-group-containing polymerizable monomer; and a method for producing the macromolecular material. Another object of the present invention is to provide a clathrate compound comprising the host-group-containing polymerizable monomer, and a method for producing the clathrate compound.

Solution to Problem

The present inventors conducted extensive research to achieve the above objects, and found that the above objects can be achieved by introducing a host group having a specific structure into a polymerizable monomer. The present invention has been accomplished based on this finding.

Specifically, the present invention includes, for example, the subject matter described in the following items.

Item 1.

A host-group-containing polymerizable monomer, the host group being a monovalent group formed by removing one hydrogen atom or hydroxy group from a cyclodextrin derivative, the cyclodextrin derivative having such a structure that a hydrogen atom of at least one hydroxy group of a cyclodextrin is replaced with a group selected from the group consisting of a hydrocarbon group, an acyl group, and —CONHR wherein R represents a methyl group or an ethyl group.

Item 2

The host-group-containing polymerizable monomer according to Item 1, wherein the acyl group is an acetyl group.

Item 3

The host-group-containing polymerizable monomer according to Item 1 or 2, wherein the hydrocarbon group has 1 to 4 carbon atoms.

Item 4

The host-group-containing polymerizable monomer according to any one of Items 1 to 3, which is represented by the following formula (h1):

wherein Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group.

Item 5

The host-group-containing polymerizable monomer according to any one of Items 1 to 3, which is represented by the following formula (h2):

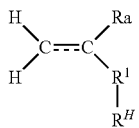

wherein Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group.

Item 6

The host-group-containing polymerizable monomer according to Item 1 or 2, which is represented by the following formula (h40):

wherein $R^{40}$ represents $NH_2$ or OH, and $R^H$ represents the host group.

Item 7

A macromolecular material comprising a polymer of a polymerizable monomer mixture containing the host-group-containing polymerizable monomer of any one of Items 1 to 6.

Item 8

The macromolecular material according to Item 7, wherein the polymerizable monomer mixture contains a polymerizable monomer of a size that can penetrate the host group of the host-group-containing polymerizable monomer.

Item 9

The macromolecular material according to Item 7, further comprising a polymer that has a guest group capable of having a host-guest interaction with the host group.

Item 10-1

A clathrate compound comprising the host-group-containing polymerizable monomer of any one of Items 1 to 6 and a guest-group-containing polymerizable monomer.

Item 10-2

The clathrate compound according to Item 10-1, wherein the host-group-containing polymerizable monomer is a host-group-containing vinyl monomer, and the guest-group-containing polymerizable monomer is a guest-group-containing vinyl monomer.

Item 10-3

The clathrate compound according to Item 10-1, wherein the host-group-containing polymerizable monomer is a host-group-containing non-vinyl monomer, the guest-group-containing polymerizable monomer is a guest-group-containing non-vinyl monomer, and the guest-group-containing non-vinyl monomer is a compound having a functional group that is particularly capable of undergoing a condensation reaction.

Item 11

A clathrate compound comprising the host-group-containing polymerizable monomer of Item 6 and a compound having a functional group capable of undergoing a condensation reaction.

Item 12

A macromolecular material comprising a polymer of a polymerizable monomer containing the clathrate compound of Item 10 or 11.

Item 13

A method for producing a macromolecular material, the method comprising performing polymerization of a polymerizable monomer mixture containing the host-group-containing polymerizable monomer of any one of Items 1 to 6 to obtain a polymer.

Item 14

The method for producing a macromolecular material according to Item 13, wherein the polymerization is performed in the absence of a solvent.

Item 15

A method for producing the clathrate compound of Item 10, the method comprising mixing the host-group-containing polymerizable monomer and the guest-group-containing polymerizable monomer to obtain the clathrate compound.

Advantageous Effects of Invention

The host-group-containing polymerizable monomer according to the present invention is usable as a starting material for producing a macromolecular material. The obtained macromolecular material is excellent particularly in toughness and strength. A structural unit that has been difficult to introduce in conventional macromolecular materials utilizing host-guest interaction can be introduced into a macromolecular material by using the host-group-containing polymerizable monomer according to the present invention. Thus, the use of the host-group-containing polymerizable monomer according to the present invention increases the degree of freedom in material design.

Since the macromolecular material according to the present invention comprises a polymer produced using the host-group-containing polymerizable monomer, the material is excellent in toughness and strength.

The method for producing a macromolecular material according to the present invention is suitable as a method for producing the macromolecular material described above, and enables the production of the macromolecular material in a simple process.

DESCRIPTION OF EMBODIMENTS

Figure 1:
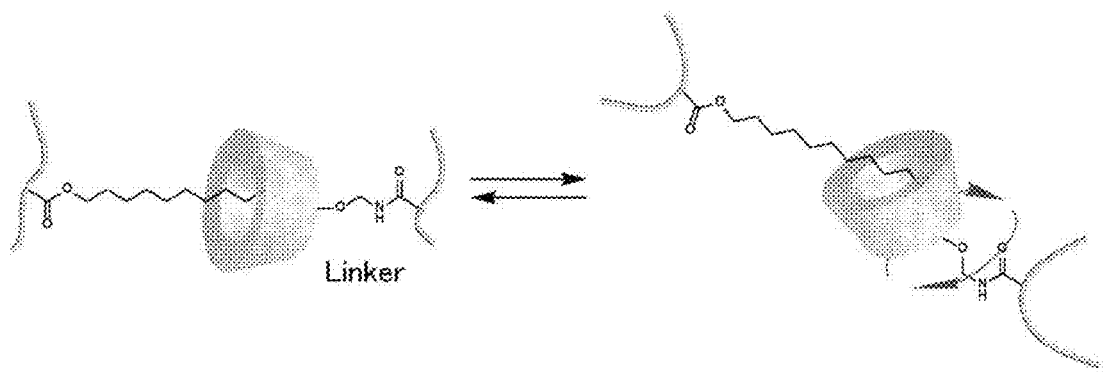
FIG. 1 schematically shows host-guest interaction.

The following describes embodiments of the present invention in detail. In the present specification, the terms "comprise," "contain," and "include" include the concepts of "comprise," "consist essentially of," and "consist of."

1. Polymerizable Monomer

The host group of the host-group-containing polymerizable monomer according to the present invention is a monovalent group formed by removing one hydrogen atom or hydroxy group from a cyclodextrin derivative. The cyclodextrin derivative has such a structure that the hydrogen atom of at least one hydroxy group of a cyclodextrin is replaced with a group selected from the group consisting of a hydrocarbon group, an acyl group, and —CONHR wherein R represents a methyl group or an ethyl group. In the cyclodextrin derivative, the hydrogen atom of at least one hydroxy group of a cyclodextrin may be replaced with only a hydrocarbon group or only an acyl group.

The host-group-containing polymerizable monomer according to the present invention can be a starting material for obtaining a polymer contained in a macromolecular material. Polymers prepared using the host-group-containing polymerizable monomer can have, for example, such a structure that molecules are crosslinked due to reversible host-guest interaction. Alternatively, polymers prepared using the host-group-containing polymerizable monomer can be, for example, a movable crosslinked polymer, described later. Examples of the movable crosslinked polymer include a polymer that has a structure formed such that the main chain of another polymer passes through the ring of the host group (a cyclic molecule that has a cyclodextrin structure) of its polymer side chain, described later.

The cyclodextrin derivative is at least one member selected from the group consisting of α-cyclodextrin derivatives, β-cyclodextrin derivatives, and γ-cyclodextrin derivatives. A "cyclodextrin derivative" as used in the present specification refers to a molecule that has a structure formed such that a cyclodextrin molecule is substituted with another organic group. Just to note, the term "cyclodextrin" in the present specification refers to at least one member selected from the group consisting of α-cyclodextrin, β-cyclodextrin, and γ-cyclodextrin.

The host group is a monovalent group formed by removing one hydrogen atom or hydroxy group from a cyclodextrin derivative as described above. The hydrogen atom or hydroxy group removed from a cyclodextrin derivative may be positioned at any part of the derivative. From the standpoint of convenience in forming a host group, the host group is preferably a monovalent group formed by removing one hydroxy group from a cyclodextrin derivative.

As described above, the cyclodextrin derivative for forming a host group has such a structure that at least one hydroxy group of a cyclodextrin is replaced with a group selected from the group consisting of a hydrocarbon group, an acyl group, and —CONHR wherein R represents a methyl group or an ethyl group. Due to such a structure, the host-group-containing polymerizable monomer according to the present invention can exhibit, for example, high affinity for both hydrophilic polymerizable monomers and hydrophobic polymerizable monomers, and the host-group-containing polymerizable monomer can copolymerize with a variety of polymerizable monomers. In the present specification, "a group selected from the group consisting of a hydrocarbon group, an acyl group, and —CONHR wherein R represents a methyl group or an ethyl group" may be referred to as "hydrocarbon group and the like" for convenience.

In particular, the host-group-containing polymerizable monomer according to the present invention exhibits high solubility in hydrophobic polymerizable monomers; this has made it possible to copolymerize a host-group-containing polymerizable monomer with a hydrophobic polymerizable monomer, which has been considered difficult, in a wide range of composition ratios, providing a higher degree of freedom in designing a target macromolecular material.

When the total number of hydroxy groups in a single molecule of a cyclodextrin is N, N of α-cyclodextrin is 18, N of β-cyclodextrin is 21, and N of γ-cyclodextrin is 24.

If the host group is a monovalent group formed by removing one "hydroxy group" from a cyclodextrin derivative, the maximum number of hydroxy groups whose hydrogens can be replaced with the hydrocarbon group and the like is N-1 per molecule of the cyclodextrin derivative. If the host group is a monovalent group formed by removing one "hydrogen atom" from a cyclodextrin derivative, the maximum number of hydroxy groups whose hydrogens can be replaced with the hydrocarbon group and the like is N per molecule of the cyclodextrin derivative.

The host group preferably has such a structure that the hydrogen atoms of at least 70% of the total number of hydroxy groups per molecule of the cyclodextrin derivative are replaced with the hydrocarbon group and the like. In this case, the host-group-containing polymerizable monomer exhibits higher affinity for hydrophobic polymerizable monomers. The host group more preferably has such a structure that the hydrogen atoms of at least 80% of the total number of hydroxy groups per molecule of the cyclodextrin derivative are replaced with the hydrocarbon group and the like, and particularly preferably has such a structure that the hydrogen atoms of at least 90% of the total number of hydroxy groups per molecule of the cyclodextrin derivative are replaced with the hydrocarbon group and the like.

The host group preferably has such a structure that the hydrogen atoms of at least 13 hydroxy groups of the total number of hydroxy groups per molecule of α-cyclodextrin derivative are replaced with the hydrocarbon group and the like. In this case, the host-group-containing polymerizable monomer exhibits higher affinity for hydrophobic polymerizable monomers. The host group more preferably has such a structure that the hydrogen atoms of at least 15 hydroxy groups of the total number of hydroxy groups per molecule of α-cyclodextrin derivative are replaced with the hydrocarbon group and the like, and particularly preferably has such a structure that the hydrogen atoms of at least 17 hydroxy groups of the total number of hydroxy groups per molecule of α-cyclodextrin derivative are replaced with the hydrocarbon group and the like.

The host group preferably has such a structure that the hydrogen atoms of at least 13 hydroxy groups of the total number of hydroxy groups per molecule of β-cyclodextrin derivative are replaced with the hydrocarbon group and the like. In this case, the host-group-containing polymerizable monomer exhibits higher affinity for hydrophobic polymerizable monomers. The host group more preferably has such a structure that the hydrogen atoms of at least 17 hydroxy groups of the total number of hydroxy groups per molecule of β-cyclodextrin derivative are replaced with the hydrocarbon group and the like, and particularly preferably has such a structure that the hydrogen atoms of at least 19 hydroxy groups of the total number of hydroxy groups per molecule of β-cyclodextrin derivative are replaced with the hydrocarbon group and the like.

The host group preferably has such a structure that the hydrogen atoms of at least 17 hydroxy groups of the total number of hydroxy groups per molecule of γ-cyclodextrin derivative are replaced with the hydrocarbon group and the like. In this case, the host-group-containing polymerizable monomer exhibits higher affinity for hydrophobic polymerizable monomers. The host group more preferably has such a structure that the hydrogen atoms of at least 19 hydroxy groups of the total number of hydroxy groups per molecule of γ-cyclodextrin derivative are replaced with the hydrocarbon group and the like, and particularly preferably has such a structure that the hydrogen atoms of at least 22 hydroxy groups of the total number of hydroxy groups per molecule of γ-cyclodextrin derivative are replaced with the hydrocarbon group and the like.

The type of the hydrocarbon group is not particularly limited. Examples of the hydrocarbon group include an alkyl group, an alkenyl group, and an alkynyl group.

The number of carbon atoms of the hydrocarbon group is not particularly limited. The number of carbon atoms of the hydrocarbon group is preferably 1 to 4 because such a host-group-containing polymerizable monomer exhibits higher affinity for both hydrophilic polymerizable monomers and hydrophobic polymerizable monomers, and host-guest interaction easily occurs.

Specific examples of hydrocarbon groups having 1 to 4 carbon atoms include a methyl group, an ethyl group, a propyl group, and a butyl group. When the hydrocarbon group is a propyl group or a butyl group, the hydrocarbon group may be linear or branched.

The hydrocarbon group may be substituted as long as the effects of the present invention are not impaired.

Examples of the acyl group include an acetyl group, a propionyl group, and a formyl group. The acyl group may be further substituted. The acyl group is preferably an acetyl group because such a host-group-containing polymerizable monomer exhibits higher affinity for both hydrophilic polymerizable monomers and hydrophobic polymerizable monomers, and host-guest interaction easily occurs; additionally, a macromolecular material excellent in toughness and strength can be easily obtained.

—CONHR wherein R represents a methyl group or an ethyl group is a methyl carbamate group or an ethyl carbamate group. —CONHR is preferably an ethyl carbamate group because such a host-group-containing polymerizable monomer exhibits higher affinity for both hydrophilic polymerizable monomers and hydrophobic polymerizable monomers, and host-guest interaction easily occurs.

The host-group-containing polymerizable monomer according to the present invention is not particularly limited in terms of structure as long as the host-group-containing polymerizable monomer has the host group described above and as long as the host-group-containing polymerizable monomer is also a polymerizable compound. The term "polymerizable" as used in the present specification means having the nature to undergo, for example, radical polymerization, ion polymerization, polycondensation (condensation polymerization), addition-condensation polymerization, living polymerization, living radical polymerization, or other various known types of polymerization.

The host-group-containing polymerizable monomer is preferably a compound capable of undergoing radical polymerization or polycondensation (condensation polymerization), from the standpoint of simplicity of synthesis and ease of obtaining a macromolecular material excellent in toughness and strength.

The host-group-containing polymerizable monomer is not particularly limited in terms of type as long as the host-group-containing polymerizable monomer has a host group and a polymerizable functional group. Specific examples of polymerizable functional groups include, in addition to an alkenyl group and a vinyl group, —OH, —SH, —NH$_2$, —COOH, —SO₃H, —PO₄H, an isocyanate group, and an epoxy group (glycidyl group). These polymerizable functional groups can be introduced into a cyclodextrin derivative by replacing the hydrogen atom of at least one hydroxy group of a cyclodextrin in the cyclodextrin derivative. This forms a host-group-containing polymerizable monomer having a polymerizable functional group.

More specifically, the host-group-containing polymerizable monomer can be classified into host-group-containing vinyl monomers and host-group-containing non-vinyl monomers, described in order below.

Host-Group-Containing Vinyl Monomer

When the host-group-containing polymerizable monomer is a host-group-containing vinyl monomer, the host-group-containing vinyl monomer is a vinyl compound having a radically polymerizable functional group in addition to the host group.

The radically polymerizable functional group includes groups having a carbon-carbon double bond. Specifically, the radically polymerizable functional group includes an acryloyl group (CH₂=CH(CO)—), a methacryloyl group (CH₂=CCH₃ (CO)—), a styryl group, a vinyl group, and an allyl group. These groups having a carbon-carbon double bond may further be substituted as long as the radically polymerizable properties are not interfered with.

Specific examples of the host-group-containing polymerizable monomer include polymerizable vinyl monomers to which the host group is bound.

For example, the host-group-containing vinyl monomer is a compound represented by the following formula (h1):

wherein Ra represents a hydrogen atom or a methyl group, $R^N$ represents the host group, and $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group.

Alternatively, the host-group-containing polymerizable monomer is a compound represented by the following formula (h2):

wherein Ra, $R^H$, and $R^1$ are respectively synonymous with Ra, $R^H$, and $R^1$ of formula (h1).

Additionally, the host-group-containing polymerizable monomer represents the following formula (h3):

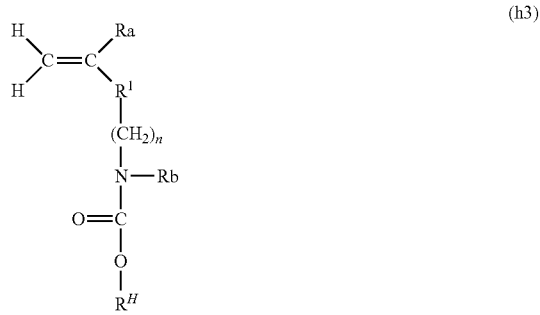

wherein Ra, $R^H$, and $R^1$ are respectively synonymous with Ra, $R^H$, and $R^1$ of formula (h1); n represents an integer of 1 to 20, preferably 1 to 10, and more preferably 1 to 5; and Rb represents hydrogen or an alkyl group having 1 to 20 carbon atoms (preferably an alkyl group having 1 to 10 carbon atoms, and more preferably an alkyl group having 1 to 6 carbon atoms).

The host group $R^H$ of the host-group-containing polymerizable monomer represented by formula (h1), (h2), or (h3) is an example of a monovalent group formed by removing one hydroxy group from a cyclodextrin derivative.

The host-group-containing polymerizable monomer may be a single compound among those represented by formula (h1), formula (h2), or formula (h3), or may include two or more of those represented by formula (h1), formula (h2), or formula (h3). In this case, Ra of formula (h1), Ra of formula (h2), and Ra of formula (h3) may be identical or different. Likewise, $R^H$ of formula (h1), $R^H$ of formula (h2), and $R^H$ of formula (h3) may be identical or different; and $R^1$ of formula (h1), $R^1$ of formula (h2), and $R^1$ of formula (h3) may be identical or different.

The substituents defined in formulas (h1) to (h3) are not particularly limited. For example, such substituents include an alkyl group having 1 to 20 carbon atoms, an alkenyl group having 2 to 20 carbon atoms, an alkynyl group having 2 to 20 carbon atoms, a halogen atom, a carboxy group, a carbonyl group, a sulfonyl group, a sulfone group, and a cyano group.

When $R^1$ in formulas (h1) to (h3) is a divalent group formed by removing one hydrogen atom from an amino group optionally having one substituent, the nitrogen atom of the amino group can bond to the carbon atom of the C=C double bond.

When $R^1$ in formulas (h1) to (h3) is a divalent group formed by removing one hydrogen atom from an amide group optionally having one substituent, the carbon atom of the amide group can bond to the carbon atom of the C=C double bond.

When $R^1$ in formulas (h1) to (h3) is a divalent group formed by removing one hydrogen atom from an aldehyde group, the carbon atom of the aldehyde group can bond to the carbon atom of the C=C double bond.

When $R^1$ in formulas (h1) to (h3) is a divalent group formed by removing one hydrogen atom from a carboxy group, the carbon atom of the carboxy group can bond to the carbon atom of the C=C double bond.

The host-group-containing polymerizable monomers represented by formulas (h1) to (h3) are, for example, preferably a (meth)acrylic acid ester derivative (i.e., $R^1$ is —COO—), or a (meth)acrylamide derivative (i.e., $R^1$ is —CONH— or —CONR—, and R is synonymous with the substituent described above). In these cases, polymerization easily proceeds, and the obtained macromolecular material can exhibit higher toughness and strength. In the present specification, (meth)acrylic refers to either acrylic or methacrylic.

R in —CONR— is, for example, preferably an alkyl group having 1 to 20 carbon atoms, more preferably an alkyl group having 1 to 10 carbon atoms, and particularly preferably an alkyl group having 1 to 6 carbon atoms.

Specific examples of the host-group-containing polymerizable monomer represented by formula (h1) include the following compounds (h1-1) to (h1-6).

(h1-1)

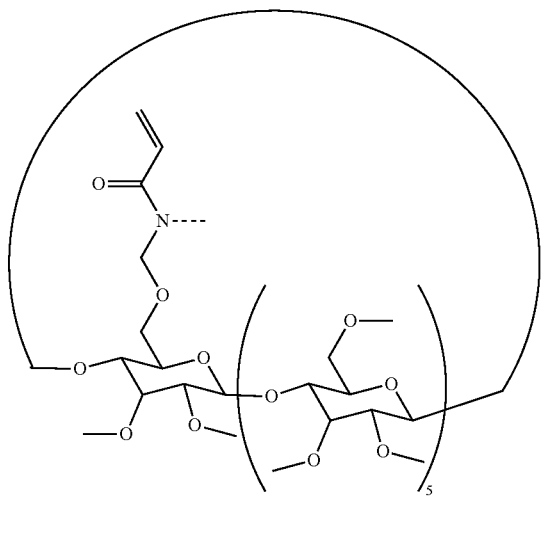

(h1-2)

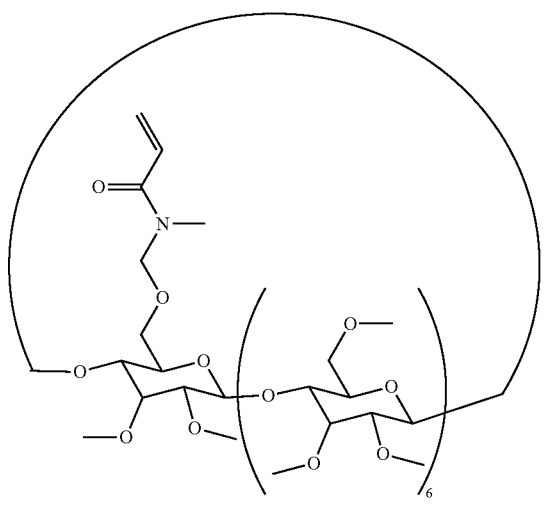

(h1-3)

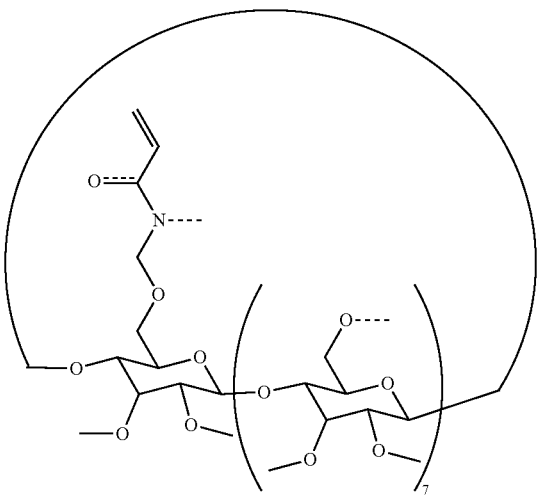

(h1-4)

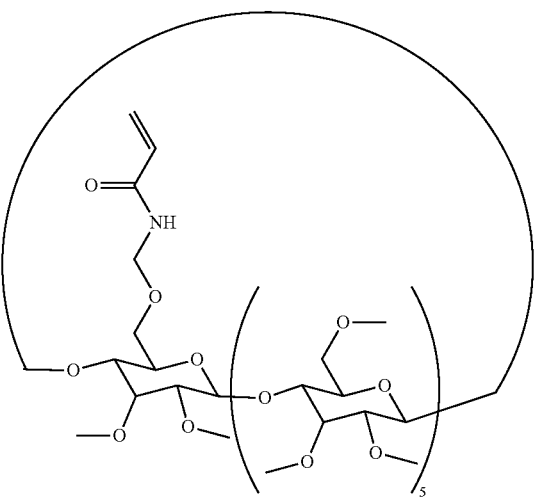

(h1-5)

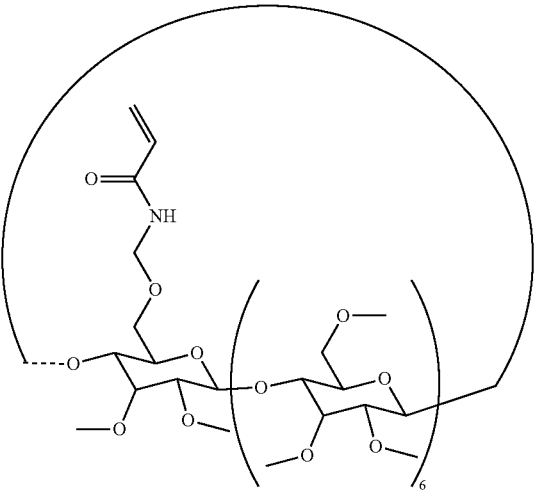

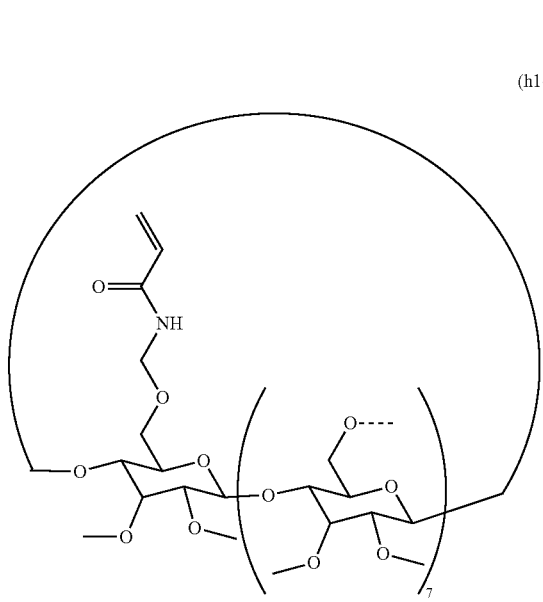
(h1-6)

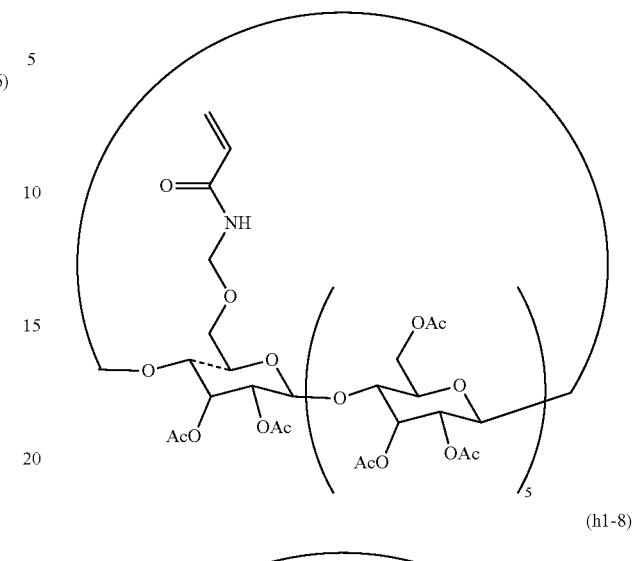
(h1-7)

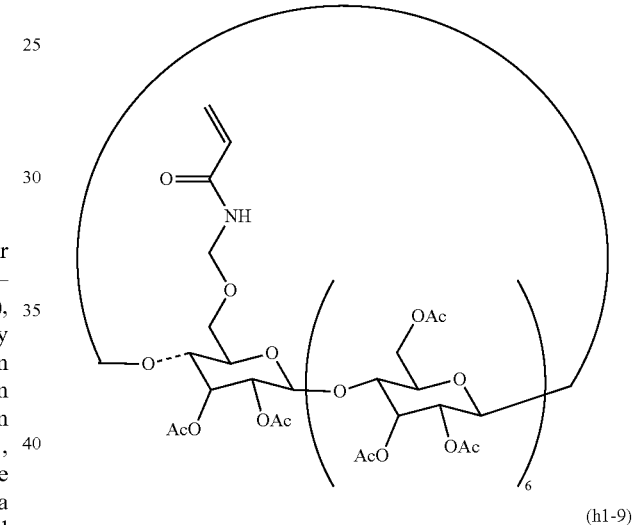
(h1-8)

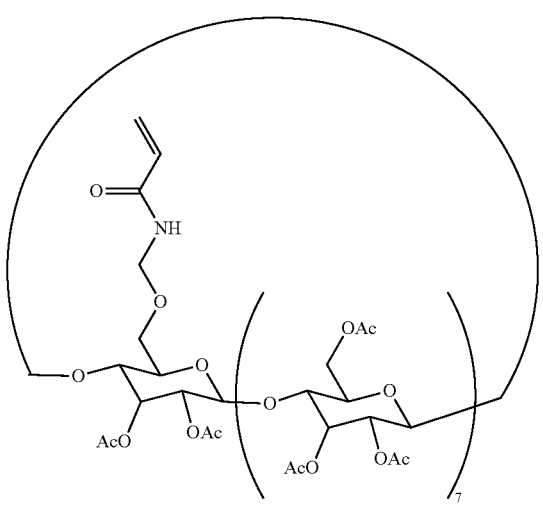
(h1-9)

The compounds represented by formula (h1-1), (h1-2), or (h1-3) are formed such that $R^1$ in formula (h1) is —CONR— wherein R represents a methyl group, and such that (h1-1), (h1-2), and (h1-3) respectively have a host group formed by removing one hydroxy group from an α-cyclodextrin derivative, a β-cyclodextrin derivative, and a γ-cyclodextrin derivative. In every cyclodextrin derivative, the hydrogen atoms of the hydroxy groups, the number of which is N-1, are replaced with a methyl group. The nitrogen atom of the amide moiety of each compound represented by formula (h1-1), (h1-2), or (h1-3) can also be replaced by methyl during the methyl replacement reaction on the hydrogen atoms of the hydroxy groups of the cyclodextrin derivative described later. In other words, the compounds represented by formula (h1-1), (h1-2), or (h1-3) have an advantage in that methylation of the cyclodextrin moiety and methylation of the amide moiety can be performed in a single-step reaction, which makes it easier to obtain the compounds represented by formula (h1-1), (h1-2), or (h1-3). The same applies to the formulas (h2-1), (h2-2), and (h2-3), described later.

The compounds represented by formula (h1-4), (h1-5), or (h1-6) are formed such that $R^1$ in formula (h1) is —CONH—, and such that (h1-4), (h1-5), and (h1-6) respectively have a host group formed by removing one hydroxy group from an α-cyclodextrin derivative, a β-cyclodextrin derivative, and a γ-cyclodextrin derivative. In every cyclodextrin derivative, the hydrogen atoms of the hydroxy groups, the number of which is N-1, are replaced with a methyl group.

Specific examples of the host-group-containing polymerizable monomer represented by formula (h1) include the following compounds (h1-7) to (h1-9).

The compounds represented by formula (h1-7), (h1-8), or (h1-9) are formed such that $R^1$ in formula (h1) is —CONH—, and such that (h1-7), (h1-8), and (h1-9) respectively have a host group formed by removing one hydroxy group from an α-cyclodextrin derivative, a β-cyclodextrin derivative, and a γ-cyclodextrin derivative. In every cyclodextrin derivative, the hydrogen atoms of the hydroxy groups, the number of which is N-1, are replaced with an acetyl group (indicated as "Ac" in the formulas).

Specific examples of the host-group-containing polymerizable monomer represented by formula (h1) include the following compound represented by formula (h1-10):

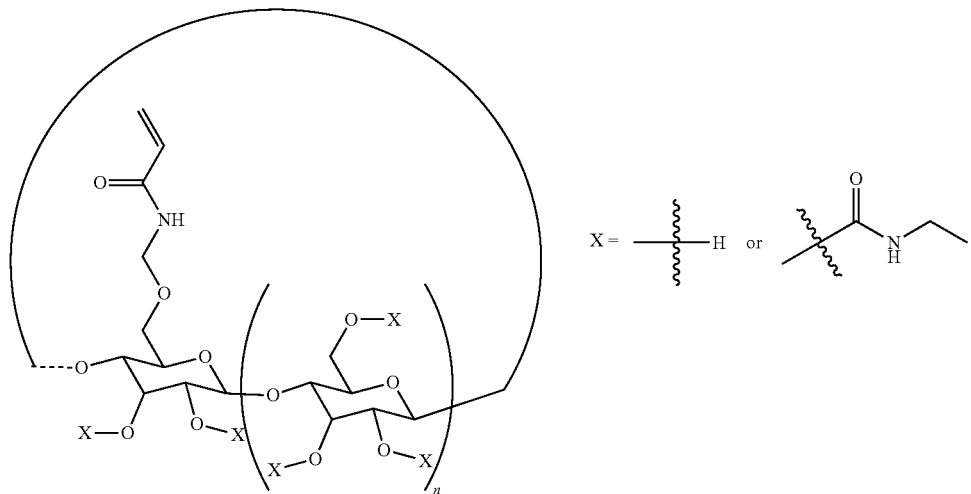

(h1-10)

wherein at least one X is a hydrogen atom, at least one X is —CONHC$_2$H$_5$ (an ethyl carbamate group), and n represents 5, 6, or 7.

The compound represented by formula (h1-10) is formed such that R$^1$ in formula (h1) is —CONH—, and such that (h1-10) has a host group formed by removing one hydroxy group from a cyclodextrin derivative. In the cyclodextrin derivative, the hydrogen atoms of the hydroxy groups, the number of which is N-1, are replaced with X.

Specific examples of the host-group-containing polymerizable monomer represented by formula (h2) include the following compounds (h2-1) to (h2-9).

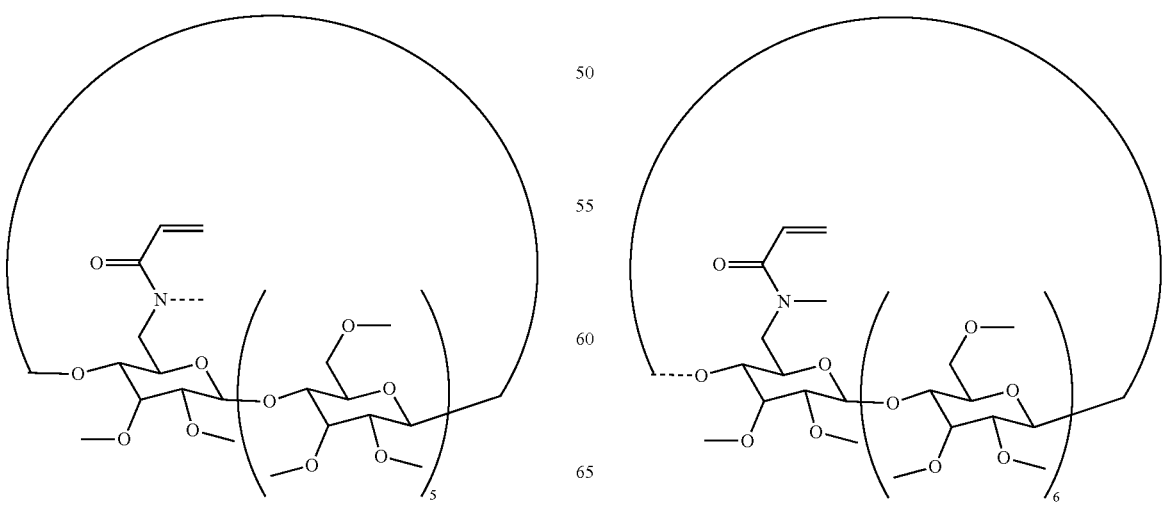

(h2-1)        (h2-2)

(h2-3)
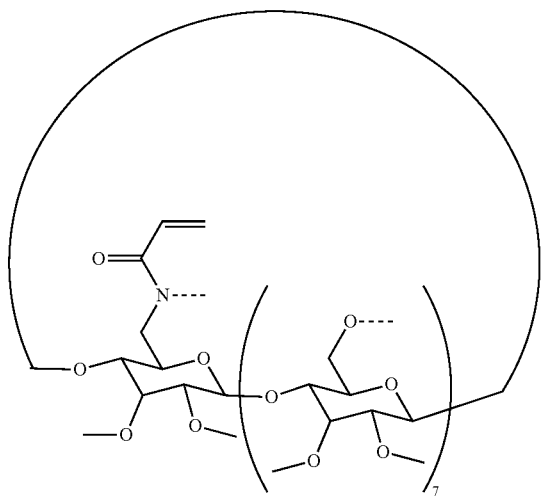
(h2-4)
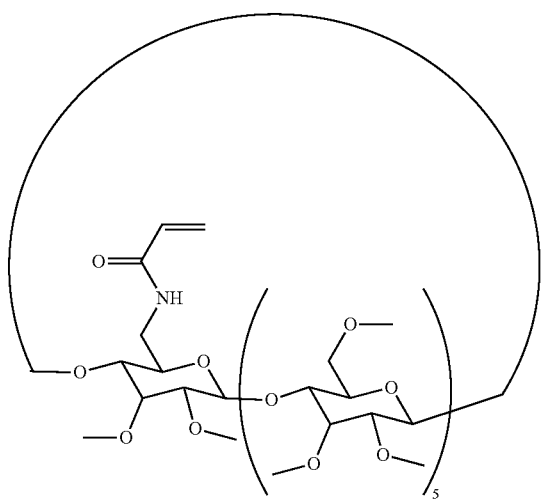
(h2-5)
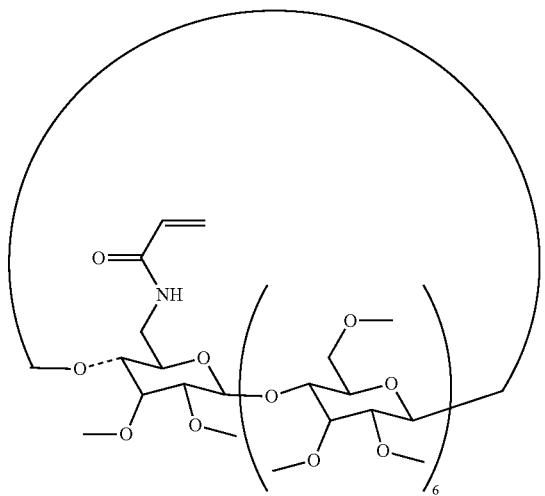
(h2-6)
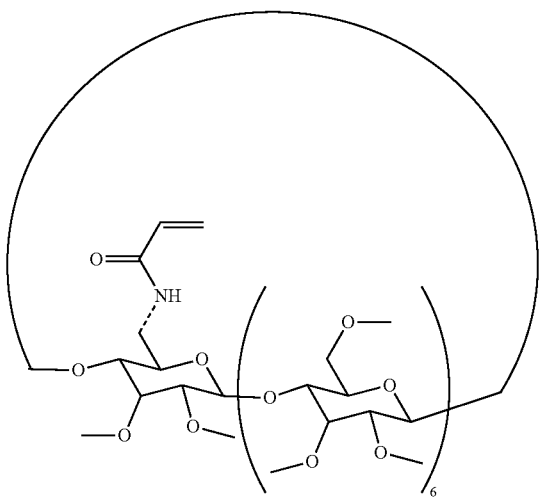
(h2-7)
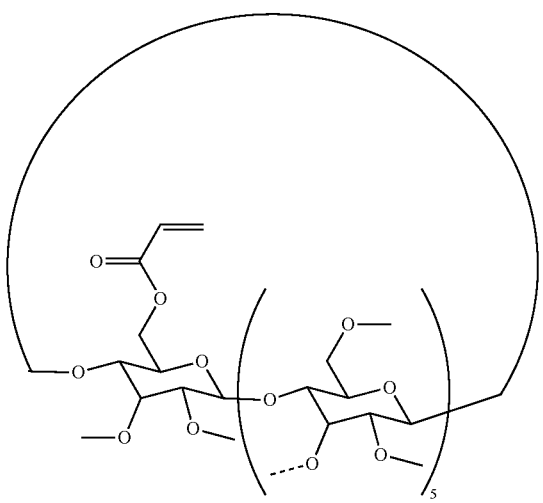
(h2-8)
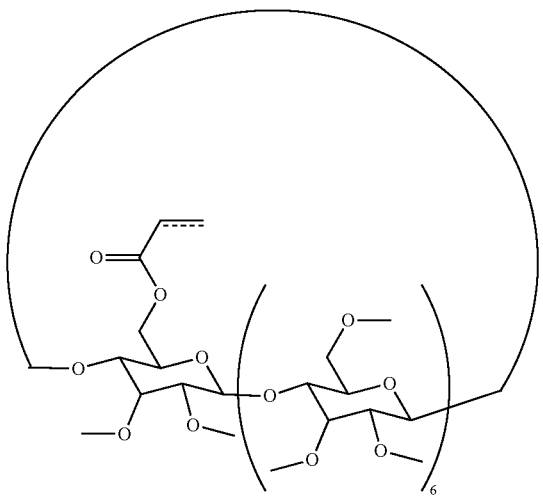

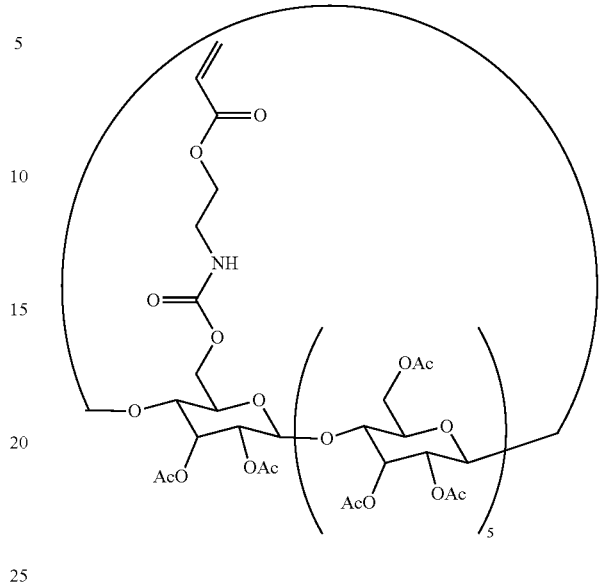

(h3-1)

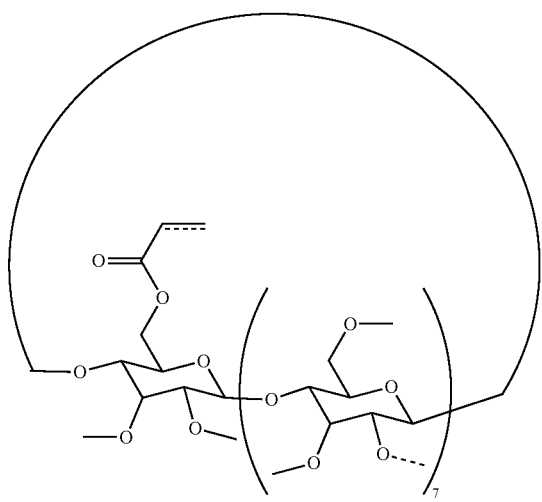

(h2-9)

The compounds represented by formula (h2-1), (h2-2), or (h2-3) are formed such that $R^1$ in formula (h2) is —CONR— wherein R represents a methyl group, and such that (h2-1), (h2-2), and (h2-3) respectively have a host group formed by removing one hydroxy group from an α-cyclodextrin derivative, a β-cyclodextrin derivative, and a γ-cyclodextrin derivative. In every cyclodextrin derivative, the hydrogen atoms of the hydroxy groups, the number of which is N-1, are replaced with a methyl group.

The compounds represented by formula (h2-4), (h2-5), or (h2-6) are formed such that $R^1$ in formula (h2) is —CONH—, and such that (h2-4), (h2-5), and (h2-6) respectively have a host group formed by removing one hydroxy group from an α-cyclodextrin derivative, a β-cyclodextrin derivative, and a γ-cyclodextrin derivative. In every cyclodextrin derivative, the hydrogen atoms of the hydroxy groups, the number of which is N-1, are replaced with a methyl group.

The compounds represented by formula (h2-7), (h2-8), or (h2-9) are formed such that $R^1$ in formula (h2) is —COO—, and that (h2-7), (h2-8), and (h2-9) respectively have a host group formed by removing one hydroxy group from an α-cyclodextrin derivative, a β-cyclodextrin derivative, and a γ-cyclodextrin derivative. In every cyclodextrin derivative, the hydrogen atoms of the hydroxy groups, the number of which is N-1, are replaced with a methyl group.

Specific examples of the host-group-containing polymerizable monomer represented by formula (h3) include the following compounds (h3-1) to (h3-6).

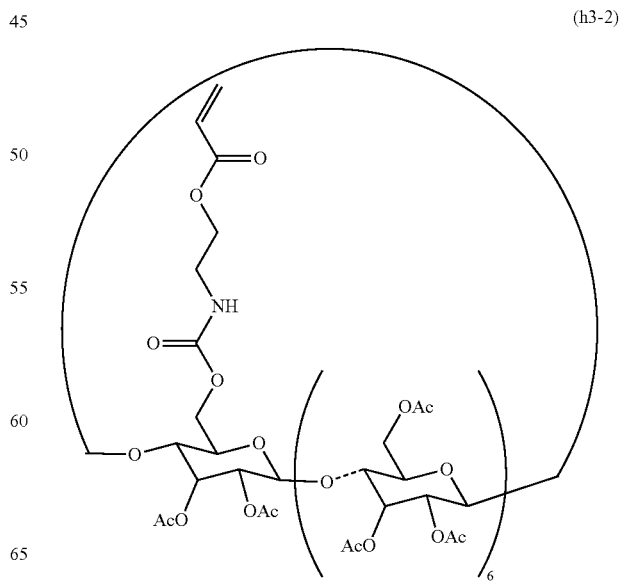

(h3-2)

(h3-3)

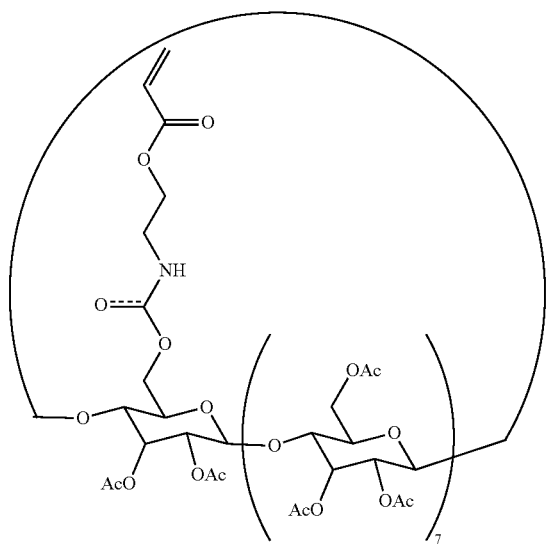

The compounds represented by formula (h3-1), (h3-2), or (h3-3) are formed such that $R^1$ in formula (h3) is —COO—, n represents 2, and Rb represents a hydrogen atom. The compounds represented by formula (h3-1), (h3-2), or (h3-3) respectively have a host group formed by removing one hydroxy group from an α-cyclodextrin derivative, a β-cyclodextrin derivative, and a γ-cyclodextrin derivative. In every cyclodextrin derivative, the hydrogen atoms of the hydroxy groups, the number of which is N-1, are replaced with an acetyl group (Ac). In formulas (h3-1), (h3-2), and (h3-3), the hydrogen atom at Rb may be replaced with a methyl group.

The host-group-containing polymerizable monomers represented by (h1-1) to (h1-9), (h2-1) to (h2-9), and (h3-1) to (h3-3) are all acrylic monomers; however, these monomers may have such a structure that the hydrogen at the meta position is replaced with a methyl group (i.e., methacrylic monomers) because such methacrylic monomers do not impair the effects of the present invention.

Host-Group-Containing Non-Vinyl Monomer

When the host-group-containing polymerizable monomer is a host-group-containing non-vinyl monomer, the host-group-containing non-vinyl monomer is a compound that has, in place of the host group, a functional group other than a radically polymerizable functional group, such as a functional group that can undergo polycondensation (including condensation polymerization).

Examples of the host-group-containing polymerizable monomer as a host-group-containing non-vinyl monomer include the compound represented by the following formula (h50).

$$R^{50}\text{-}R^H \tag{h50}$$

wherein $R^{50}$ represents a group selected from the group consisting of $NH_2$, COOH, COCl, SH, OH, NCO, and an epoxy group; and $R^H$ represents the host group.

In formula (h50), when $R^{50}$ represents an epoxy group, $R^{50}$ is represented by the following formula (h51):

(h51)

The host-group-containing polymerizable monomer as a host-group-containing non-vinyl monomer is preferably the compound represented by the following formula (h40):

$$R^{40}\text{-}R^H \tag{h40}$$

wherein $R^{40}$ represents $NH_2$ or OH; and $R^H$ represents the host group.

This host-group-containing polymerizable monomer is, for example, easy to synthesize and more likely to provide a macromolecular material excellent in toughness and strength.

Specific examples of the compound represented by formula (h40) include the compound represented by the following formula (m1):

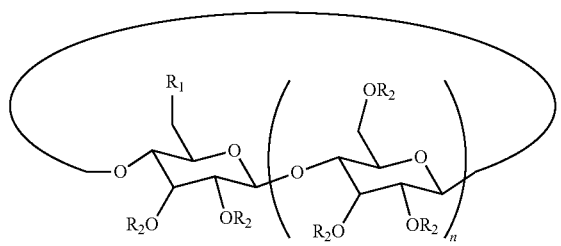

(m1)

wherein $R_1$ is equivalent to $R^{40}$, i.e., $R_1$ represents $NH_2$ or OH, $R_2$ represents the hydrocarbon group and the like, and n represents 5, 6, or 7.

In formula (m1), all $R_2$s (the hydrocarbon group and the like) may be the same one member selected from the group consisting of a methyl group, an acetyl group, a methyl carbamate group, and an ethyl carbamate group. In formula (m1), the hydrocarbon group and the like in all $R_2$s are preferably a methyl group.

The compound represented by formula (h40) includes 6-monodeoxy-6-monoamino-trimethyl-cyclodextrin, 6-monodeoxy-6-monocarboxy-trimethyl-cyclodextrin, 6-monodeoxy-trimethyl-cyclodextrin-6-monocarbonyl chloride, 6-monodeoxy-6-monothio-trimethyl-cyclodextrin, 6-monohydroxy-trimethyl-cyclodextrin, 6-monodeoxy-6-monoisocyanate-trimethyl-cyclodextrin, 6-monoglycidyl-trimethyl-cyclodextrin, 6-monodeoxy-6-monoamino-triacetyl-cyclodextrin, 6-monodeoxy-6-monocarboxy-triacetyl-cyclodextrin, 6-monodeoxy-triacetyl-cyclodextrin-6-monocarbonyl chloride, 6-monodeoxy-6-monothio-triacetyl-cyclodextrin, 6-monodeoxy-6-monohydroxy-triacetyl-cyclodextrin, 6-monodeoxy-6-monoisocyanate-triacetyl-cyclodextrin, 6-monoglycidyl-triacetyl-cyclodextrin, 6-monodeoxy-6-monoamino-triethylcarbamate-cyclodextrin, 6-monodeoxy-6-monocarboxy-triethylcarbamate-cyclodextrin, 6-monodeoxy-triethylcarbamate-cyclodextrin-6-monocarbonyl chloride, 6-monodeoxy-6-monothio-triethylcarbamate-cyclodextrin, 6-monodeoxy-6-monohydroxy-triethylcarbamate-cyclodextrin, 6-monodeoxy-6-monoisocyanatetriethylcarbamate-cyclodextrin, and 6-monoglycidyl-triethylcarbamate-cyclodextrin.

Method for Producing Host-Group-Containing Vinyl Monomer

A method for producing the host-group-containing polymerizable monomer according to the present invention is not particularly limited. For example, when the host-group-containing polymerizable monomer is the host-group-containing vinyl monomer described above, such a host-group-containing polymerizable monomer can be obtained by reacting a polymerizable monomer containing no host group with a cyclodextrin or cyclodextrin derivative. The polymerizable monomer containing no host group is a vinyl compound other than the host-group-containing vinyl monomer, and is referred to as "vinyl compound A" below.

When a host-group-containing polymerizable monomer is obtained by reacting vinyl compound A with a cyclodextrin, vinyl compound A is substituted with a cyclodextrin to prepare a polymerizable cyclodextrin-substitution monomer ("polymerizable CD-substitution monomer"), and the hydrogen atoms of the hydroxy groups present in the cyclodextrin of this polymerizable CD-substitution monomer are replaced with the hydrocarbon group and the like.

The method for replacing the hydrogen atoms of the hydroxy groups present in a cyclodextrin with the hydrocarbon group and the like may be selected from a wide range of known alkylation reactions, for example. For example, replacement of a hydrogen atom with a hydrocarbon group can be performed by reacting halogenated alkyl with the polymerizable CD-substitution monomer in the presence of sodium hydride. In this case, a solution of halogenated alkyl and the polymerizable CD-substitution monomer may be added dropwise to a suspension of sodium hydride. Alternatively, halogenated alkyl, the polymerizable CD-substitution monomer, and sodium hydride may be all mixed. Examples of halogenated alkyl include methyl iodide, ethyl iodide, and propyl iodide.

The method for replacing the hydrogen atoms of the hydroxy groups present in a cyclodextrin with an acyl group, such as an acetyl group, may be selected, for example, from a wide range of known acylation reactions. For example, replacement of a hydrogen atom with an acetyl group can be performed by reacting halogenated acetyl with the polymerizable CD-substitution monomer in the presence of sodium hydride. In this case, a solution of halogenated acetyl and the polymerizable CD-substitution monomer may be added dropwise to a suspension of sodium hydride. Alternatively, halogenated acetyl, the polymerizable CD-substitution monomer, and sodium hydride may be all mixed. Examples of halogenated acetyl include acetyl bromide, and acetyl iodide.

Another example of the method for replacing the hydrogen atoms of the hydroxy groups present in a cyclodextrin with an acetyl group is acetylation of the polymerizable CD-substitution monomer using a solvent capable of trapping an acid (e.g., pyridine) in the presence of acetic anhydride or isopropyl acetate.

The method for replacing the hydrogen atoms of the hydroxy groups present in a cyclodextrin with —CONHR wherein R represents a methyl group or an ethyl group may be selected, for example, from a wide range of known alkyl-carbamation reactions. For example, replacement of the hydrogen atoms of the hydroxy groups present in the host group with —CONHR can be performed by reacting the polymerizable CD-substitution monomer in an organic solvent (e.g., DMSO) in the presence of alkyl isocyanate. Examples of alkyl isocyanate include methyl isocyanate, and ethyl isocyanate.

When vinyl compound A is reacted with a cyclodextrin derivative to obtain a host-group-containing polymerizable monomer, the cyclodextrin derivative for use may be a compound formed such that the hydrogen atom of at least one hydroxy group of a cyclodextrin is replaced with the hydrocarbon group and the like. This cyclodextrin derivative can be obtained, for example, by reacting a cyclodextrin with the halogenated alkyl, halogenated acetyl, or alkyl isocyanate in the presence of sodium hydride.

Vinyl compound A includes the compounds represented by the following formula (5), (6), or (9):

(5)

(6)

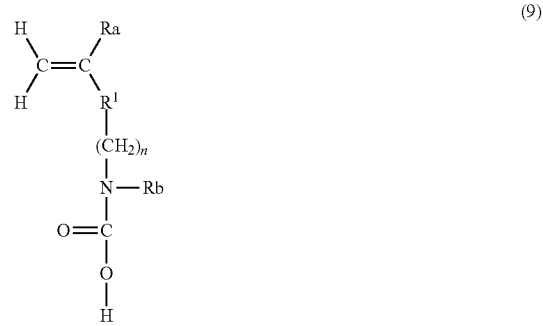

(9)

In formulas (5), (6), and (9), Ra represents a hydrogen atom or a methyl group; $R^1$ is synonymous with $R^1$ of formula (h1). In formula (9), Rb and n are synonymous with Rb and n of formula (h3).

When the compound represented by formula (5) is used as vinyl compound A, the resulting host-group-containing polymerizable monomer is the compound represented by formula (h1). When the compound represented by formula (6) is used as vinyl compound A, the resulting host-group-containing polymerizable monomer is the compound represented by formula (h2). When the compound represented by formula (9) is used as vinyl compound A, the resulting host-group-containing polymerizable monomer is the compound represented by formula (h3).

Specific examples of the method for producing the host-group-containing polymerizable monomer using vinyl compound A include a method including the step of subjecting vinyl compound A and a cyclodextrin derivative in which the hydrogen atom of at least one hydroxy group is replaced with the hydrocarbon group and the like to dehydration condensation in a solvent, optionally in the presence of an acid catalyst.

Specific examples of the method for producing the host-group-containing polymerizable monomer using vinyl compound A also include a method including the step of subjecting vinyl compound A and a cyclodextrin to dehydration condensation in a solvent, optionally in the presence of an acid catalyst. In this method, the target host-group-containing polymerizable monomer can be obtained by further performing the step of replacing the hydrogen atom of at least one hydroxy group contained in the product obtained by dehydration condensation with the hydrocarbon group and the like. The method for replacing a hydrogen atom with the hydrocarbon group and the like may be the same as described above.

Dehydration condensation can be performed, for example, in the presence of an acid catalyst. The acid catalyst is not particularly limited, and a wide range of known catalysts are usable. Examples include p-toluenesulfonic acid, aluminum chloride, and hydrochloric acid. The amount of an acid catalyst for use may be, for example, typically 20 mol % or less, and preferably 10 mol % or less based on the cyclodextrin or cyclodextrin derivative, and typically 0.001 mol % or more, preferably 0.01 mol % or more, and more preferably 0.1 mol % or more based on the cyclodextrin or cyclodextrin derivative.

The solvent for use in the reaction is also not particularly limited. Examples include water, dimethylformamide, dimethyl sulfoxide, and N-methylpyrrolidone. In particular, from the standpoint of convenience in adjusting the concentration of the acid and convenience in controlling the reaction, the solvent is preferably dimethylformamide, dimethyl sulfoxide, or N-methylpyrrolidone, and particularly preferably dimethylformamide.

The reaction temperature and reaction time for dehydration condensation are also not limited, and dehydration condensation can be performed under appropriate conditions. From the standpoint of promptly performing a reaction, the reaction temperature is preferably 25 to 90° C., and the reaction time is preferably 1 minute to 3 hours. The reaction time is more preferably 5 minutes to 1 hour. After the reaction, purification may be performed by a known purification technique.

Method for Producing Host-Group-Containing Non-Vinyl Monomer

When the host-group-containing polymerizable monomer is the host-group-containing non-vinyl monomer described above, the production method of the monomer is not particularly limited. A wide range of known production methods are usable.

For example, when the host-group-containing polymerizable monomer is the compound represented by formula (h40) wherein $R^{40}$ is $NH_2$, the target compound represented by formula (h40) can be obtained by a production method including the step of adding triphenylphosphine and ammonia water to a cyclodextrin derivative having azide ($N_3$) to prepare a host-group-containing non-vinyl monomer. The reaction conditions are not particularly limited, and the conditions for a known amination reaction can be applied. In this step, various solvents are optionally usable, and examples of the solvent include tetrahydrofuran. After a desired product is obtained, the product may optionally be purified by an appropriate method.

A cyclodextrin derivative having azide ($N_3$) can be produced by a known method. For example, a cyclodextrin derivative having azide ($N_3$) can be obtained by adding sodium hydride and methyl iodide to a cyclodextrin having azide ($N_3$) (e.g., 6-deoxy-6-monoazide-β-cyclodextrin). In this reaction, various solvents are optionally usable, and examples of the solvent include N,N-dimethylformamide. After the reaction, quenching may optionally be performed, and purification may further be performed by an appropriate method.

When the host-group-containing polymerizable monomer is, for example, the compound represented by formula (h40) wherein $R^{40}$ is OH, the production method is not particularly limited. For example, such a compound can be obtained by hydrolyzing a host-group-containing vinyl monomer (a starting material). For hydrolysis, for example, a strong acid such as trifluoroacetic acid may be used, and various organic solvents, for example, are usable. Examples of the host-group-containing vinyl monomer include the compounds represented by (h1-1) to (h1-6). Examples of organic solvents include acetone.

Other methods for producing the host-group-containing polymerizable monomer represented by formula (h40) wherein $R^{40}$ is OH include a method including performing base treatment on Tos-$R^H$ (Tos represents a tosyl group, and $R^H$ represents the host group) In this case, the base for use may be, for example, a suspension of Mg in MeOH. In the suspension of Mg in MeOH, the amount of Mg may be 1 to 20 wt. % relative to MeOH. The conditions for base treatment are not particularly limited, and conditions for a known base treatment may be applied. Another usable method for performing base treatment may be an operation in which a 1 to 20 wt. % NaOH or KOH aqueous solution is refluxed. Tos-$R^H$ for use in this method can be produced by a variety of methods. For example, Tos-$R^H$ can be obtained by a method in which a tosylated cyclodextrin is substituted with the hydrocarbon group and the like, a method in which a tosylated cyclodextrin is substituted with an acetyl group, or a method in which a tosylated cyclodextrin is substituted with —CONHR wherein R represents a methyl group or an ethyl group.

The host-group-containing polymerizable monomer according to the present invention can be obtained by the production methods described above. Embodiments of the resulting host-group-containing polymerizable monomer are as described above.

The method for producing the host-group-containing polymerizable monomer is not limited to those described above, and the host-group-containing polymerizable monomer can also be produced by other known methods. For example, the method using dehydration condensation described above has an advantage in that a host-group-containing polymerizable monomer can be produced through one-step reaction.

Monomers Other than Host-Group-Containing Polymerizable Monomer

The host-group-containing polymerizable monomer according to the present invention alone, or in combination with other polymerizable monomers, can be subjected to polymerization. This polymerization forms a polymer and provides a macromolecular material described later. Below, a polymerizable monomer containing the host-group-containing polymerizable monomer and one or more other polymerizable monomers is referred to as a "polymerizable monomer mixture."

Examples of other polymerizable monomers include guest-group-containing polymerizable monomers (i.e., polymerizable monomers that contain a guest group). Examples of other polymerizable monomers also include polymerizable monomers that are other than host-group-containing polymerizable monomers and guest-group-containing polymerizable monomers, and that are copolymerizable with a host-group-containing polymerizable monomer and/or a guest-group-containing polymerizable monomer ("third polymerizable monomer" below). Moreover, examples of other polymerizable monomers include monomers that are other than host-group-containing polymerizable monomers, guest-group-containing polymerizable monomers, and third polymerizable monomers, and that are capable of undergoing a condensation reaction (e.g., polycondensation or condensation polymerization) ("condensable monomer" below).

Guest-Group-Containing Polymerizable Monomer

A guest-group-containing polymerizable monomer is a compound formed such that a polymerizable monomer is substituted with a guest group.

The type of the guest group is not limited as long as the guest group can have host-guest interaction with the host group.

The guest group includes a linear or branched hydrocarbon group having 3 to 30 carbon atoms, a cycloalkyl group, an aryl group, a heteroaryl group, and an organometallic complex. These groups may optionally have one or more substituents. More specific guest groups include a chain-like or cyclic alkyl group having 4 to 18 carbon atoms. The chain-like alkyl group having 4 to 18 carbon atoms may be linear or branched. The cyclic alkyl group may have a structure like a basket. The substituents are as described above, and examples include a halogen atom (e.g., fluorine, chlorine, and bromine), a hydroxy group, a carboxy group, an ester group, an amide group, and an optionally protected hydroxy group.

Examples of the guest group also include a monovalent group formed by removing one atom (e.g., a hydrogen atom) from a guest molecule, such as at least one member selected from the group consisting of alcohol derivatives; aryl compounds; carboxylic acid derivatives; amino derivatives; azobenzene derivatives with cyclic alkyl or phenyl; cinnamic acid derivatives; aromatic compounds and alcohol derivatives thereof; amine derivatives; ferrocene derivatives; azobenzenes; naphthalene derivatives; anthracene derivatives; pyrene derivatives; perylene derivatives; clusters composed of carbon atoms, such as fullerenes; and dansyl compounds.

Further specific examples of the guest group include a t-butyl group, an n-octyl group, an n-dodecyl group, an isobornyl group, an adamantyl group, and groups formed by binding the substituents described above to these groups.

Specific examples of the guest-group-containing polymerizable monomer include polymerizable vinyl monomers to which the guest group is bound (which may be referred to as a "guest-group-containing vinyl monomer" below).

For example, a guest-group-containing vinyl monomer is the compound represented by the following formula (g1):

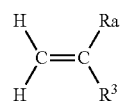

(g1)

wherein Ra represents a hydrogen atom or a methyl group, $R^G$ represents the guest group, and $R^2$ is synonymous with $R^1$ of formula (h1).

Of the polymerizable monomers represented by formula (g1), (meth)acrylic acid esters, derivatives thereof (i.e., $R^2$ is —COO—), (meth)acrylamide, and derivatives thereof (i.e., $R^1$ represents —CONH— or —CONR—, and R is synonymous with the substituent described above) are preferable. In this case, the polymerization proceeds easily, and the resulting macromolecular material can exhibit higher toughness and strength.

Specific examples of the guest-group-containing vinyl monomer include n-hexyl (meth)acrylate, n-octyl (meth) acrylate, n-dodecyl (meth)acrylate, adamantyl (meth)acrylate, hydroxy adamantyl (meth)acrylate, 1-(meth)acrylamide adamantane, 2-ethyl-2-adamantyl (meth) acrylate, N-dodecyl (meth)acrylamide, t-butyl (meth) acrylate, 1-acrylamide adamantane, N-(1-adamantyl) (meth)acrylamide, N-benzyl (meth)acrylamide, N-1-naphthyl methyl (meth)acrylamide, ethoxylated o-phenyl phenol acrylate, phenoxy polyethylene glycol acrylate, isostearyl acrylate, nonyl phenol-EO adduct acrylate, and isobornyl (meth) acrylate.

The guest-group-containing vinyl monomer can be produced by a known method. Alternatively, the guest-group-containing polymerizable monomer for use may be a commercially available product.

Third Polymerizable Monomer

The third polymerizable monomer includes a variety of compounds that are copolymerizable with the host-group-containing polymerizable monomer and/or the guest-group-containing polymerizable monomer. For example, the third polymerizable monomer includes a variety of known polymerizable vinyl monomers.

Specific examples of polymerizable vinyl monomers include the compound represented by the following formula (a1):

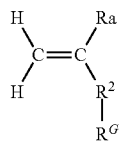

(a1)

wherein Ra represents a hydrogen atom or a methyl group, and $R^3$ represents a halogen atom, a hydroxy group, a thiol group, an amino group optionally having one substituent or a salt thereof, a carboxy group optionally having one substituent or a salt thereof, an amide group optionally having at least one substituent or a salt thereof, or a phenyl group optionally having at least one substituent.

When $R^3$ in formula (a1) is a carboxy group having one substituent, such a carboxy group includes those whose hydrogen atom is replaced with a hydrocarbon group, a hydroxyalkyl group (e.g., a hydroxymethyl group, a 1-hydroxyethyl group, a 2-hydroxyethyl group), methoxy polyethylene glycol (the number of units of ethylene glycol is 1 to 20, preferably 1 to 10, and particularly preferably 2 to 5), ethoxy polyethylene glycol (the number of units of ethylene glycol is 1 to 20, preferably 1 to 10, and particularly preferably 2 to 5), or the like (i.e., esters).

When $R^3$ in formula (a1) is an amide group having at least one substituent (i.e., a secondary amide or tertiary amide), such an amide group includes those formed such that one hydrogen atom or two hydrogen atoms of the primary amide are independently replaced with a hydrocarbon group or a hydroxyalkyl group (e.g., a hydroxymethyl group, a 1-hydroxyethyl group, and a 2-hydroxyethyl group).

$R^3$ in formula (a1) is preferably a carboxy group having one substituent, an amide group having at least one substituent, an amino group, an amide group, or a carboxy group. In this case, the structure of the crosslinked polymer that constitutes a macromolecular gel becomes stable, and the physical properties of the macromolecular gel are more likely to improve.

In particular, $R^3$ in formula (al) is preferably a carboxy group whose hydrogen atom is replaced with a $C_{1-10}$ alkyl group, or an amide group whose at least one hydrogen atom is replaced with a $C_{1-10}$ alkyl group. In this case, the third polymerizable monomer has a relatively high hydrophobicity; thus, copolymerization of the third polymerizable monomer with host-group-containing polymerizable monomer easily proceeds. More preferably, the number of carbon atoms of the alkyl group (the substituent) is 2 to 8, and particularly preferably 2 to 6. In this case, the resulting macromolecular material is more likely to improve in toughness and strength. This alkyl group may be linear or branched.

Specific examples of the monomer represented by formula (al) include (meth)acrylic acid, allyl amine, maleic anhydride, methyl (meth)acryliate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth) acrylate, cyclohexyl (meth) acrylate, N, N-dimethyl (meth)acrylamide, N,N-diethyl acrylamide, N-isopropyl (meth)acrylamide, N-hydroxymethyl (meth) acrylamide, N-hydroxymethyl (meth)acrylate, 2-hydroxy-ethyl (meth)acrylamide, 2-hydroxyethyl (meth)acrylate, ethoxy-diethylene glycol acrylate, methoxy-triethylene glycol acrylate, methoxy-polyethylene glycol acrylate, and styrene. These monomers may be used singly or in a combination of two or more.

Specific examples of the third polymerizable monomer include, in addition to the compound represented by formula (al), for example, diene compounds. Specific examples of diene compounds include isoprene and 1,3-butadiene.

When the polymerizable monomer mixture contains at least one of the guest-group-containing polymerizable monomer and the third polymerizable monomer, the host-group-containing polymerizable monomer for use is the host-group-containing vinyl monomer described above. When the polymerizable monomer mixture contains the host-group-containing vinyl monomer and at least one of the guest-group-containing polymerizable monomer and the third polymerizable monomer, this polymerizable monomer mixture can be formed into a macromolecular vinyl compound by radical polymerization. The polymerizable monomer mixture may consist of the host-group-containing vinyl monomer and at least one of the guest-group-containing polymerizable monomer and the third polymerizable monomer. The proportion of the host-group-containing vinyl monomer, the guest-group-containing polymerizable monomer, and the third polymerizable monomer may be the same as that of monomer A1, described later.

Condensable Monomer

The condensable monomer is those that are other than the host-group-containing polymerizable monomer, the guest-group-containing polymerizable monomer, and the third polymerizable monomer, and that are capable of undergoing a condensation reaction (e.g., polycondensation or condensation polymerization). The type of the condensable monomer is not particularly limited, and a wide range of known monomers capable of undergoing a condensation reaction (including polycondensation and condensation polymerization) are usable.

From the standpoint of forming a movable crosslinked polymer described later, examples of the condensable monomer include a compound having two or more amino groups, a compound having two or more hydroxy groups, a compound having two or more carboxy groups, a compound having two or more epoxy groups, and a compound having two or more isocyanate groups. These compounds may be used singly or in a combination of two or more.

Examples of the compound having two or more amino groups include 4,4'-diaminodiphenylmethane, 3,3'-diaminodiphenyl ether, 4,4'-diaminodiphenyl ether, 3,4'-diaminodiphenyl ether, 3,3'-diaminodiphenylmethane, 3,4'-diaminodiphenylmethane, o-phenylenediamine, m-phenylenediamine, p-phenylenediamine, 1,2-diaminoethane, 1,3-diaminopropane, 1,4-diaminobutane, 1,5-diaminopentane, 1,6-diaminohexane, 1,7-diaminoheptane, and 1,8-diaminooctane. These compounds may be used singly or in a combination of two or more.

Examples of the compound having two or more hydroxy groups include 4,4'-dihydroxydiphenylmethane, 1,3-propanediol, 1,3-butanediol, 2,3-butanediol, 1,4-butanediol, ethylene glycol, diethylene glycol, triethylene glycol, tetraethylene glycol, propylene glycol, dipropylene glycol, trimethylene glycol, and bisphenol A. These compounds may be used singly or in a combination of two or more.

Examples of the compound having two or more carboxy groups include adipic acid, malonic acid, succinic acid, and glutaric acid. These compounds may be used singly or in a combination of two or more.

Examples of the compound having two or more epoxy groups include polyalkylene glycol diglycidyl ethers, such as polyethylene glycol diglycidyl ether and poly-1-methylethylene glycol diglycidyl ether. The number average molecular weight (Mn) of a polyalkylene glycol diglycidyl ether may be 100 to 100000. These compounds may be used singly or in a combination of two or more.

Examples of the compound having two or more isocyanate groups include 4,4'-diphenylmethane diisocyanate (MDI), 1,6-hexamethylene diisocyanate (HDI), and 2,4-tolylene diisocyanate (TDI). These compounds may be used singly or in a combination of two or more.

Examples of other condensable monomers include carbonyl chloride and diphenyl carbonate.

When the polymerizable monomer mixture contains a condensable monomer, the host-group-containing polymerizable monomer for use is the host-group-containing non-vinyl monomer described above, such as the compound represented by formula (h50). When the polymerizable monomer mixture contains the host-group-containing non-vinyl monomer and a condensable monomer, this polymerizable monomer mixture can be formed into a condensation polymer through a condensation reaction (including polycondensation and condensation polymerization). The polymerizable monomer mixture may consist of the host-group-containing non-vinyl monomer and the condensable monomer. The proportion of the host-group-containing non-vinyl monomer and the condensable monomer may be the same as that of monomer A2, described later.

The main component of the condensation polymer may be, for example, an epoxy resin, a polycarbonate resin, a polyamide resin, a polyester resin, a polyurethane resin, or a urea resin.

2. Clathrate Compound

The host-group-containing polymerizable monomer of the present invention has a host group and is thus capable of forming a clathrate compound. Examples include clathrate compounds of a host-group-containing polymerizable monomer and a guest-group-containing vinyl monomer. Specific examples of clathrate compounds include clathrate compound 1 of the host-group-containing vinyl monomer described above and a guest-group-containing vinyl monomer described below and, clathrate compound 2 of the host-group-containing non-vinyl monomer described above and a compound having a functional group capable of undergoing a condensation reaction, which is described below. The host-group-containing non-vinyl monomer of clathrate compound 2 is, for example, a compound represented by formula (h50). The clathrate compound refers to a clathrate complex comprising a host-group-containing polymerizable monomer and another compound that is clathrated in the ring of the host group of the host-group-containing polymerizable monomer. In this specification, the cathrate complex can also be referred to as "clathrate monomer" because it is polymerizable.

Examples of guest-group-containing polymerizable monomers that can be used to form clathrate compound 1 are the same as those of the guest-group-containing vinyl monomer described above.

Specific examples of guest-group-containing non-vinyl monomers that can form clathrate compound 2 include compounds having a functional group capable of undergoing a condensation reaction.

Examples of compounds having a functional group capable of undergoing a condensation reaction include compounds having one or two amino groups, compounds having one or two hydroxy groups, compounds having one or two carboxy groups, compounds having one or two epoxy groups, compounds having one or two isocyanate groups, compounds having one or two thiol groups, and compounds having one or two carboxylic acid chlorides.

Examples of compounds having one or two amino groups include 1-adamantanamine, benzylamine, tert-butylamine, butylamine, 1-aminopyrene, aminoferrocene, 4-aminoazobenzene, 4-aminostilbene, cyclohexylamine, hexylamine, 4,4'-diaminodiphenylmethane, p-xylylenediamine, diaminoferrocene, 4,4'-diaminoazobenzene, 4,4'-diaminostilbene, 1,4-diaminocyclohexane, 1,6-diaminocyclohexane, α, ω-diaminopolyethylene glycol, α,ω-diaminopolypropylene glycol, 2,2-bis(4-aminophenyl) propane 1,1-bis(4-aminophenyl)-1-phenylethane, 2,2-bis(4-aminophenyl) hexafluoropropane, 2,2-bis(4-aminophenyl) butane, bis(4-aminophenyl)diphenylmethane, 2,2-bis(3-methyl-4-aminophenyl) propane, bis(4-aminophenyl)-2,2-dichloroethylene, 1,1-bis(4-aminophenyl) ethane, 2,2-bis(4-amino-3-isopropylphenyl)propane, 1,3-bis(2-(4-aminophenyl)-2-propyl)benzene, bis(4-aminophenyl) sulfone, 1,4-bis(2-(4-aminophenyl)-2-propyl)benzene, 5,5'-(1-methylethylidene)-bis[1,1'-(bisphenyl)-2-amine]propane, 1,1-bis(4-aminophenyl)-3,3,5-trimethylcyclohexane, 1,1-bis(4-aminophenyl)cyclohexane, and the like.

Examples of compounds having one or two hydroxy groups include 1-hydroxyadamantane, benzyl alcohol, tert-butyl alcohol, butyl alcohol, 1-hydroxypyrene, 1-hydroxymethylferrocene, 4-hydroxyazobenzene, 4-hydroxystilbene, cyclohexanol, hexanol, 4,4'-dihydroxydiphenylmethane, 2,2-bis(4-hydroxyphenyl) propane, 1,4-benzenedimethanol, 1,1'-dihydroxymethylferrocene, 4,4'-dihydroxyazobenzene, 4,4'-dihydroxystilbene, 1,4-cyclohexol, 1,6-hexanediol, polyethylene glycol, polypropylene glycol, 1,1-bis(4-hydroxyphenyl)-1-phenylethane, 2,2-bis(4-hydroxyphenyl) hexafluoropropane, 2,2-bis(4-hydroxyphenyl) butane, bis(4-hydroxyphenyl)diphenylmethane, 2,2-bis(3-methyl-4-hydroxyphenyl) propane, bis(4-hydroxyphenyl)-2,2-dichloroethylene, 1,1-bis(4-hydroxyphenyl) ethane, 2,2-bis(4-hydroxy-3-isopropylphenyl)propane, 1,3-bis(2-(4-hydroxyphenyl)-2-propyl)benzene, bis(4-hydroxyphenyl) sulfone, 1,4-bis(2-(4-hydroxyphenyl)-2-propyl)benzene, 5,5'-(1-methylethylidene)-bis[1,1'-(bisphenyl)-2-hydroxy]propane, 1,1-bis(4-hydroxyphenyl)-3,3,5-trimethylcyclohexane, 1,1-bis(4-hydroxyphenyl)cyclohexane, bisphenol A, and the like.

Examples of compounds having one or two carboxy groups include 1-carboxyadamantane, benzoic acid, pivalic acid, butanoic acid, 1-carboxypyrene, 1-carboxyferrocene, 4-carboxyazobenzene, 4-carboxystilbene, cyclohexanoic acid, hexanoic acid, 4,4'-dicarboxydiphenylmethane, 1,4-benzenedicarboxylic acid, 1,4-phenylenediacetic acid, 1,1'-dicarboxyferrocene, 4,4'-dicarboxyazobenzene, 4,4'-dicarboxystilbene, 1,4-cyclohexanedicarboxylic acid, 1,6-hexanedicarboxylic acid, α,ω-dicarboxypolyethylene glycol, α, ω-dicarboxypolypropylene glycol, 2,2-bis(4-carboxyphenyl)propane, 1,1-bis(4-carboxyphenyl)-1-phenylethane, 2,2-bis(4-carboxyphenyl) hexafluoropropane, 2,2-bis(4-carboxyphenyl) butane, bis(4-carboxyphenyl)diphenylmethane, 2,2-bis(3-methyl-4-carboxyphenyl) propane, bis(4-carboxyphenyl)-2,2-dichloroethylene, 1,1-bis(4-carboxyphenyl) ethane, 2,2-bis(4-carboxy-3-isopropylphenyl)propane, 1,3-bis(2-(4-carboxy)phenyl)-2-propyl)benzene, bis(4-carboxyphenyl) sulfone, 1,4-bis(2-(4-carboxyphenyl)-2-propyl)benzene, 5,5'-(1-methylethylidene)-bis[1,1'-(bisphenyl)-2-carboxy]propane, 1,1-bis(4-carboxyphenyl)-3,3,5-trimethylcyclohexane, 1,1-bis(4-carboxyphenyl)cyclohexane, and the like.

Examples of compounds having one or two carboxylic acid chlorides include 1-adamantanecarbonyl chloride, terephthaloyl chloride, trimethylacetyl chloride, butyryl chloride, 1-pyrenecarbonyl chloride, 1-ferrocenecarbonyl chloride, 4-azobenzenecarbonyl chloride, 4-stilbenecarbonyl chloride, cyclohexanecarbonyl chloride, hexyl chloride, 4,4'-diphenylmethanedicarbonyl chloride, 1,4-benzenedicarbonyl chloride, 1,4-phenylenedicarbonyl chloride, 1,1'-ferrocenedicarbonyl chloride, 4,4'-azobenzenedicarbonyl chloride, 4,4'-stilbenecarbonyl chloride, 1,4-cyclohexanedicarbonyl chloride, 1,6-hexanedicarbonyl chloride, α,ω-polyethyleneglycol dicarbonitrile chloride, α, ω-polypropyleneglycol dicarbonyl chloride, 2,2-bis(4-phenylcarbonylchloride)propane, 1,1-bis(4-phenylcarbonylchloride)-1-phenylethane, 2,2-bis(4-phenylcarbonylchloride)hexafluoropropane, 2,2-bis(4-phenylcarbonylchloride)butane, bis(4-phenylcarbonylchloride)diphenylmethane, 2,2-bis(3-methyl-4-phenylcarbonylchloride)propane, bis(4-phenylcarbonylchloride)-2,2-dichloroethylene, 1,1-bis(4-phenylcarbonylchloride)ethane, 2,2-bis(3-isopropylphenyl-4-carbonylchloride)propane, 1,3-bis(2-(4-phenylcarbonylchloride)-2-propyl)benzene, bis(4-phenylcarbonylchloride)sulfone, 1,4-bis(2-(4-phenylcarbonylchloride)-2-propyl)benzene, 5,5'-(1-methyl)ethylidene)-bis[1,1'-(bisphenyl)-2-carbonylchloride] propane, 1,1-bis(4-phenylcarbonylchloride)-3,3,5-trimethylcyclohexane, 1,1-bis(4-phenylcarbonylchloride)cyclohexane, and the like.

Examples of compounds having one or two epoxy groups include adamantane oxide, styrene oxide, 1,2-epoxybutane, 1-epoxypyrene, epoxyferrocene, 4-epoxyazobenzene, 4-epoxystilbene, cyclohexyl oxide, 1,2-epoxyhexane, 2,2'-bis(4-glycidyloxyphenyl)propane, p-diglycidyloxybenzene, diglycidyloxyferrocene, 4,4'-diglycidyloxyazobenzene, 4,4' diglycidyloxyferrocene, 1,4-diglycidyloxycyclohexane, 1,6-diglycidyloxycyclohexane, α,ω-diglycidyloxypolyethylene glycol, α,ω-diglycidyloxypolypropylene glycol, 1,1-bis(4-glycidyloxyphenyl)-1-phenylethane, 2,2-bis(4-glycidyloxyphenyl)hexafluoropropane, 2,2-bis(4-glycidyloxyphenyl) butane, bis(4-glycidyloxyphenyl)diphenylmethane, 2,2-bis(3-methyl-4-glycidyloxyphenyl)propane, bis(4- glycidyloxyphenyl)-2,2-dichloroethylene, 1,1-bis(4-glycidyloxyphenyl) ethane, 2,2-bis(4-glycidyloxy-3-isopropylphenyl)propane, 1,3-bis(2-(4-glycidyloxyphenyl)-2-propyl)benzene, bis(4-glycidyloxyphenyl) sulfone, 1,4-bis(2-(4-glycidyloxyphenyl)-2-propyl)benzene, 5,5'-(1-methylethylidene)-bis[1,1'-(bisphenyl)-2-glycidyloxy]propane, 1,1-bis(4-glycidyloxyphenyl)-3,3,5-trimethylcyclohexane, 1,1-bis(4-glycidyloxyphenyl)cyclohexane, and the like.

Examples of compounds having one or two isocyanate groups include 1-adamantane isocyanate, benzyl isocyanate, phenyl isocyanate, tert-butyl isocyanate, butyl isocyanate, 1-pyrene isocyanate, ferrocene isocyanate, azobenzene-4-isocyanate, stilbene-4-isocyanate, cyclohexane isocyanate, hexane isocyanate, 4,4'-phenylmethane diisocyanate, p-benzene diisocyanate, ferrocene-1,1'-diisocyanate, azobenzene-4,4'-diisocyanate, stilbene-4,4'-diisocyanate, cyclohexane-1,4-diisocyanate, cyclohexane-1,6-diisocyanate, polyethylene glycol diisocyanate, polypropylene glycol diisocyanate, 2,2-bis(4-phenylisocyanate)propane, 1,1-bis(4-phenylisocyanate)-1-phenylethane, 2,2-bis(4-phenylisocyanate)hexafluoropropane, 2,2-bis(4-phenylisocyanate)butane, bis(4-phenylisocyanate)diphenylmethane, 2,2-bis(3-methyl-4-phenylisocyanate)propane, bis(4-phenylisocyanate)-2,2-dichloroethylene, 1,1-bis(4-phenylisocyanate)ethane, 2,2-bis(3-isopropyl-4-phenylisocyanate)propane, 1,3-bis(2-(4-phenylisocyanate)-2-propyl)benzene, bis(4-phenylisocyanate)sulfone, 1,4-bis(2-(4-phenylisocyanate)-2-propyl)benzene, 5,5'-(1-methylethylidene)-bis[1,1'-(bisphenyl)-2-isocyanate]propane, 1,1-bis(4-phenylisocyanate)-3,3,5-trimethylcyclohexane, 1,1-bis(4-phenylisocyanate)cyclohexane, and the like.

Examples of compounds having one or two thiol groups include 1-adamantanethiol, benzylthiol, tert-mercaptan, butanethiol, 1-thiolpyrene, ferrocenethiol, 4-thioazobenzene, 4-thiostilbene, cyclohexylthiol, hexanethiol, 4,4'-dithiophenylmethane, p-benzenedithiol, 1,1'-dithioferrocene, 4,4'-dithioazobenzene, 4,4'-dithiostilbene, 1,4-dithiocyclohexane, 1,6-dithiocyclohexane, α,ω-dithiopolyethylene glycol, α,ω-dithiopolypropylene glycol, 1,1-bis(4-thiophenyl)-1-phenylethane, 2,2-bis(4-thiophenyl) hexafluoropropane, 2,2-bis(4-thiophenyl)butane, bis(4-thiophenyl)diphenylmethane, 2,2-bis(3-methyl-4-thiophenyl)propane, bis(4-thiophenyl)-2,2-dichloroethylene, 1,1-bis(4-thiophenyl)ethane, 2,2-bis(4-thio-3-isopropylphenyl)propane, 1,3-bis(2-(4-thiophenyl)-2-propyl)benzene, bis(4-thiophenyl)sulfone, 1,4-bis(2-(4-thiophenyl)-2-propyl)benzene, 5,5'-(1-methylethylidene)-bis[1,1'-(bisphenyl)-2-thiol]propane, 1,1-bis(4-thiophenyl)-3,3,5-trimethylcyclohexane, 1,1-bis(4-thiophenyl)cyclohexane, and the like.

The compound having a functional group capable of undergoing a condensation reaction and preferably used to form clathrate compound 2, is, for example, at least one member selected from the group consisting of 1-adamantanamine, 1-hydroxyadamantane, 4,4'-dihydroxydiphenylmethane, and 4,4'-diaminodiphenylmethane.

The functional group in the compound having a polymerizable functional group, which constitutes the above clathrate compound 2, is preferably an amino group, a hydroxy group, an epoxy group, a carboxy group, an isocyanate group, a thiol group, or carboxylic acid chloride.

Figure 25:
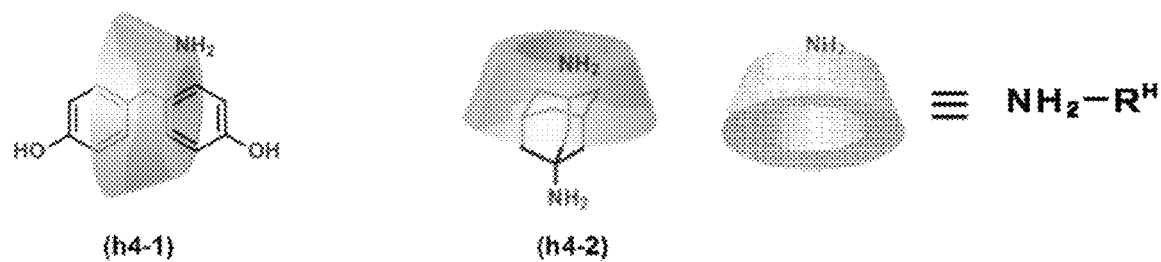
FIG. 25 shows clathrate compound 2 including structures represented by the formulas (h4-1) and (h4-2).

Examples of clathrate compound 2 include structures represented by the following formulas (h4-1) and (h4-2) as shown in FIG. 25.

In clathrate compound 2 represented by formula (h4-1) or (h4-2), $R^H$ is, for example, a group derived from 6-monodeoxy-6-monoamino-trimethyl-cyclodextrin. 6-Monodeoxy-6-monoamino-trimethyl-cyclodextrin can be considered to be a molecule formed by bonding between a host group and an amino group. The amino group in $NH_2-R^H$ can also play a role as a polymerizable functional group. On the other hand, the compound clathrated in the ring of the host group is 4,4'-dihydroxydiphenylmethane in formula (h4-1) and 1-adamantanamine in formula (h4-2).

In clathrate compound 1, the guest-group-containing vinyl monomer preferably has a size capable of penetrating the host group of the host-group-containing vinyl monomer. In clathrate compound 2, the compound having a functional group capable of undergoing a condensation reaction preferably has a size capable of penetrating the host group of the host-group-containing non-vinyl monomer. Penetrating the host group means passing through the ring of the host group. In this case, the polymer of clathrate compound 1 and the polymer of clathrate compound 2 are more likely to form movable crosslinked polymers described below.

Examples of the guest-group-containing polymerizable monomer of a size capable of penetrating the host group include methyl (meth)acrylate, ethyl (meth)acrylate, isoprene, 1,3-butadiene, (meth)acrylic acid, allylamine, styrene, maleic anhydride, and the like.

Examples of the compound having a functional group capable of undergoing a condensation reaction and having a size capable of penetrating the host group include 4,4'-dihydroxydiphenylmethane, 4,4'-diaminodiphenylmethane, polyethylene glycol, polypropylene glycol, α,ω-diaminopolyethylene glycol, α,ω-diaminopolypropylene glycol, and the like.

The clathrate compound can be suitably used as a starting material for forming a polymer contained in the macromolecular material described below.

The method for producing a clathrate compound is not particularly limited. For example, clathrate compound 1 can be produced by a method comprising the step of mixing the host-group-containing vinyl monomer and the guest-group-containing vinyl monomer to obtain a clathrate compound. A specific example of the method includes the "clathrate compound formation process" described below. The method for producing clathrate compound 2 is also not particularly limited, and a wide variety of known methods for producing clathrate compounds can be used. Clathrate compound 2 can be produced by a method comprising the step of mixing the host-group-containing non-vinyl monomer with the compound having a functional group capable of undergoing a condensation reaction to obtain clathrate compound 2.

3. Macromolecular Material

The macromolecular material of the present invention can contain a polymer of the host-group-containing polymerizable monomer. It is also preferable that the macromolecular material of the present invention contains a polymer of a polymerizable monomer mixture containing the host-group-containing polymerizable monomer. More specifically, it is also preferable that the macromolecular material of the present invention contains a polymer obtained by polymerization of a polymerizable monomer mixture. The polymerizable monomer mixture referred to herein has the same composition as the polymerizable monomer mixture described above. The polymer contained in the macromolecular material has a host group derived from a host-group-containing polymerizable monomer. The polymer may be a polymer consisting only of the host-group-containing polymerizable monomer, or a polymer of the polymerizable monomer mixture.

The polymerization of the host-group-containing polymerizable monomer or the polymerizable monomer mixture can be performed by a known method.

As a starting material for the polymerization, a host-group-containing polymerizable monomer alone or the polymerizable monomer mixture is used. When the polymerization is performed using a host-group-containing polymerizable monomer alone, the host-group-containing vinyl monomer is used as a host-group-containing polymerizable monomer. The host-group-containing vinyl monomer alone or the polymerizable monomer mixture used as a starting material for the polymerization is referred to below as "monomer A." The polymerization using monomer A may be referred to as "polymerization A."

Further, monomer A that consists only of a host-group-containing vinyl monomer, or monomer A that contains a host-group-containing vinyl monomer and at least one of the guest-group-containing polymerizable monomer and the third polymerizable monomer, is referred to as "monomer A1." Further, the polymerization using monomer A1 may be referred to as "polymerization A1."

When monomer A contains a host-group-containing non-vinyl monomer and a condensable monomer, monomer A is referred to as "monomer A2." The polymerization using monomer A2 may be referred to as "polymerization A2." The host-group-containing non-vinyl monomer of monomer A2 is, for example, a compound represented by formula (h50).

Just to note, when monomer A1 contains a guest-group-containing polymerizable monomer or a third polymerizable monomer, or both, at least two of Ra in formula (h1) or (h2), Ra in formula (g1), and Ra in formula (a1) may be the same, or Ra in these formulas may be all different from each other.

Polymerization A1

When monomer A1 contains a host-group-containing vinyl monomer, a guest-group-containing vinyl monomer, and a third polymerizable monomer, the amount of host-group-containing vinyl monomer can be 0.25 to 50 mol %, the amount of guest-group-containing vinyl monomer can be 0.25 to 50 mol %, and the amount of third polymerizable monomer can be 0 to 99.5 mol %, based on the total amount of these monomers. Preferably, the amount of host-group-containing vinyl monomer can be 0.25 to 20 mol %, the amount of guest-group-containing vinyl monomer can be 0.25 to 20 mol %, and the amount of third polymerizable monomer can be 40 to 99.5 mol %. More preferably, the amount of host-group-containing vinyl monomer can be 0.25 to 5 mol %, the amount of guest-group-containing vinyl monomer can be 0.25 to 5 mol %, and the amount of third polymerizable monomer can be 90 to 99.5 mol %. Particularly preferably, the amount of host-group-containing polymerizable monomer can be 1 to 3 mol %, the amount of guest-group-containing polymerizable monomer can be 1 to 3 mol %, and the amount of third polymerizable monomer can be 94 to 97 mol %, based on the total amount of the host-group-containing polymerizable monomer, the guest-group-containing polymerizable monomer, and the third polymerizable monomer.

When monomer A1 contains a host-group-containing polymerizable monomer and a third polymerizable monomer and does not contain a guest-group-containing polymerizable monomer, the amount of host-group-containing polymerizable monomer can be 0.25 to 50 mol %, and the amount of third polymerizable monomer can be 50 to 99.75 mol %, based on the total amount of the host-group-containing polymerizable monomer and the third polymerizable monomer. Preferably, the amount of host-group-containing polymerizable monomer can be 0.5 to 20 mol %, and the amount of third polymerizable monomer can be 80 to 99.5 mol %, based on the total amount of the host-group-containing polymerizable monomer and the third polymerizable monomer. More preferably, the amount of host-group-containing polymerizable monomer can be 0.75 to 10 mol %, and the amount of third polymerizable monomer can be 90 to 99.25 mol %, based on the total amount of the host-group-containing polymerizable monomer and the third polymerizable monomer. Particularly preferably, the amount of host-group-containing polymerizable monomer can be 1 to 5 mol %, and the amount of third polymerizable monomer can be 95 to 99 mol %, based on the total amount of the host-group-containing polymerizable monomer and the third polymerizable monomer.

Compared with conventional host-group-containing vinyl monomers, the host-group-containing vinyl monomer contained in monomer A1 has a very high affinity for the guest-group-containing vinyl monomer, and a particularly high affinity for hydrophobic third polymerizable monomers among third polymerizable monomers. Therefore, the use of the host-group-containing polymerizable monomer of the present invention can increase the proportions of a host-group-containing vinyl monomer and a guest-group-containing vinyl monomer in monomer A, although it has been difficult in view of affinity to increase the proportions of a host-group-containing vinyl monomer and a guest-group-containing vinyl monomer.

Accordingly, the use of the host-group-containing polymerizable monomer of the present invention allows for selecting the guest-group-containing polymerizable monomer and the third polymerizable monomer, and their proportions, from broader ranges and also provides a high degree of freedom in designing polymers.

Although restrictive interpretation of "hydrophobic third polymerizable monomer" referred to herein is not desired, for example, n-butyl methacrylate corresponds to hydrophobic third polymerizable monomer. Polymerizable monomers whose solubility in water is lower than that of n-butyl methacrylate can be referred to as "hydrophobic third polymerizable monomers."

Monomer A1 can be prepared by blending a host-group-containing vinyl monomer, a guest-group-containing vinyl monomer, and a third polymerizable monomer in predetermined amounts.

When monomer A1 contains a host-group-containing vinyl monomer and a guest-group-containing vinyl monomer, clathrate compound 1 of the host-group-containing vinyl monomer and the guest-group-containing vinyl monomer can also be formed.

For example, when a process comprising subjecting monomer A1 containing a host-group-containing vinyl monomer and a guest-group-containing vinyl monomer to an ultrasonic treatment and/or to a heat treatment is performed, clathrate compound 1 of the host-group-containing vinyl monomer and the guest-group-containing vinyl monomer can be obtained. The process for forming clathrate compound 1 may be referred to below as the "clathrate compound formation process."

The clathrate compound 1 can be formed by host-guest interaction between a host group and a guest group. When such a clathrate compound 1 is formed, monomer A1 can be a more homogeneous solution; therefore, the polymerization A1 more readily proceeds and host-guest interaction occurs more easily in the obtained polymer, whereby the obtained macromolecular material is more likely to have increased toughness and strength.

The ultrasonic treatment in the clathrate compound formation process is not particularly limited. For example, a known method can be used.

The conditions for the heat treatment in the clathrate compound formation process are also not particularly limited. For example, the heating temperature is 20 to 100° C., and preferably 50 to 80° C. The heating time is 1 minute to 12 hours, and preferably 15 minutes to 1 hour. The heating means is also not particularly limited, and examples include a method using a hot stirrer, a method using a thermostat bath, and the like. It is also possible to perform the ultrasonic treatment with heating, or in place of heating.

In the clathrate compound formation process, whether a clathrate compound has been formed can be determined, for example, by visual observation of the state of monomer A. Specifically, if no clathrate compound has been formed, monomer A is in the form of a suspension, or, when allowed to stand, in a phase-separation state. If a clathrate compound has been formed, monomer A can be in a viscous state, for example, in the form of a gel or a cream. Further, when a clathrate compound is formed, monomer A1 can be transparent.

Since the host group of the host-group-containing vinyl monomer contains a hydrocarbon group or the like, the host-group-containing vinyl monomer has a high affinity for the guest-group-containing vinyl monomer. Therefore, this host-group-containing vinyl monomer more easily forms a clathrate compound 1 compared with conventional host-group-containing vinyl monomers. Thus, when monomer A1 forms clathrate compound 1, monomer A1 more easily becomes a more homogenous solution, thus providing a macromolecular material with significantly increased toughness and strength.

When monomer A1 containing a clathrate compound 1 formed by the clathrate compound formation process is to be used as a starting material for polymerization A1 and monomer A further contains a third polymerizable monomer, the third polymerizable monomer can be added to the monomer A1 before or after the formation of clathrate compound 1. The polymerization initiator, solvent, etc. described below can also be added before or after the formation of clathrate compound 1.

In polymerization A1, a polymerization initiator can be used in addition to monomer A1. The type of polymerization initiator is not particularly limited, and known polymerization initiators can be used.

When monomer A1 is a radically polymerizable compound, such as a vinyl compound, examples of polymerization initiators include ammonium persulfate (which may be referred to below as "APS"), azobisisobutyronitrile (hereinafter sometimes referred to as "AIBN"), 2,2'-azobis[2-(2-imidazolin-2-yl)propane]dihydrochloride (hereinafter sometimes referred to as "VA-044"), 1,1'-azobis(cyclohexanecarbonitrile), di-tert-butylperoxide, tert-butylhydroperoxide, benzoyl peroxide, photopolymerization initiators (e.g., IRGACURE (registered trademark) series), and the like. The concentration of the radically polymerizable polymerization initiator can be, for example, 0.5 to 5 mol %, based on the total amount of the polymerizable monomer A.

When the above polymerization A1 is performed, other additives may also be added, if necessary. Examples of other additives include polymerization accelerators, crosslinking agents, and the like. Examples of polymerization accelerators include N,N,N',N'-tetramethylethylenediamine and the like. The concentration of the polymerization accelerator can be, for example, 0.5 to 5 mol %, based on the total amount of monomer A1.

Polymerization A1 can be performed using a solvent. When a solvent is used, the type of solvent is not particularly limited. The amount of solvent used is also not particularly limited.

Alternatively, polymerization A1 can be performed in the absence of a solvent. Since monomer A1 contains a host-group-containing vinyl monomer and in particular, the host group has a hydrocarbon group or the like, monomer A1 has a high affinity for both hydrophilic polymerizable monomers and hydrophobic polymerizable monomers. Therefore, in polymerization A, monomer A1 can form a homogenous solution even without using a solvent.

Accordingly, in view of simplifying the production process and easily obtaining a polymer with excellent toughness and strength, polymerization A1 is preferably performed in the absence of a solvent.

Among host-group-containing monomers, host-group-containing vinyl monomers have particularly excellent affinity for hydrophobic polymerizable monomers. Therefore, when the guest-group-containing polymerizable monomer and the third polymerizable monomer in monomer A1 are hydrophobic, polymerization A1 can be particularly easily performed in the absence of a solvent by using a host-group-containing vinyl monomer.

The polymer obtained by polymerization A1 in the absence of a solvent is not affected by plasticization effects of solvents etc., and thus has greater toughness and strength.

Polymerization A1 can be performed under appropriate conditions according to, for example, the polymerizability of monomer A1, components of monomer A, type of polymerization initiator, and half-life temperature. For example, when monomer A1 is radically polymerizable, the temperature for polymerization A1 can be 0 to 100° C., and preferably 20 to 25° C.

Polymerization A1 can also be performed by photopolymerization, such as irradiation with ultraviolet rays or the like; and in particular, when radical polymerization is performed in the absence of a solvent, photopolymerization can be preferably used. A photopolymerization initiator can be used for photopolymerization. In photopolymerization, polymerization can be performed by irradiation with UV light at a wavelength of 200 to 400 nm.

The time for polymerization A1 is not particularly limited. The reaction time can be, for example, 1 minute to 24 hours, and preferably 1 hour to 24 hours.

A polymer of monomer A1 can be obtained by polymerization A1 as described above. A polymer obtained by polymerization A1 of monomer A1 is referred to below as "polymer A1."

Polymer A1

When polymer A1 contains a host-group-containing vinyl monomer and the third polymerizable monomer and does not contain a guest-group-containing vinyl monomer, polymer A1 refers to a copolymer obtained by polymerization of a host-group-containing vinyl monomer and the third polymerizable monomer (referred to as "polymer A1-1"). When the polymerizable monomer mixture contains a host-group-containing vinyl monomer and a guest-group-containing vinyl monomer and does not contain the third polymerizable monomer, polymer A1 refers to a copolymer obtained by polymerization of a host-group-containing vinyl monomer and a guest-group-containing vinyl monomer (referred to as "polymer A1-2"). When the polymerizable monomer mixture contains a host-group-containing vinyl monomer, a guest-group-containing vinyl monomer, and the third polymerizable monomer, polymer A refers to a copolymer obtained by polymerization of a host-group-containing vinyl monomer, a guest-group-containing vinyl monomer, and the third polymerizable monomer (referred to as "polymer A1-3"). When polymer A1 is a copolymer, polymer A1 may be any of the above embodiments, i.e., polymer A1-1, polymer A1-2, or polymer A1-3.

When polymer A1 is polymer A1-1, polymer A1-1 can be a movable crosslinked polymer depending on the types of host-group-containing vinyl monomer and third polymerizable monomer used. The term "movable crosslinked polymer" as used herein means that the crosslinking point in the polymer is formed in a shiftable (manner. The movable crosslinked polymer refers to, for example, a polymer having such a structure that the main chain of another polymer penetrates the ring of the host group bound to the side chain of the polymer (a cyclodextrin structure), and the main chain can slide through the ring of the host group. When the macromolecular material is a movable crosslinked polymer, the polymer can have greater toughness.

For example, when monomer A1 contains a third polymerizable monomer of a size capable of penetrating the host group of the host-group-containing vinyl monomer, the polymer of the polymerizable monomer mixture more easily forms a movable crosslinked polymer. This is because the polymerization proceeds while the third polymerizable monomer penetrates the ring of the host group (a cyclodextrin structure).

Even when monomer A1 contains the above clathrate monomer as a host-group-containing vinyl monomer and the above condensable monomer as a third polymerizable monomer, a polymer of the polymerizable monomer mixture can form a movable crosslinked polymer.

Whether polymer A1-1 forms a movable crosslinked polymer can be determined, for example, from the results of a swelling test of polymer A1. For example, in the swelling test, polymer A1-1 is prepared without using a chemical crosslinking agent and the obtained polymer A1-1 is added to a solvent. When the polymer does not dissolve and a swelling phenomenon is observed, it can be determined that a movable crosslinked polymer has been formed. When the polymer dissolves, it can be determined that a movable crosslinked polymer has not been formed.

Since the movable crosslinked polymer has a crosslinked structure and also has crosslinking points formed in a shiftable manner, the polymer chain can slide through the ring of the host group. Based on this structure, even if stress is applied to the movable crosslinked polymer, the stress-relieving effect is exhibited, and so the movable crosslinked polymer can have excellent toughness and strength and can be a material with excellent fracture energy. From this viewpoint, the macromolecular material preferably contains a polymer of monomer A1 containing a polymerizable monomer of a size capable of penetrating the host group of the host-group-containing vinyl monomer.

The macromolecular material can further contain a polymer having a guest group capable of having host-guest interaction with the host group contained in polymer A1. The polymer having a guest group may be a polymer different from, or the same as, polymer A1 above. In the latter case, polymer A1 contains both host and guest groups, and examples include polymer A1-2 or polymer A1-3, each obtained by polymerization of monomer A1 containing a guest-group-containing vinyl monomer. When a third polymerizable monomer of a size capable of penetrating the host group of the host-group-containing vinyl monomer is used in polymer A1-3, polymer A1-3 may also form a movable crosslinked polymer as described above.

When polymer A1 does not contain a guest group, for example, a polymer having a guest group is separately prepared and mixed with polymer A1, whereby a macromolecular material having a host group and a guest group can be produced. In this case, the polymer having a guest group can be produced by a known method. For example, the polymer can be produced by using a monomer containing the guest-group-containing vinyl monomer. The method for mixing polymer A not containing a guest group and a polymer containing a guest group is also not particularly limited. For example, a method comprising mixing these polymers in a solvent can be used.

When the macromolecular material contains a polymer having a host group and a guest group, or contains both a polymer having a host group and a polymer having a guest group, host-guest interaction occurs, whereby the polymers can be crosslinked with each other, and so the macromolecular material can have excellent toughness and strength.

Preferable examples of combinations of a host group and a guest group are such that when the host group is derived from an α-cyclodextrin derivative, the guest group is preferably at least one member selected from the group consisting of octyl and dodecyl; and when the host group is derived from a β-cyclodextrin derivative, the guest group is preferably at least one member selected from the group consisting of adamantyl and isobornyl; when the host group is derived from a γ-cyclodextrin derivative, the guest group is preferably at least one member selected from the group consisting of octyl, dodecyl, cyclododecyl, and adamantyl.

The macromolecular material can contain a polymer of monomer A1 containing the above clathrate compound 1. This polymer can also be crosslinked by host-guest interaction. In particular, since this polymer is obtained by polymerization in the state of a clathrate compound formed by host-guest interaction, more points of host-guest interaction are formed in the polymer, and so the macromolecular material can have further excellent toughness and strength.

Here, when polymer A1 contained in the macromolecular material is a polymer of monomer A1 containing a polymerizable monomer represented by formula (h1) above, the host group is bound to $R^1$ via —O—$CH_2$— (which may be referred to below as a "linker"). Specifically, the host group is bound to the oxygen atom of the linker, and one end of $R^1$ is bound to the carbon atom of the linker. Because the host group $R^H$ is bound to the side chain via this linker, the host group $R^H$ has a higher degree of freedom than without the linker. This high degree of freedom of the host group $R^H$ makes it likely for the host group and the guest group to have host-guest interaction, and thus easily form a crosslinked polymer, resulting in a stable structure of the macromolecular material and thus achieving significantly improved toughness and strength.

One of the reasons for this great toughness and strength of the macromolecular material is a high degree of freedom of the host group bound via a linker. More specifically, due to the high degree of freedom of the host group, the dissociation of host-guest interaction is unlikely to occur, thereby enhancing the toughness of the macromolecular material and thus providing the macromolecular material with high strength. The details are described with reference to FIG. 1.

FIG. 1 is a diagram of an example of host-guest interaction in polymer A1. As shown in FIG. 1, the host group (a group formed by removing one hydroxy group from an α-cyclodextrin derivative) bound to the side chain of a polymer via a linker is distant from the main chain of the polymer because of the presence of the linker, and also has a high degree of rotational freedom because of the presence of the linker. Thus, when stress is applied to a crosslinking point of the crosslinked polymer, the guest group (dodecyl) is unlikely to slip out of the host group, which provides a high degree of toughness.

Polymerization A2

On the other hand, the host-group-containing non-vinyl monomer in monomer A2 preferably forms the above clathrate compound 2. More specifically, monomer A2 preferably contains clathrate compound 2.

The method for producing clathrate compound 2 is not particularly limited, and a wide variety of known methods for producing clathrate compounds can be used. For example, the mixing ratio of the host-group-containing non-vinyl monomer to the compound having a functional group capable of undergoing a condensation reaction may be, for example, the host-group-containing non-vinyl monomer: the compound having a functional group capable of undergoing a condensation reaction=10:1 to 1:10, preferably 3:1 to 1:3, and more preferably 2:1 to 1:2, on a molar ratio basis. The mixing ratio of the host-group-containing non-vinyl monomer to the compound having a functional group capable of undergoing a condensation reaction can also be 1:1 (molar ratio).

The proportions of clathrate compound 2 and the condensable monomer in monomer A2 are not particularly limited. Based on the total amount of clathrate compound 2 and the condensable monomer, the amount of clathrate compound 2 can be, for example, 0.1 to 20 mol % and, the amount of condensable monomer can be, for example, 80 to 99.9 mol %. The amount of clathrate compound 2 is preferably 0.1 to 5 mol %, and the amount of condensable monomer is preferably 95 to 99 mol %.

Condensable monomers can be used singly, or in a combination of two or more. Two or more condensable monomers can be used in combination. For example, a combination of a compound having two or more epoxy groups and a compound having two or more hydroxy groups can be used as condensable monomers.

In polymerization A2, a polymerization initiator can be used in addition to monomer A2. The type of polymerization initiator is not particularly limited, and a known polymerization initiator can be used. The polymerization initiator (polymerization catalyst) can be any of a wide variety of known polymerization initiators used in condensation polymerization and the like. Examples include N,N-dimethylbenzylamine, triethylenediamine, N-methylmorpholine, N,N-dimethyldidodecylamine, N-dodecylmorpholine, N,N-dimethylcyclohexylamine, N-ethylmorpholine, and dimethylethanolamine. The polymerization initiator (polymerization catalyst) can be an organic metal, such as dibutyltin diacetate. The amount of polymerization catalyst used can be, for example, 0.5 to 5 wt. %, based on the total amount of monomer A.

Polymerization A2 can be performed using a solvent. When a solvent is used, the type of solvent is not particularly limited. The amount of solvent used is also not particularly limited. Alternatively, polymerization A2 can also be performed in the absence of a solvent.

The reaction temperature of polymerization A2 can be 0 to 500° C. For example, when the obtained macromolecular material is an epoxy resin, the reaction temperature is preferably 180 to 210° C.; when the obtained material is a polyurethane resin, the reaction temperature is preferably 40 to 70° C.

The reaction time for polymerization A2 is not particularly limited. The reaction time can be 1 minute to 24 hours, and preferably 1 hour to 24 hours.

A polymer of monomer A2 can be obtained by polymerization A2 described above. The polymer obtained by subjecting monomer A2 to polymerization A2 may be referred to below as "polymer A2."

Polymer A2

Polymer A2 is, for example, a polymer of monomer A2 containing the above clathrate compound 2. Examples include epoxy resins, polycarbonate resins, polyamide resins, polyester resins, polyurethane resins, urea resins, and the like.

In particular, polymer A2 is preferably a polymer of monomer A2 containing a polymerizable monomer of a size capable of penetrating the host group of the host-group-containing polymerizable monomer. In this case, polymer A2 is more likely to form the movable crosslinked polymer and has excellent toughness and strength, thus easily providing a macromolecular material with excellent fracture energy. The reason why the movable crosslinked polymer is formed is the same as for polymer A1.

Macromolecular Material

The macromolecular material can be formed of polymer A1 alone or polymer A2 alone. As long as the effect of the present invention is not impaired, the macromolecular material can contain one or more polymers other than polymer A1 or polymer A2. As long as the effect of the present invention is not impaired, the macromolecular material can be formed as a composite material comprising one or more materials other than polymer A1 and polymer A2.

The macromolecular material can be produced by a method comprising the step of obtaining a polymer by the above polymerization A1 or A2. The method for producing the macromolecular material can be performed without using a solvent, as described above. The production in the absence of a solvent is preferable in view of simplifying the process for producing the macromolecular material and easily producing a macromolecular material with excellent toughness and strength.

When polymer A1 does not have a guest group, a guest-group-containing polymer prepared separately is mixed with the polymer not having a guest group to form a polymer mixture as described above, whereby a macromolecular material can be formed.

The shape of the macromolecular material is not particularly limited. For example, the macromolecular material can be formed into a membrane, a film, a sheet, particles, a plate, a block, pellets, a powder, or the like.

The macromolecular material has excellent toughness and strength, and can be produced by a simple process. Therefore, the macromolecular material can find various applications. For example, the macromolecular material is suitable for use as various components, such as for automotive applications, electronic parts applications, building material applications, food container applications, and transport container applications.

EXAMPLES

Examples are given below to illustrate the present invention in more detail; however, the present invention is not limited to these Examples.

Production Example 1: Production of N-Me-TMγCDAAmMe 0.95 mmol of a compound represented by the following formula (7-1) was weighed and placed in a Schlenk flask, and nitrogen replacement was performed.

(7-1)

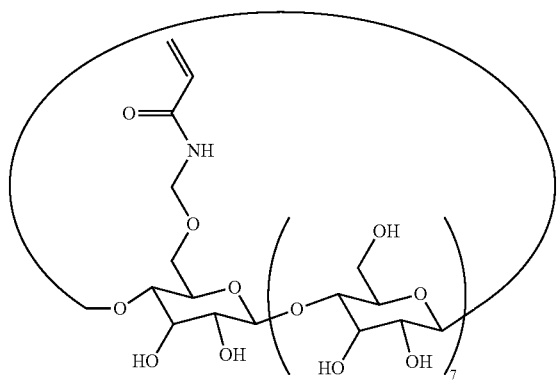

The compound represented by formula (7-1) was prepared as described below. 5 g (3.9 mmol) of γ-cyclodextrin, 700 mg (6.9 mmol) of N-hydroxymethyl acrylamide, and 95 mg (0.6 mmol) of p-toluenesulfonic acid monohydrate were weighed and placed in a 200-mL round-bottom glass flask, and the mixture was added to 25 mL of N,N-dimethylformamide, thereby preparing a mixture. The mixture was heated to 90° C. in an oil bath, and then heated with stirring for 1 hour, thereby obtaining a reaction liquid. Subsequently, the reaction liquid was cooled and poured into 45 mL of strongly stirred acetone. The formed precipitate was filtered off and washed with 10 mL of acetone three times, followed by drying at room temperature under reduced pressure for 1 hour, thereby obtaining a reaction product. This reaction product was dissolved in 100 mL of distilled water and passed through a column packed with a porous polystyrene resin (Mitsubishi Chemical Corporation Diaion HP-20) (apparent density: 600 g/L) to allow for adsorption for 30 minutes. Instead of this column, preparative high-pressure liquid chromatography was used to perform separation and purification in some cases. Thereafter, the solution component was removed, and 50 mL of a 10% methanol (or acetonitrile) aqueous solution was further passed through the column three times to wash the polystyrene resin, thereby removing unreacted β-cyclodextrin. Subsequently, 500 mL of a 25% methanol aqueous solution was passed through the column twice to elute acrylamide methyl γ-cyclodextrin (referred to below as "γCDAAmMe"), which was the target product. The solvent was removed under reduced pressure, thereby obtaining 809 mg of a white powder (the compound represented by formula (7-1)). The yield was about 15%.

30 mL of dehydrated N,N-dimethylformamide was added to a Schlenk flask containing a weighed compound represented by formula (7-1), and the mixture was stirred with ice cooling. 85.5 mmol of sodium hydride and 85.5 mmol of methyl iodide were further added thereto, and the mixture was stirred for 48 hours. Thereafter, 10 mL of water was added to the Schlenk flask for quenching. The resulting solution was dried under reduced pressure with an evaporator and dissolved in 50 mL of a saturated sodium chloride aqueous solution (containing 200 mg of sodium thiosulfate pentahydrate), followed by extraction with 50 mL of toluene three times. The extracted toluene layer was dried with an evaporator. The obtained solids were dissolved in 50 mL of methanol and washed with 50 mL of hexane, followed by drying the methanol layer with an evaporator, thereby obtaining a host-group-containing polymerizable monomer represented by formula (h1-3) described above, which was the target product. This host-group-containing polymerizable monomer is referred to as "N-Me-TMγCDAAmMe."

Figure 11:
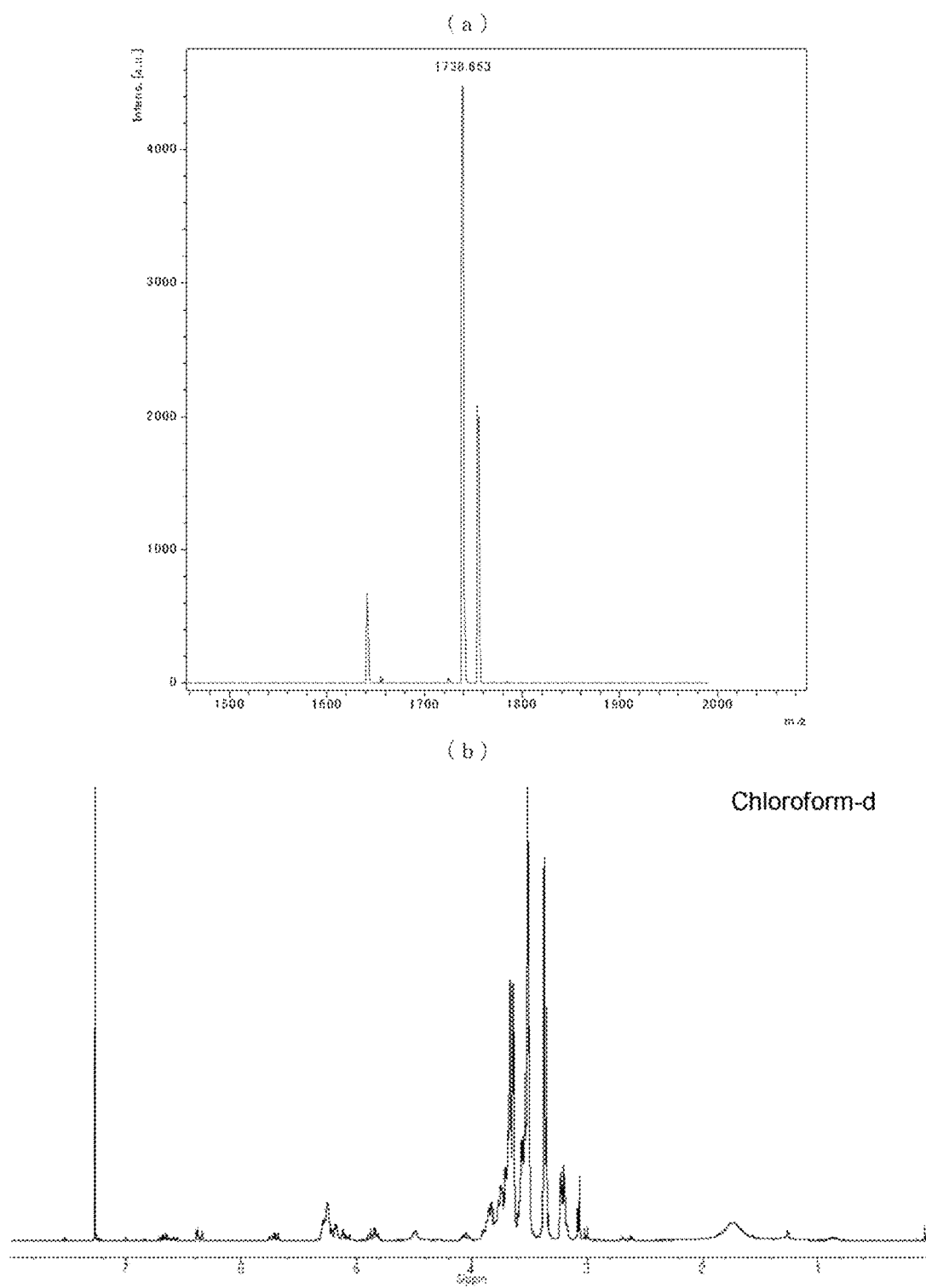
FIG. 11(a) and FIG. 11(b) respectively show results of the mass spectrum and NMR spectrum of the product of Production Example 1.

FIG. 11(a) and FIG. 11(b) respectively show the results of the mass spectrum and NMR spectrum of N-Me-TMγCDAAmMe. From these results, formation of the target N-Me-TMγCDAAmMe was confirmed. All of the hydroxy groups (100%) present per molecule of the cyclodextrin derivative in N-Me-TMγCDAAmMe were confirmed to have been replaced with methyl.

Production Example 2: Production of N-Me-TMβCDAAm

A host-group-containing polymerizable monomer represented by formula (h2-2) described above was obtained in the same manner as in Production Example 1, except that a compound represented by the following formula (7-2) was used instead of the compound represented by formula (7-1). This host-group-containing polymerizable monomer is referred to as "N-Me-TMβCDAAm."

(7-2)

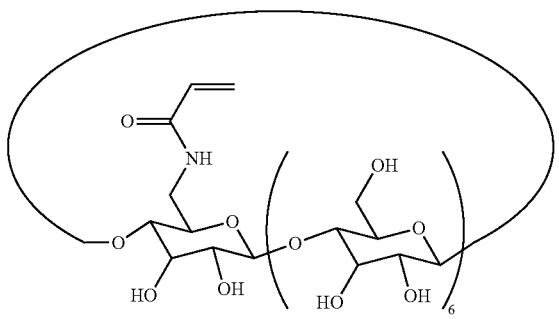

Figure 12:
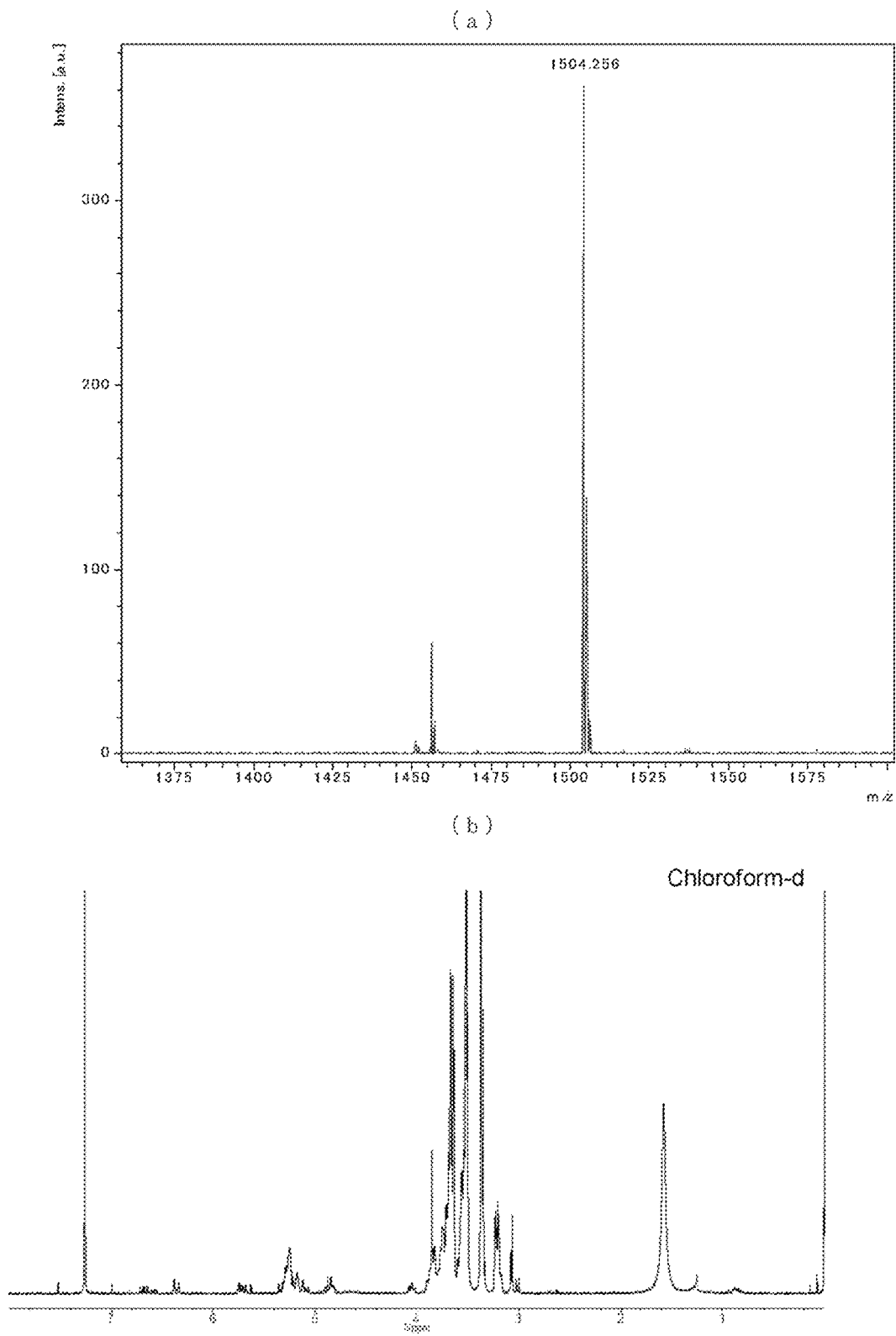
FIG. 12(a) and FIG. 12(b) respectively show the results of the mass spectrum and NMR spectrum of the product of Production Example 2.

FIG. 12(a) and FIG. 12(b) respectively show the results of the mass spectrum and NMR spectrum of N-Me-TMβCDAAm. From these results, formation of the target N-Me-TMβCDAAm was confirmed. All of the hydroxy groups (100%) present per molecule of the cyclodextrin derivative in N-Me-TMβCDAAm were confirmed to have been replaced with methyl.

Production Example 3: Production of N-Me-TMαCDAAmMe

A host-group-containing polymerizable monomer represented by formula (h1-1) described above was obtained in the same manner as in Production Example 1, except that a compound represented by the following formula (7-3) below was used instead of the compound represented by formula (7-1). This host-group-containing polymerizable monomer is referred to as "N-Me-TMαCDAAmMe." The compound represented by formula (7-3) was produced in the same manner as in the production of the compound represented by formula (7-1), except that α-cyclodextrin was used instead of γ-cyclodextrin.

(7-3)

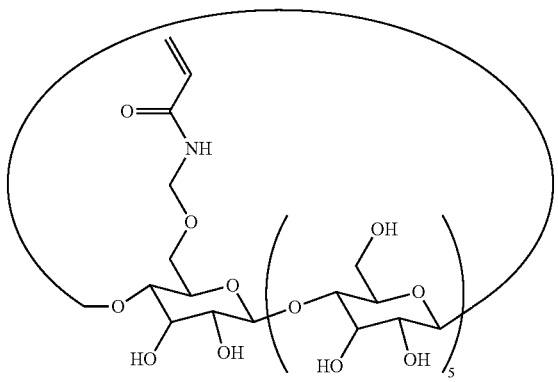

Figure 13:
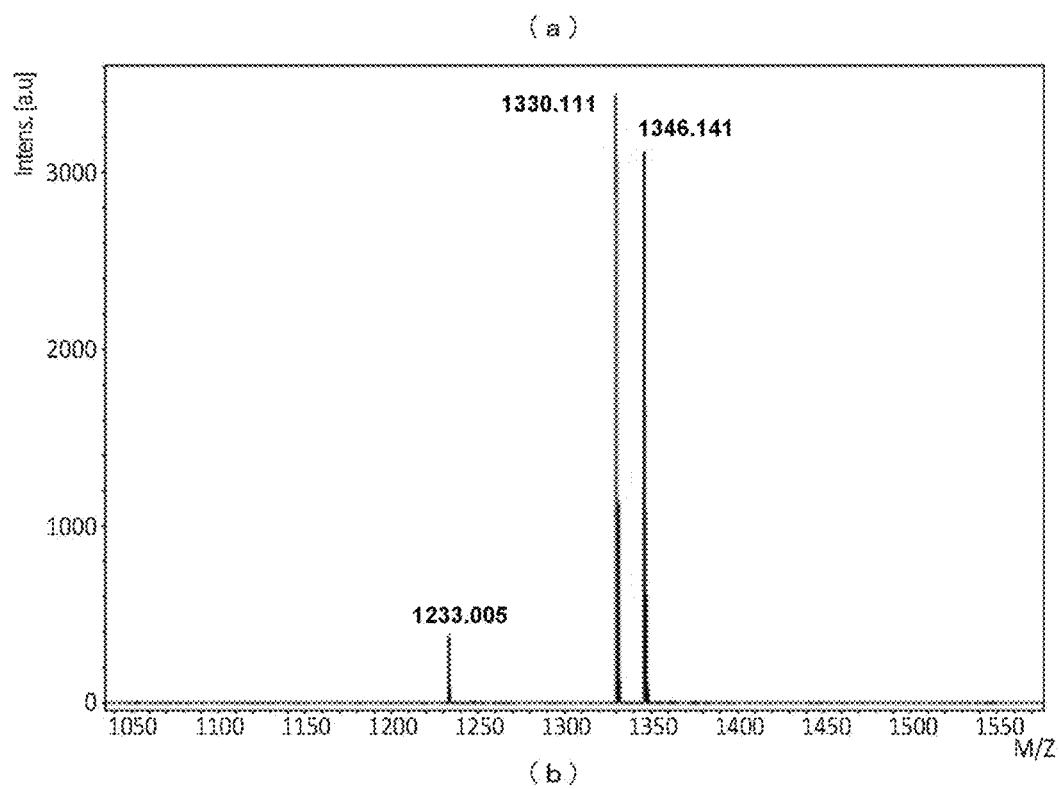
FIG. 13(a) and FIG. 13(b) respectively show the results of the mass spectrum and NMR spectrum of the product of Production Example 3.
Figure 13:
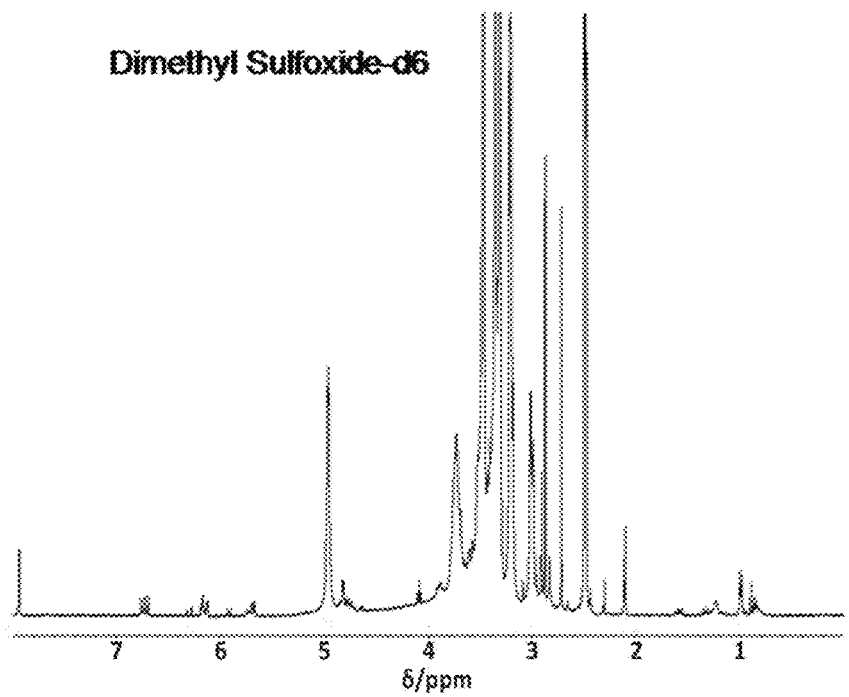

FIG. 13(a) and FIG. 13(b) respectively show the results of the mass spectrum and NMR spectrum of N-Me-TMαCDAAmMe. From these results, formation of the target N-Me-TMαCDAAmMe was confirmed. All of the hydroxy groups (100%) present per molecule of the cyclodextrin derivative in N-Me-TMαCDAAmMe were confirmed to have been replaced with methyl.

Production Example 4: Production of N-Me-TMβCDAAmMe

A host-group-containing polymerizable monomer represented by formula (h1-2) described above was obtained in the same manner as in Production Example 1, except that a compound represented by the following formula (7-4) was used instead of the compound represented by formula (7-1). This host-group-containing polymerizable monomer is referred to as "N-Me-TMβCDAAm." The compound represented by formula (7-4) was produced in the same manner as in the production of the compound represented by formula (7-1), except that β-cyclodextrin was used instead of γ-cyclodextrin.

Production Example 5: Production of N—H-TMγCDAAmMe 0.95 mmol of a compound represented by the following formula (7-5) was weighed and placed in a Schlenk flask, and nitrogen replacement was performed. Subsequently, 30 mL of dehydrated N,N-dimethylformamide was added to the Schlenk flask, and the mixture was stirred with ice cooling. 85.5 mmol of sodium hydride and 85.5 mmol of methyl iodide were further added thereto, and the mixture was stirred for 48 hours. Thereafter, 10 mL of water was added to the Schlenk flask for quenching. The resulting solution was dried under reduced pressure with an evaporator and dissolved in 50 mL of a saturated sodium chloride aqueous solution (containing 200 mg of sodium thiosulfate pentahydrate), followed by extraction with 50 mL of toluene three times. The extracted toluene layer was dried with an evaporator. The obtained solids were dissolved in 50 mL of methanol and washed with 50 mL of hexane, followed by drying the methanol layer with an evaporator. The obtained solids were dissolved in 20 mL of water, and 1.4 mmol of trifluoroacetic acid was added thereto, followed by stirring for 1 hour. The obtained solution was dried under reduced pressure with an evaporator and dissolved in 50 mL of a saturated sodium chloride aqueous solution, followed by extraction with 50 mL of toluene three times. The extracted toluene layer was dried with an evaporator. The obtained solids were dissolved in 10 mL of N,N-dimethylformamide, and 2.9 mmol of N-hydroxymethyl acrylamide and 0.095 mmol of p-toluenesulfonic acid monohydrate were added thereto, followed by stirring at 90° C. for 4 hours. The obtained solution was dried under reduced pressure with an evaporator and dissolved in 50 mL of a saturated sodium chloride aqueous solution, followed by extraction with 50 mL of toluene three times. The extracted toluene layer was dried with an evaporator, thereby obtaining a host-group-containing polymerizable monomer represented by formula (h1-6) described above, which was the target product. This host-group-containing polymerizable monomer is referred to as "N—H-TMγCDAAmMe."

(7-4)

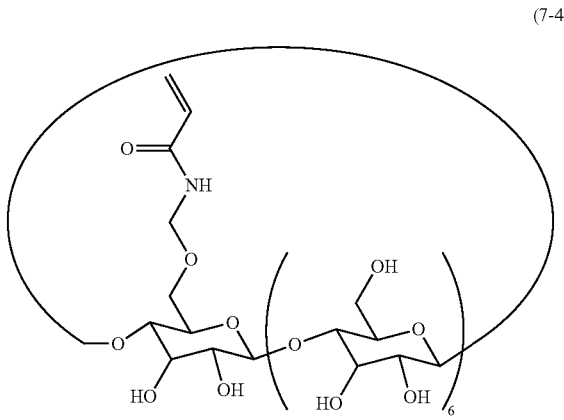

(7-5)

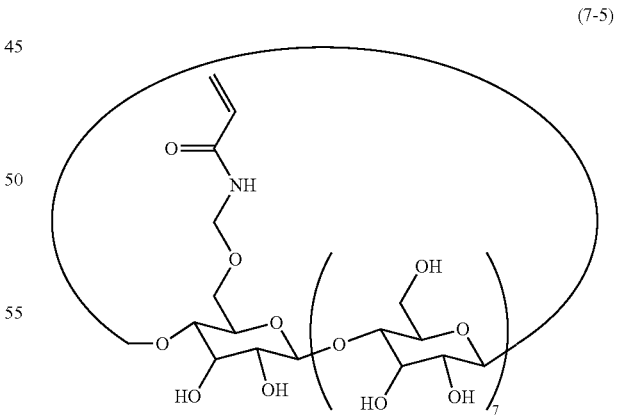

Figure 14:
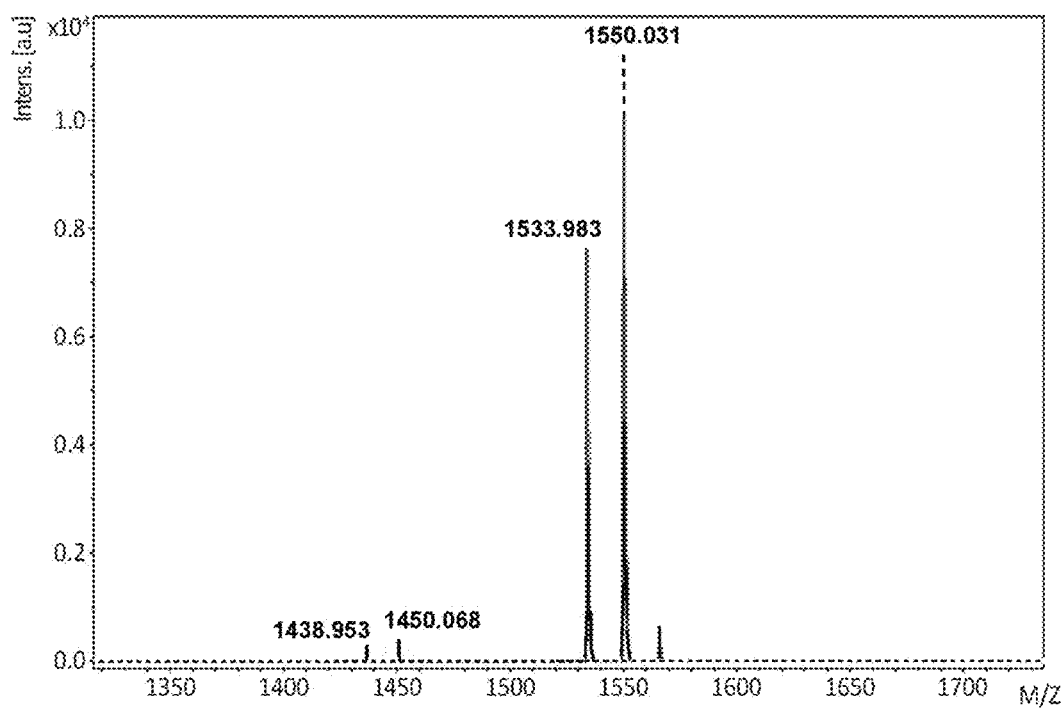
FIG. 14(a) and FIG. 14(b) respectively show the results of the mass spectrum and NMR spectrum of the product of Production Example 4.
Figure 14:
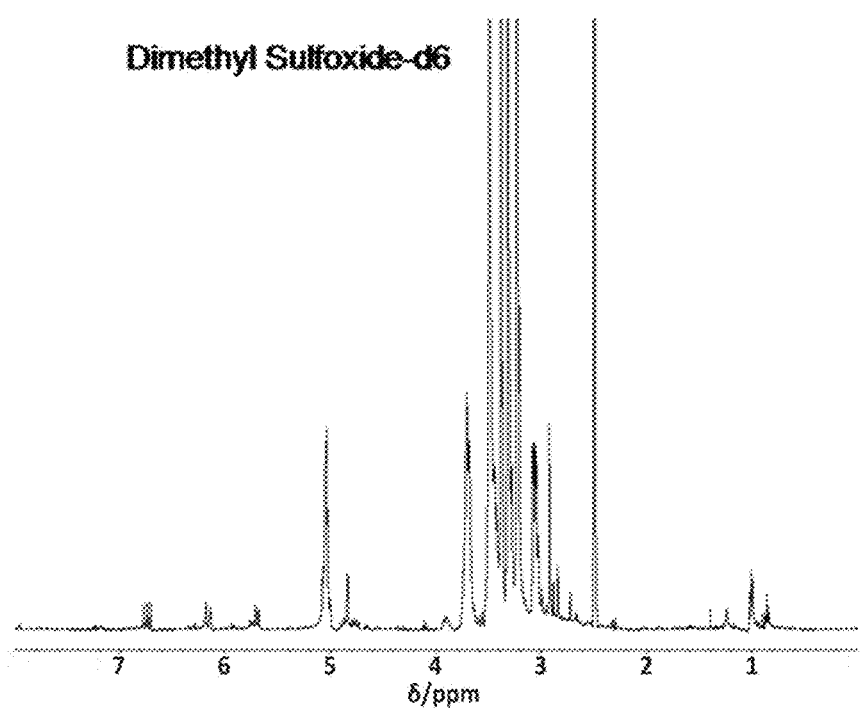

FIG. 14(a) and FIG. 14(b) respectively show the results of the mass spectrum and NMR spectrum of N-Me-TMβCDAAmMe. From these results, formation of the target N-Me-TMβCDAAmMe was confirmed. All of the hydroxy groups (100%) present per molecule of the cyclodextrin derivative in N-Me-TMβCDAAmMe were confirmed to have been replaced with methyl.

Figure 15:
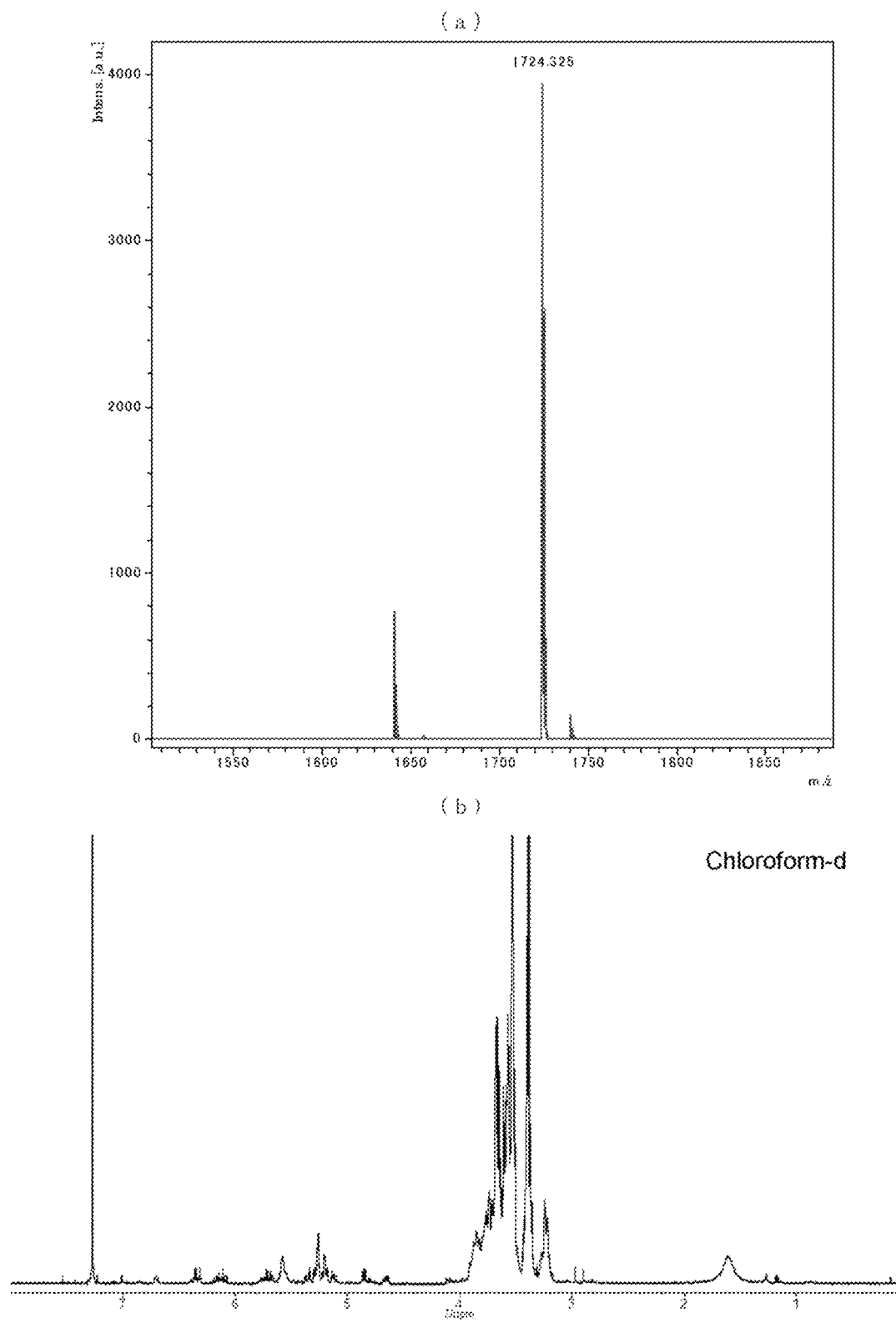
FIG. 15(a) and FIG. 15(b) respectively show the results of the mass spectrum and NMR spectrum of the product of Production Example 5.

FIG. 15(a) and FIG. 15(b) respectively show the results of the mass spectrum and NMR spectrum of N—H-TMγCDAAmMe. From these results, formation of the target N—H-TMγCDAAmMe was confirmed. All of the hydroxy groups (100%) present per molecule of the cyclodextrin derivative in N—H-TMγCDAAmMe were confirmed to have been replaced with methyl.

Production Example 6: Production of N—H-TAcγCDAAmMe 20 g of γCDAAmMe was dissolved in 300 mL of pyridine, and 170.133 g of acetic anhydride was added thereto, followed by stirring at 55° C. for more than 12 hours. Thereafter, 50 mL of methanol was added thereto for quenching, and the content was concentrated to a volume of 200 mL with an evaporator. The obtained concentrated solution was added dropwise to 2000 mL of water to collect the precipitate. The precipitate was dissolved in 200 mL of acetone and added dropwise to 2000 mL of water to collect the formed precipitate. The precipitate was dried under reduced pressure, thereby isolating N—H-TAcγAAmMe, which was the target product. From the results of the mass spectrum and NMR spectrum, formation of the target N—H-TAcγAAmMe was confirmed. All of the hydroxy groups (100%) present per molecule of the cyclodextrin derivative in N—H-TAcγAAmMe were confirmed to have been replaced with acetyl, and N—H-TAcγAAmMe was confirmed to be a host-group-containing polymerizable monomer represented by formula (h1-9) described above.

Production Example 7: Production of N—H-TAcβCDAAmMe

A host-group-containing polymerizable monomer represented by formula (h1-8) described above was obtained in the same manner as in Production Example 6, except that βCDAAmMe was used instead of γCDAAmMe. This host-group-containing polymerizable monomer is referred to as "N—H-TAcβCDAAmMe." From the results of the mass spectrum and NMR spectrum of N—H-TAcβCDAAmMe, formation of the target N—H-TAcβCDAAmMe was confirmed. All of the hydroxy groups (100%) present per molecule of the cyclodextrin derivative in N—H-TAcβCDAAmMe were confirmed to have been replaced with acetyl.

Production Example 8

150 mg of γCDAAmMe was weighed and placed in a Schlenk flask, and nitrogen replacement was performed. 2 mL of DMSO and 1062 mg of ethyl isocyanate were added to the Schlenk flask, and the mixture was stirred for 48 hours, thereby obtaining a product.

Figure 17:
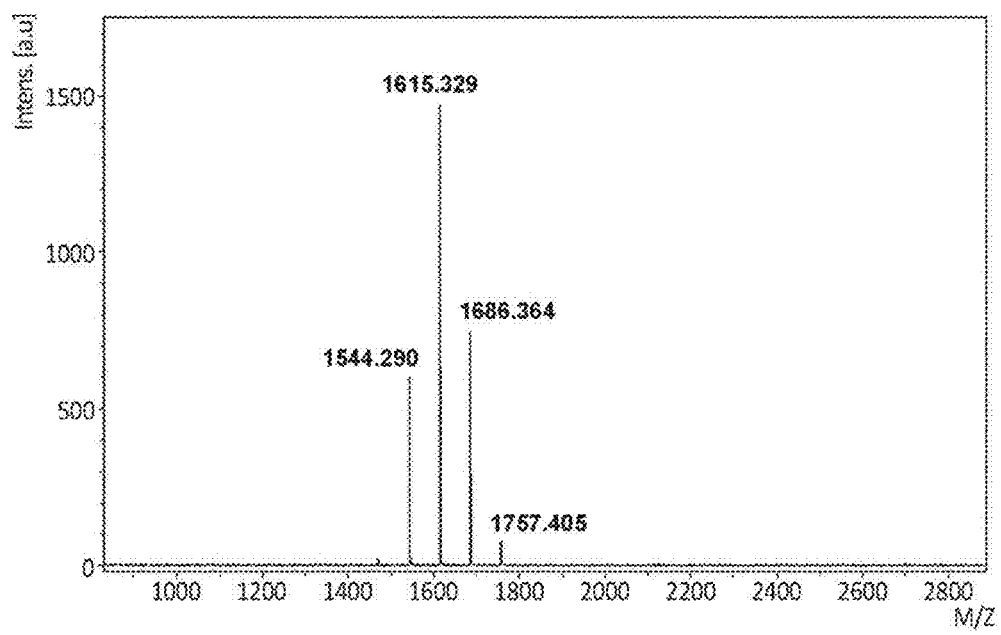
FIG. 17 shows the result of the mass spectrum of the product of Production Example 8.

FIG. 17 shows the result of the mass spectrum of the product. From the result, two to five hydroxy groups of γCDAAmMe were confirmed to have been replaced with ethyl carbamate.

Production Example 9

Figure 26:
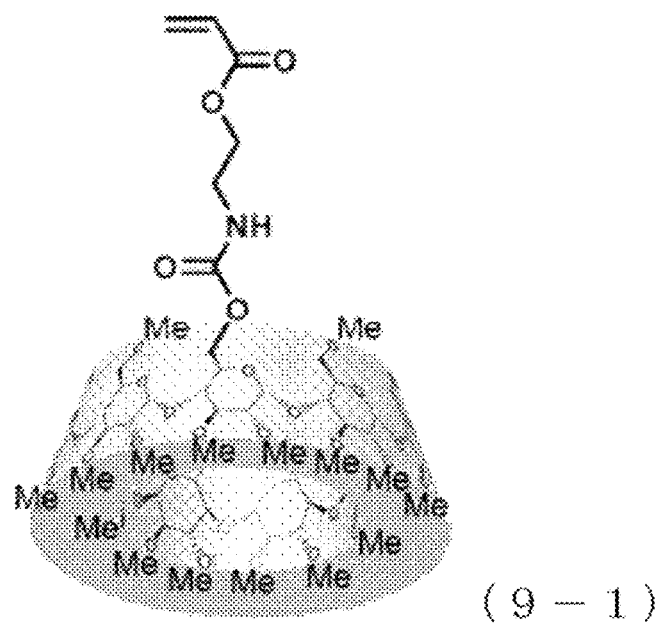
FIG. 26 shows 2-acrylate ethyl carbamate-modified permethylated γCD (TM-γCDAEC) represented by the formula (9-1).

2-acrylate ethyl carbamate-modified permethylated γCD (TM-γCDAEC) represented by the following formula (9-1), as shown in FIG. 26, was synthesized.

First, 0.95 mmol of a compound represented by formula (7-1) described above was weighed and placed in a Schlenk flask, and nitrogen replacement was performed. Subsequently, 30 mL of dehydrated N,N-dimethylformamide was added to the Schlenk flask, and the mixture was stirred with ice cooling. 85.5 mmol of sodium hydride and 85.5 mmol of methyl iodide were further added thereto, and the mixture was stirred for 48 hours. Thereafter, 10 mL of water was added to the Schlenk flask for quenching. The resulting solution was dried under reduced pressure with an evaporator and dissolved in 50 mL of a saturated sodium chloride aqueous solution (containing 200 mg of sodium thiosulfate pentahydrate), followed by extraction with 50 mL of toluene three times. The extracted toluene layer was dried with an evaporator. The obtained solids were dissolved in 50 mL of methanol and washed with 50 mL of hexane, followed by drying the methanol layer with an evaporator. The obtained solids was dissolved in 20 mL of water, and 1.4 mmol of trifluoroacetic acid was added thereto, followed by stirring for 1 hour. The resulting solution was dried under reduced pressure with an evaporator and dissolved in 50 mL of a saturated sodium chloride aqueous solution, followed by extraction with 50 mL of toluene three times. The extracted toluene layer was dried with an evaporator, thereby obtaining 6-monohydroxy-trimethylcyclodextrin (referred to below as "OHγCDOMe").

The obtained OHγCDOMe (500 mg, 0.31 mmol, 1 eq.) was placed in a Schlenk flask, and nitrogen replacement was performed. Subsequently, a solution obtained by adding 2-acrylate ethyl carbamate (77.6 mg, 0.62 mmol, 2 eq.) to dry chloroform (4 mL) was added to the Schlenk flask with a syringe. Thereafter, a solution obtained by adding dibutyltin dilaurate (one drop) to chloroform (2 mL) was added to the Schlenk flask with a syringe, and the mixture was stirred at 60° C. overnight. A solution obtained by adding 2-acrylate ethyl carbamate (155.7 mg, 1.24 mmol, 4 eq.) to dry chloroform (2 mL) was further added thereto with a syringe, and the mixture was stirred at 60° C. for 1 day, thereby obtaining TM-γCDAEC.

Figure 22:
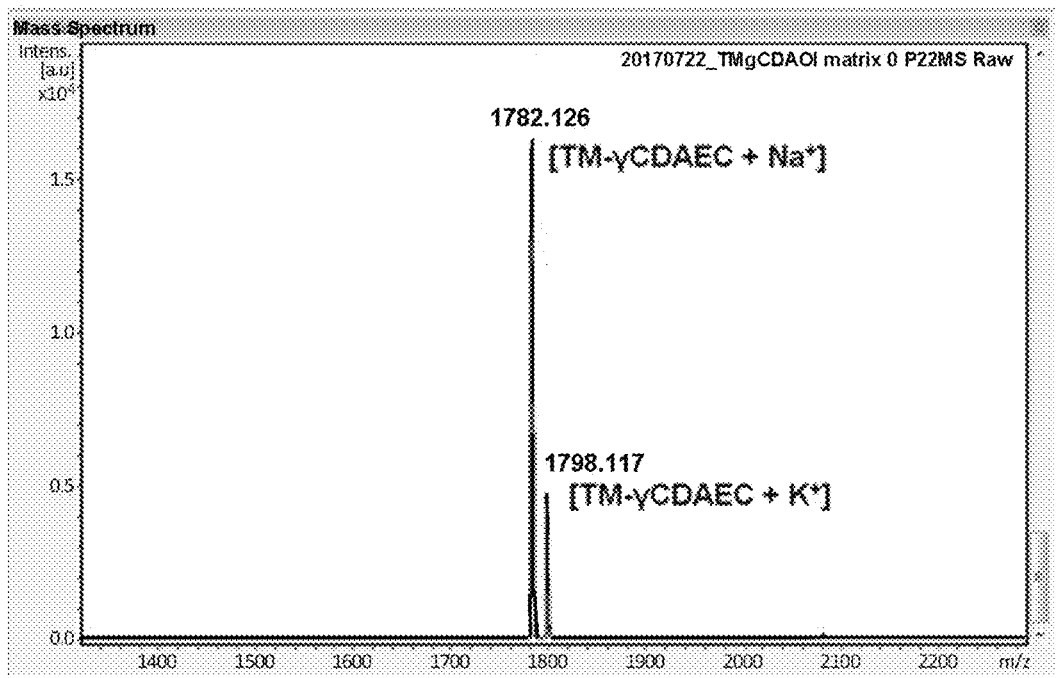
FIG. 22 shows the result of the mass spectrum of the product of Production Example 9.

From the result of the mass spectrum of TM-γCDAEC shown in FIG. 22, formation of the target TM-γCDAEC was confirmed.

Production Example 10

Figure 27:
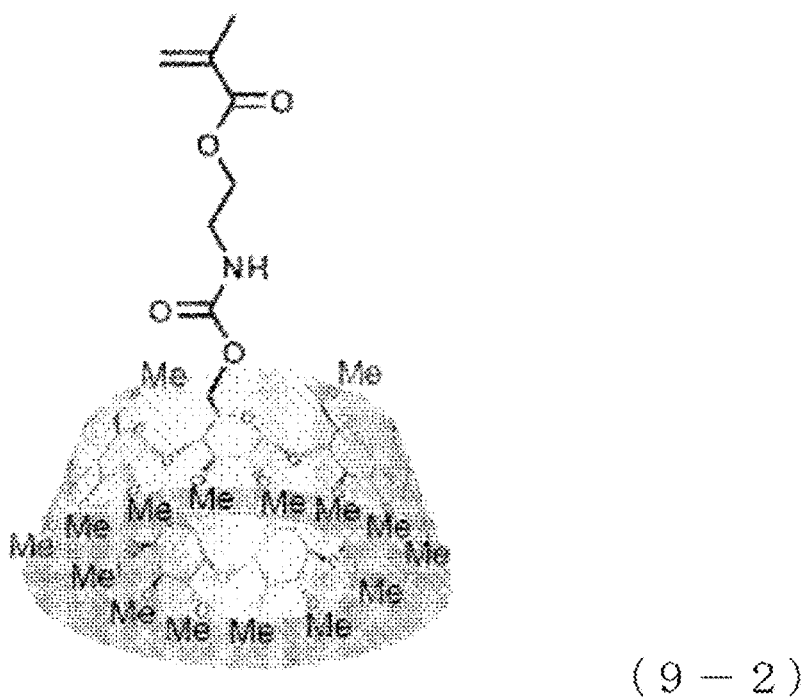
FIG. 27 shows 2-methacrylate ethyl carbamate-modified permethylated γCD (TM-γCDMEC) represented by the formula (9-2).

2-methacrylate ethyl carbamate-modified permethylated γCD (TM-γCDMEC) represented by the following formula (9-2), as shown in FIG. 27, was synthesized.

The solids 1 (500 mg, 0.31 mmol, 1 eq.) obtained in Production Example 9 was placed in a Schlenk flask, and nitrogen replacement was performed. Subsequently, a solution obtained by adding 2-methacrylate ethyl carbamate (288.6 mg, 1.86 mmol, 6 eq.) to dry chloroform (4 mL) was added to the Schlenk flask with a syringe. Thereafter, a solution obtained by adding dibutyltin dilaurate (one drop) to chloroform (2 mL) was added to the Schlenk flask with a syringe, and the mixture was stirred at 60° C. overnight. A solution obtained by adding 2-methacrylate ethyl carbamate (865.8 mg, 5.58 mmol, 18 eq.) to dry chloroform (2 mL) was further added thereto with a syringe, and the mixture was stirred at 60° C. for 1 day, thereby obtaining TM-γCDMEC.

Figure 23:
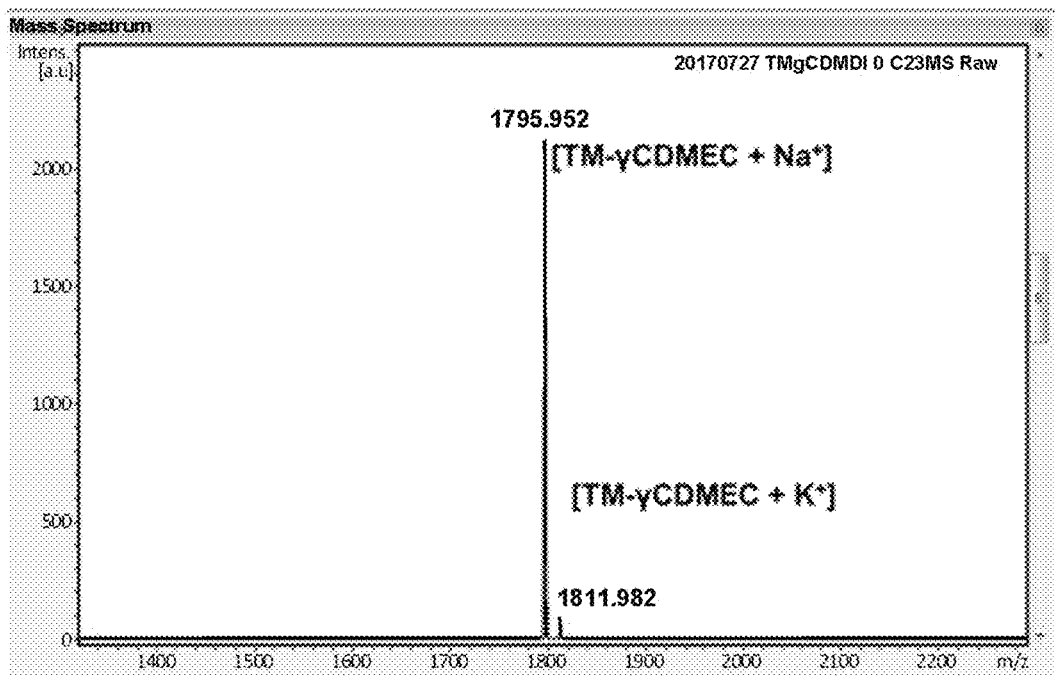
FIG. 23 shows the result of the mass spectrum of the product of Production Example 10.

From the result of the mass spectrum of TM-γCDMEC shown in FIG. 23, formation of the target TM-γCDMEC was confirmed.

Production Example 11

N-Me-TMβCDAAmMe obtained in Production Example 4 was dissolved in 20 mL of water and 10 mL of acetone, and 2.0 mmol of trifluoroacetic acid was added thereto, followed by stirring for 1 hour. The obtained solution was dried under reduced pressure with an evaporator, and dissolved in 50 mL of a saturated sodium chloride aqueous solution, followed by extraction with 50 mL of toluene three times. The extracted toluene layer was dried with an evaporator, thereby obtaining OHβCDOMe.

Figure 19:
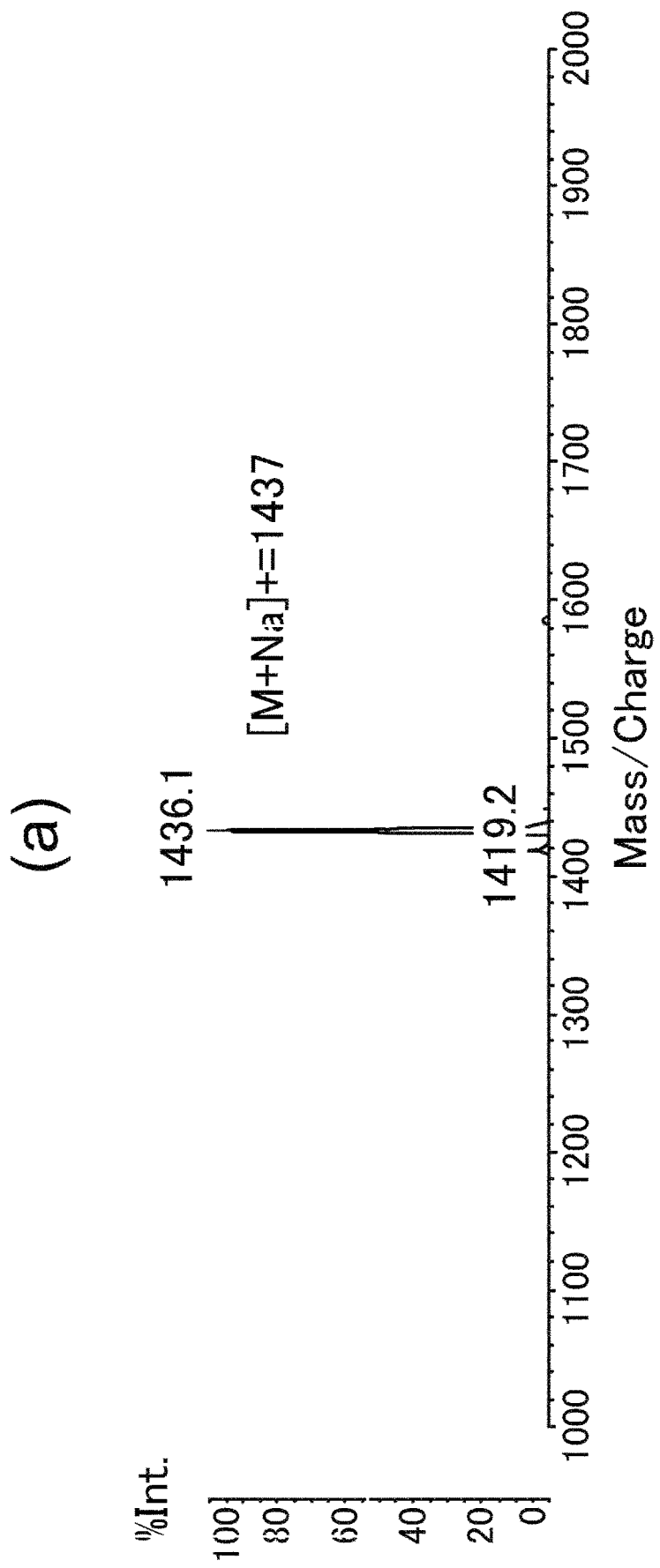
FIG. 19(a) and FIG. 19(b) respectively show the results of the mass spectrum and NMR spectrum of 6-monohydroxy-trimethyl-cyclodextrin obtained in Production Example 11.
Figure 19:
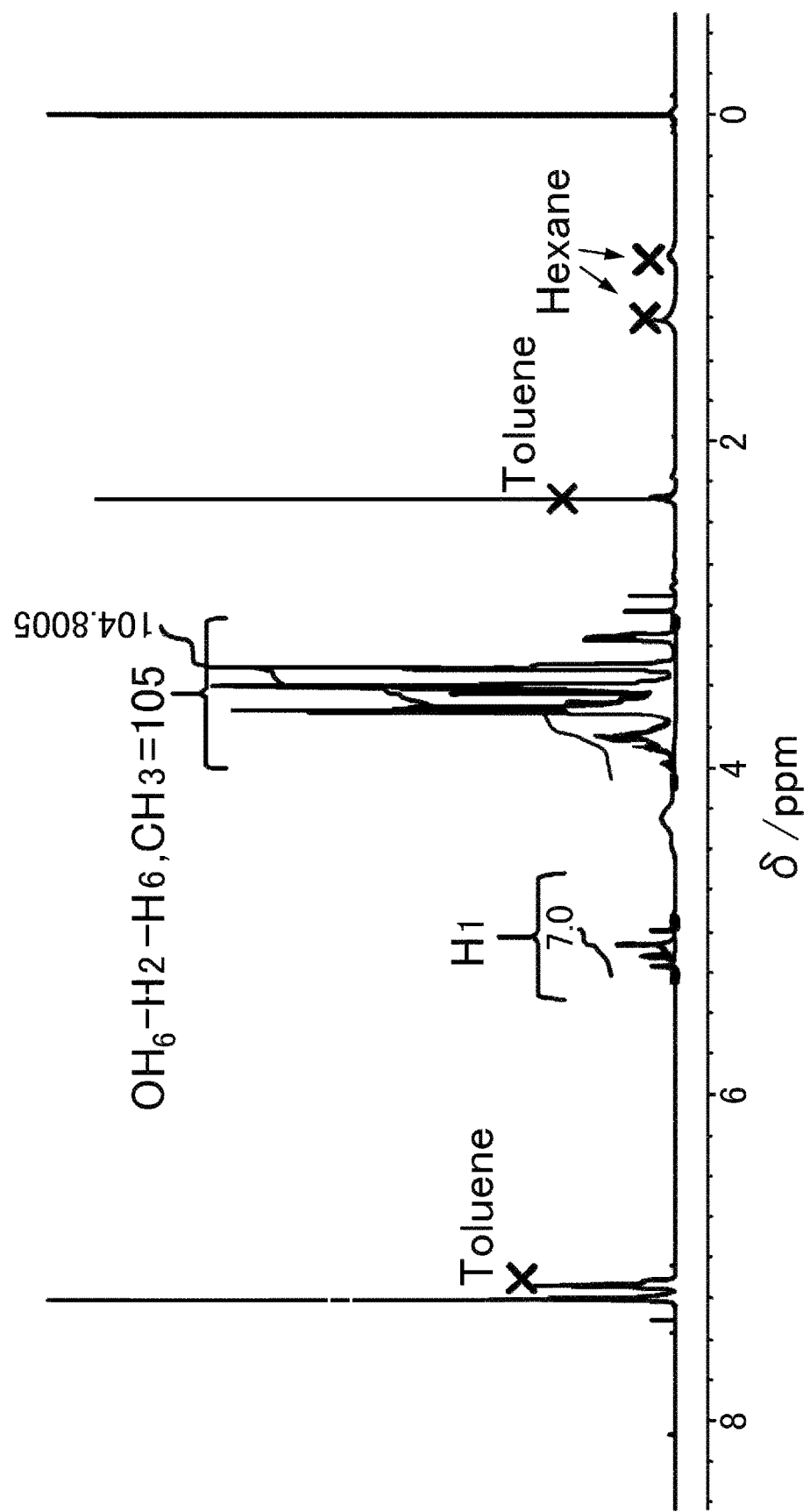

FIG. 19(a) and FIG. 19(b) respectively show the results of the mass spectrum and NMR spectrum of OHβCDOMe.

From these results, formation of the target OHβCDOMe was confirmed. All of the hydroxy groups (100%) present per molecule of the starting material for the host molecules in OHβCDOMe were confirmed to have been replaced with methyl.

Example 1

Figure 10:
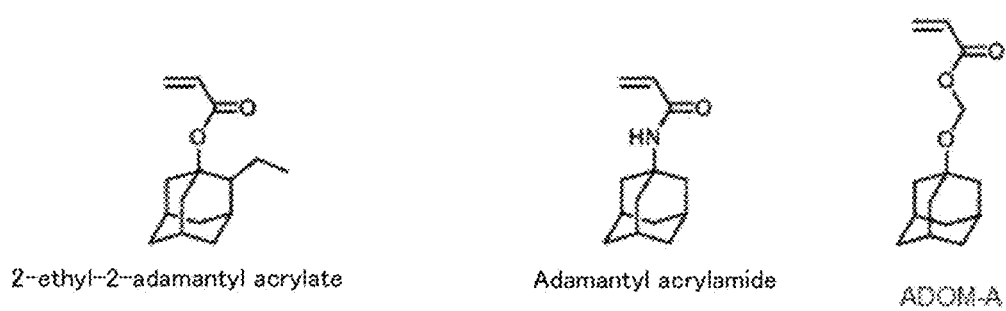
FIG. 10 shows the structures of the guest-group-containing polymerizable monomers (2-ethyl-2-adamantyl acrylate, adamantyl acrylamide, and ADOM-A) used in Examples 1 to 7.
Figure 28:
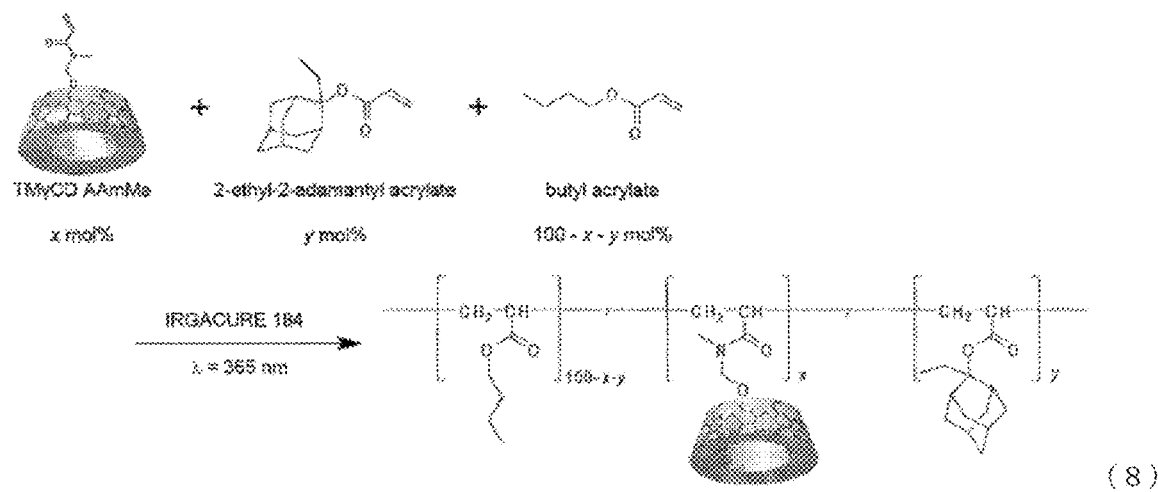
FIG. 28 shows a macromolecular material produced in accordance with the scheme (8).

A macromolecular material was produced in accordance with the following scheme (8), as shown in FIG. 28. In the scheme, "-r-" indicates a "random copolymer," in which the repeating structural units are randomly arranged. The same applies in FIG. 28.

x mol % of N-Me-TMγCDAAmMe (a host-group-containing polymerizable monomer) obtained in Production Example 1, y mol % of 2-ethyl-2-adamantyl acrylate (a guest-group-containing polymerizable monomer; see FIG. 10), and 100-x-y mol % of n-butyl acrylate were mixed, thereby preparing monomer A1. The monomer A1 was subjected to ultrasonic treatment for 1 hour. Subsequently, 1 mol % of IRGACURE 184 was added to the monomer A1 as a polymerization initiator. The monomer A1 was irradiated with ultraviolet rays (λ=365 nm) to perform polymerization A. The polymerization A was performed in such a manner that the monomer A1 was poured onto a butyl rubber sheet that was a test specimen cut out in a dumbbell shape, irradiated with ultraviolet rays from above, and dried in a vacuum oven overnight. Polymer A obtained by this polymerization A is referred to as "BA-γCD-AdEtA (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In Example 1, x=y=0.5.

Example 2

Polymer A was obtained in the same manner as in Example 1, except that N-Me-TMβCDAAm (a host-group-containing polymerizable monomer) obtained in Production Example 2 was used instead of N-Me-TMγCDAAmMe. The polymer A thus obtained is referred to as "BA-βCD-AdEtA (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In Example 2, x=y=0.5.

Example 3

Polymer A was obtained in the same manner as in Example 1, except that ethyl acrylate was used instead of n-butyl acrylate. The polymer A thus obtained is referred to as "EA-γCD-AdEtA (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In Example 3, x=y=1.

Example 4

Polymer A was obtained in the same manner as in Example 1, except that methyl acrylate was used instead of n-butyl acrylate. The polymer A thus obtained is referred to as "MA-γCD-AdEtA (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In Example 4, x=y=1.

Example 5

Polymer A was obtained in the same manner as in Example 1, except that N-Me-TMβCDAAmMe (a host-group-containing polymerizable monomer) obtained in Production Example 4 was used instead of N-Me-TMγCDAAmMe. The polymer A thus obtained is referred to as "BA-βCDAAmMe-AdEtA (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In Example 5, x=y=0.5.

Example 6

Polymer A was obtained in the same manner as in Example 5, except that adamantyl acrylamide (see FIG. 10) was used as a guest-group-containing polymerizable monomer instead of 2-ethyl-2-adamantyl acrylate. The polymer A thus obtained is referred to as "BA-βCDAAmMe-AdAAm (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In Example 6, x=y=0.5.

Example 7

Polymer A was obtained in the same manner as in Example 5, except that ADOM-A (see FIG. 10) was used as a guest-group-containing polymerizable monomer instead of 2-ethyl-2-adamantyl acrylate. The polymer A thus obtained is referred to as "BA-βCDAAmMe-ADOM (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In Example 7, x=y=0.5.

Example 8

Monomer A1 was parepared by mixing 1 mol % of N—H-TAcγCDAAmMe (a host-group-containing polymerizable monomer) obtained in Production Example 6, and 99 mol % of methyl acrylate as a third polymerizable monomer. The monomer A1 was subjected to ultrasonic treatment for 1 hour. Subsequently, 1 mol % of IRGACURE 184 was added to the monomer A as a polymerization initiator. The monomer A1 was irradiated with ultraviolet rays (λ=365 nm) to perform polymerization A1. The polymerization A was performed in such a manner that the monomer A1 was poured onto a butyl rubber sheet that was a test specimen cut out in a dumbbell shape, irradiated with ultraviolet rays from above, and dried in a vacuum oven overnight. Polymer A obtained by this polymerization A is referred to as "MA-TAcγCDAAmMe (1)."

Example 9

Monomer A1 was prepared by mixing 1 mol % of N—H-TAcβCDAAmMe (a host-group-containing polymerizable monomer) obtained in Production Example 7 and 99 mol % of methyl acrylate as a third polymerizable monomer. The monomer A1 was subjected to ultrasonic treatment for 1 hour. Subsequently, 1 mol % of IRGACURE 184 was added to the monomer A as a polymerization initiator. The monomer A was irradiated with ultraviolet rays ($\lambda$=365 nm) to perform polymerization A1. The polymerization A1 was performed in such a manner that the monomer A1 was poured onto a butyl rubber sheet that was a test specimen cut out in a dumbbell shape, irradiated with ultraviolet rays from above, and dried in a vacuum oven overnight. Polymer A obtained by this polymerization A1 is referred to as "MA-TAcβCDAAmMe (1)."

Example 10

Monomer A1 was prepared by mixing x mol % of N—H-TAcγCDAAmMe (a host-group-containing polymerizable monomer) obtained in Production Example 6 and 100-x mol % of ethyl acrylate as a third polymerizable monomer. The monomer A was subjected to ultrasonic treatment for 1 hour. Subsequently, 1 mol % of IRGACURE 184 was added to the monomer A1 as a polymerization initiator. The monomer A1 was irradiated with ultraviolet rays ($\lambda$=365 nm) to perform polymerization A1. The polymerization A1 was performed in such a manner that the monomer A1 was poured onto a butyl rubber sheet that was a test specimen cut out in a dumbbell shape, irradiated with ultraviolet rays from above, and dried in a vacuum oven overnight. Polymer A obtained by this polymerization A1 is referred to as "EA-TAcγCDAAmMe (x)." In Example 10, x=0.5, 1, and 2 (mol %).

Comparative Example 1

A monomer containing 100-x mol % of n-butyl acrylate and x mol % of 1,4-butanediol diacrylate was prepared, and 1 mol % of IRGACURE 184 was added to the monomer. The polymer was irradiated with ultraviolet rays (X=365 nm) to perform polymerization, followed by drying in a vacuum oven overnight, thereby obtaining a polymer blank. The polymer blank thus obtained is referred to as "BA (x)." The alphabetical symbol "x" indicates the amount (mol %) of structural units derived from n-butyl acrylate in the polymer blank. In Comparative Example 1, x=0.5.

Comparative Example 2

A polymer blank was obtained in the same manner as in Comparative Example 1, except that x=0.

Comparative Example 3

A polymer was obtained in the same manner as in Example 1, except that x=100, and y=0. This polymer consists of a polymer of the host-group-containing monomer.

Comparative Example 4

24.4 mg (20 µmol) of acrylamide-β-cyclodextrin (βCDAAm) and 4.8 mg (20 µmol) of adamantane acrylamide (Ad-AAm) were mixed such that acrylamide-β-cyclodextrin and adamantane acrylamide individually achieved a concentration of 2 mol/kG. The mixture was stirred at 80° C. for 30 minutes while being exposed to ultrasound, or stirred at 80° C. with a stir bar. At this time, the reaction mixture transformed into a transparent solution. 198 mg of acrylamide (AAm), ammonium persulfate, which is a polymerization initiator (1 mol % of the total number of moles of all of the polymerizable monomers), and N,N,N',N'-tetramethyl ethylene diamine (1 mol % of the total number of moles of all of the monomers) were added in this order to the mixture, and the mixture was allowed to stand at room temperature for 30 minutes to perform polymerization for gelatinization. Accordingly, a polymer βCDAAm-Ad gel (x,y) was obtained. The alphabetical symbols "x" and "y" respectively indicate mol % of structural units derived from βCDAAm and mol % of structural units derived from Ad-AAm in the polymer. Five kinds of polymers in which x=1 and y=1, x=2 and y=2, x=3 and y=3, x=4 and y=4, and x=5 and y=5 were prepared.

Comparative Example 5

A polymer blank was obtained in the same manner as in Comparative Example 2, except that ethyl acrylate was used instead of n-butyl acrylate.

Comparative Example 6

A polymer blank was obtained in the same manner as in Comparative Example 2, except that methyl acrylate was used instead of n-butyl acrylate.

Tensile Test

Macromolecular materials (thickness: 1 mm) formed from polymers obtained in the Examples and the Comparative Examples were subjected to a tensile-load curve test (Autograph AGX-plus produced by Shimadzu Corporation), and the rupture point of each macromolecular material was observed. With this rupture point taken as the final point, the maximum stress applied until the final point was determined to be the rupture stress of the macromolecular material. This tensile test was performed with the bottom end of the macromolecular material fixed, and the upper end pulled at a tension rate of 0.1 to 1 mm/min (upward operation). The stroke (i.e., the maximum length of the pulled macromolecular gel) was divided by the length of the macromolecular gel before being pulled, and the resulting value was determined to be the degree of stretching (which may be referred to as "strain percentage").

In the tensile-load curve (stress-strain curve) test, when a material exhibits a high value in rupture stress or rupture strain (which may be simply referred to as "strain"), or both, it can be determined that the material is excellent in toughness and strength. In particular, when a material exhibits a high value in both rupture stress and strain, it can be determined that the material is excellent in fracture energy.

Figure 2:
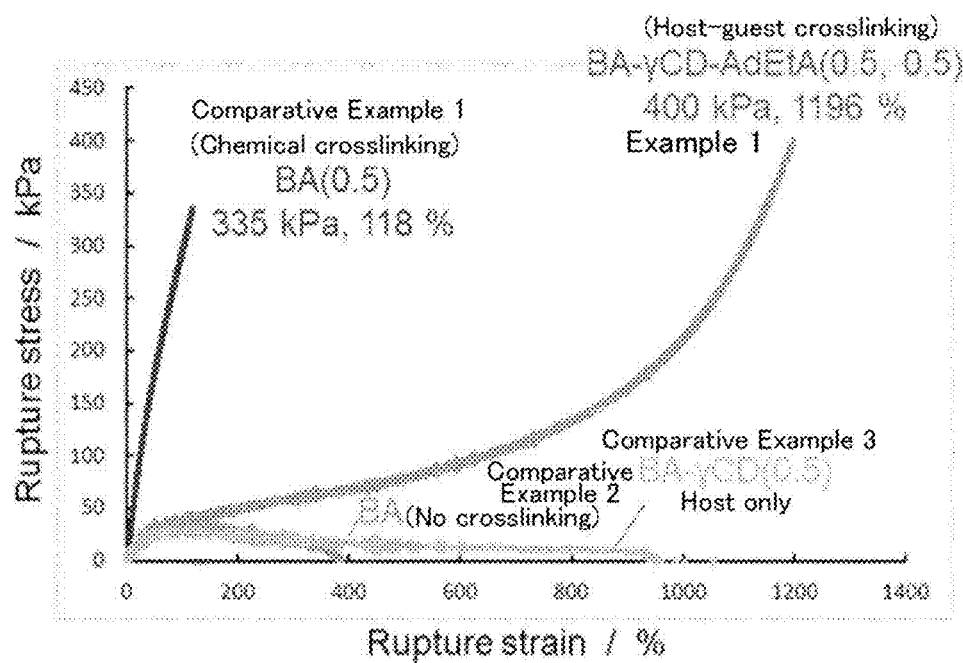
FIG. 2 is a graph showing the results of stress-strain of the macromolecular materials of Example 1 and Comparative Examples 1 to 3.

FIG. 2 shows the stress-strain curves of Example 1 and Comparative Examples 1 to 3.

Figure 3:
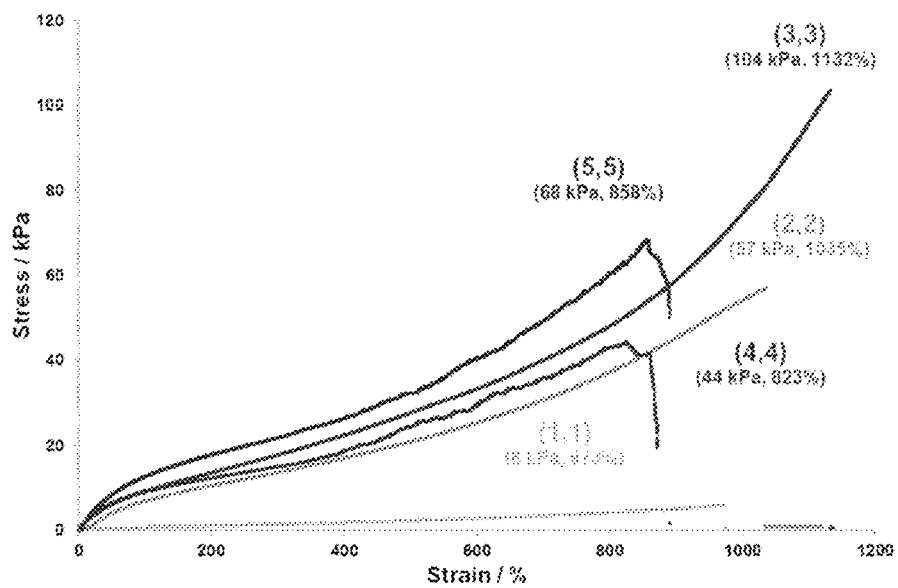
FIG. 3 is a graph showing the results of stress-strain of the macromolecular materials of Comparative Example 4.

FIG. 3 shows the stress-strain curves of the five kinds of polymers of Comparative Example 4.

FIG. 2 shows that the macromolecular material of Example 1 was elongated to about 1200% of its original length, and that the stress at rupture reached 400 kPa in the macromolecular material of Example 1. The macromolecular material of Example 1 has excellent toughness and strength, compared with a chemically crosslinked polymer such as that of Comparative Example 1.

Furthermore, the macromolecular material of Example 1 also has excellent toughness and strength, compared with the polymers of Comparative Example 4 shown in FIG. 3, which contain a host group that is not substituted with a hydrocarbon group (methyl).

Figure 4:
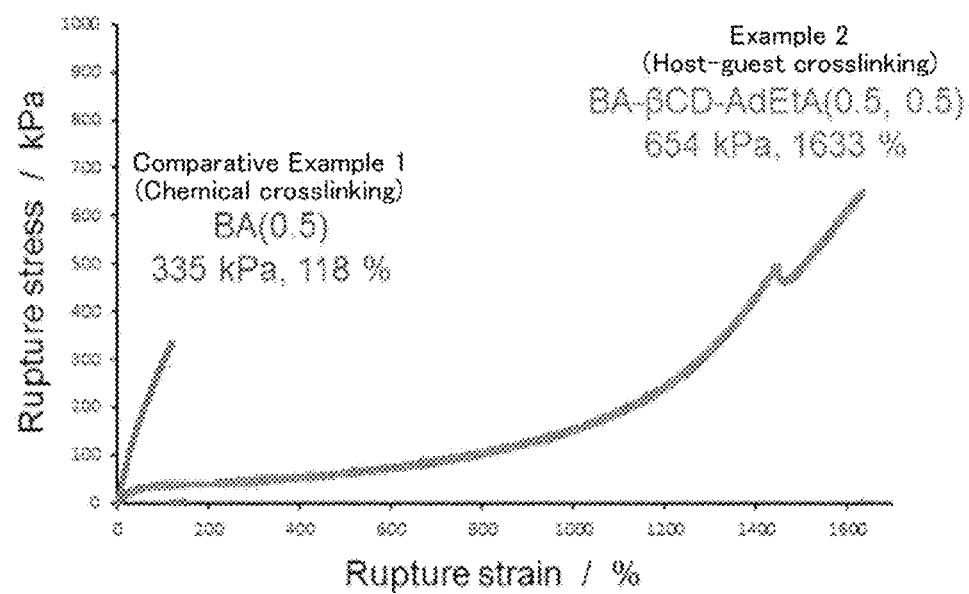
FIG. 4 is a graph showing the results of stress-strain of the macromolecular materials of Example 2 and Comparative Example 1.

FIG. 4 shows the stress-strain curves of Example 2 and Comparative Example 1. The results show that the macromolecular material of Example 2 also has excellent toughness and strength as in that of Example 1.

Figure 5:
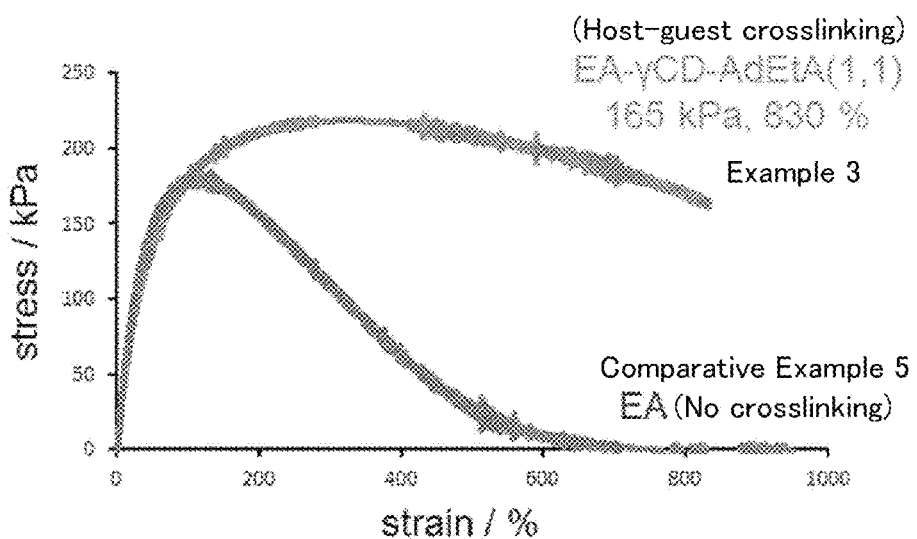
FIG. 5 is a graph showing the results of stress-strain of the macromolecular materials of Example 3 and Comparative Example 5.

FIG. 5 shows the stress-strain curves of Example 3 and Comparative Example 5.

Figure 6:
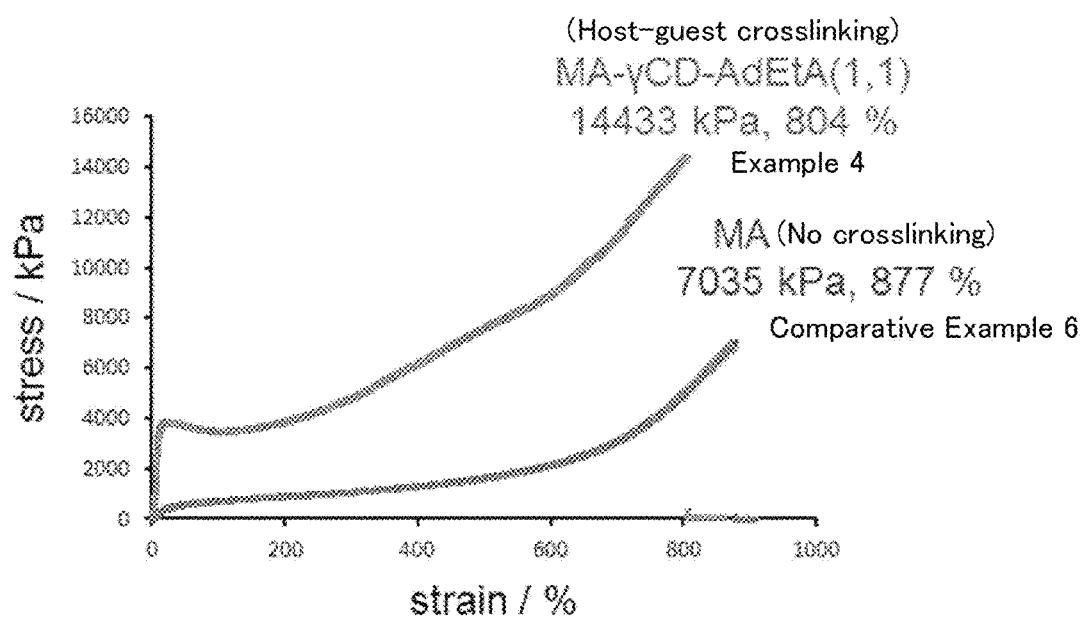
FIG. 6 is a graph showing the results of stress-strain of the macromolecular materials of Example 4 and Comparative Example 6.

FIG. 6 shows the stress-strain curves of Example 4 and Comparative Example 6.

Figure 7:
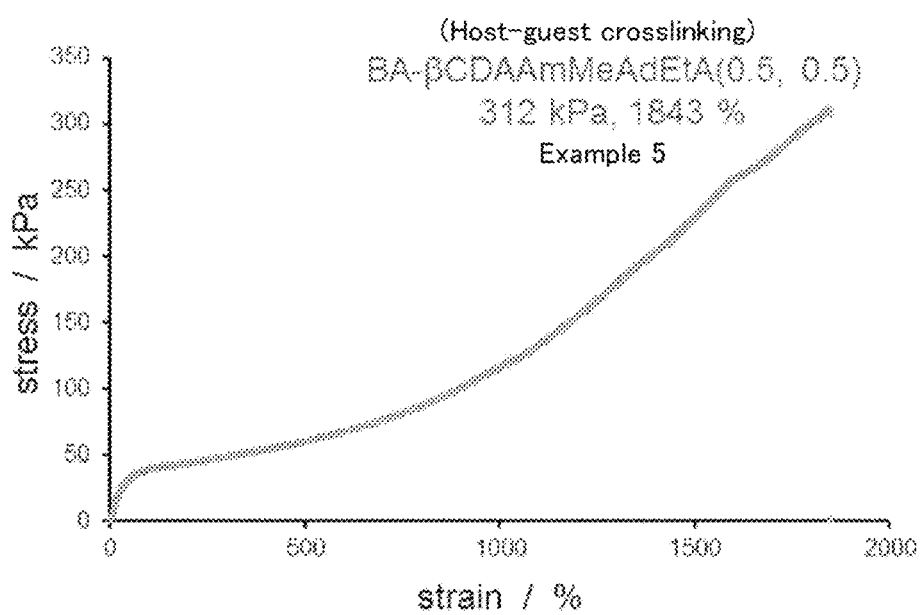
FIG. 7 is a graph showing the result of stress-strain of the macromolecular material of Example 5.

FIG. 7 shows the stress-strain curve of Example 5.

Figure 8:
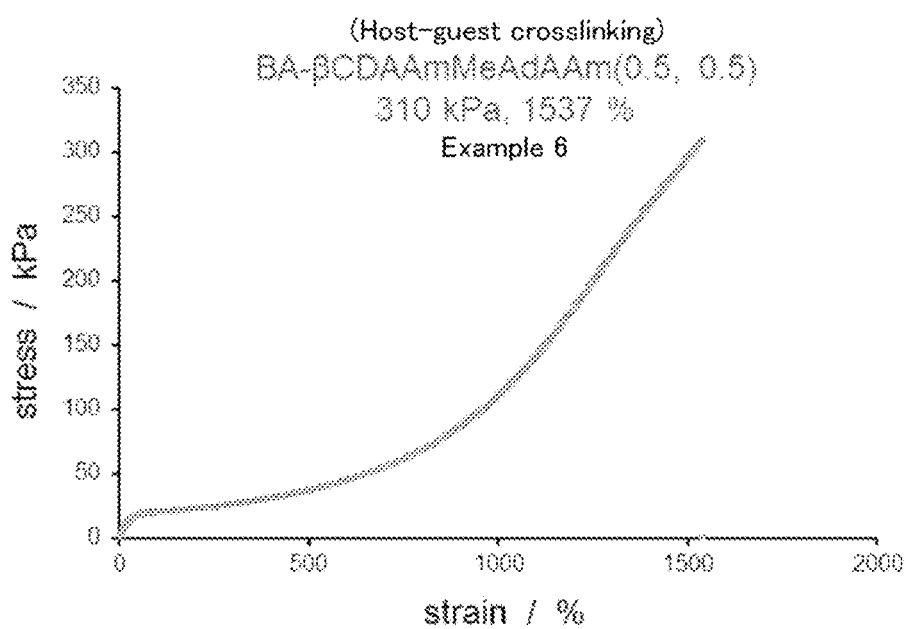
FIG. 8 is a graph showing the result of stress-strain of the macromolecular material of Example 6.

FIG. 8 shows the stress-strain curve of Example 6.

Figure 9:
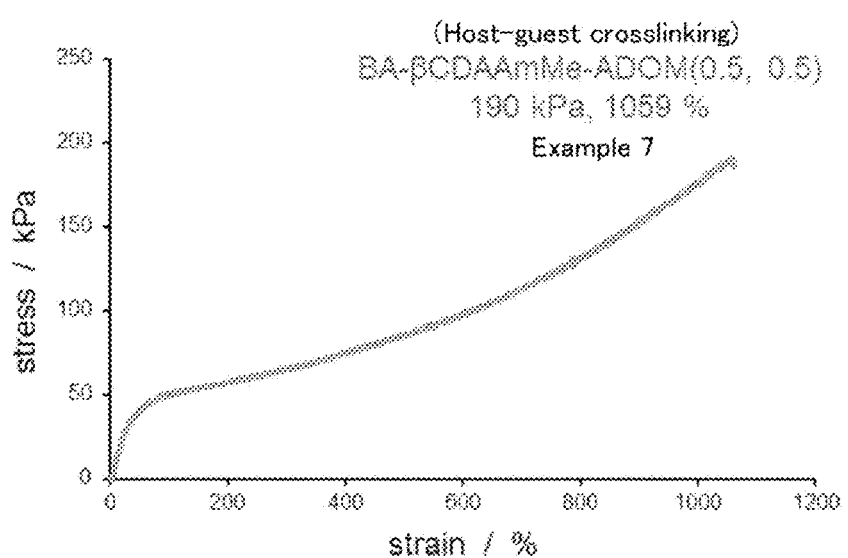
FIG. 9 is a graph showing the result of stress-strain of the macromolecular material of Example 7.

FIG. 9 shows the stress-strain curve of Example 7.

The rupture stress of the macromolecular material obtained in Example 8 (MA-TAcγCDAAmMe (1)) was 9821 kPa, and the rupture stress of the macromolecular material obtained in Example 9 (MA-TAc CDAAmMe (1)) was 11366 kPa. The results show that these macromolecular materials have excellent rupture stress, compared with, for example, the material of Comparative Example 6.

These results demonstrate that the macromolecular materials of Examples 3 to 9 all have excellent toughness and strength.

The macromolecular material obtained in Example 10 was soaked in acetone at 25° C., and a swelling test was performed. The results show that the swelling rate exceeded 2000%. The macromolecular material obtained in Example 10 was swollen in acetone, indicating that the material has a crosslinked structure even though no chemical crosslinking agent was used. Thus, in the macromolecular material obtained in Example 10, it is inferred that a movable crosslinked polymer formed such that the polymer of ethyl acrylate passes through the ring of the host group is formed.

The swelling rate was calculated based on the following equation.

Swelling rate (%)=(weight after swelling/weight before swelling)×100

Example 11

Figure 29:
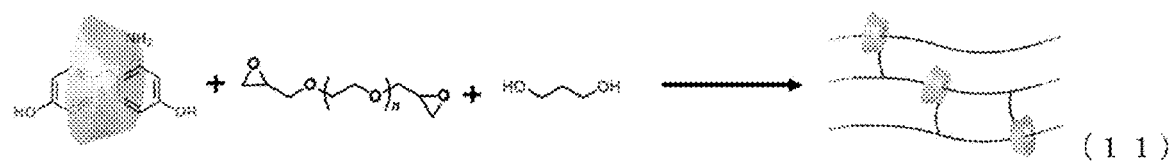
FIG. 29 shows a macromolecular material produced in accordance with the scheme (11).

A macromolecular material was produced in accordance with the following scheme (11) as shown in FIG. 29.

First, host molecules containing amino (a polymerizable functional group) were prepared in accordance with the following scheme (11-1).

(11-1)

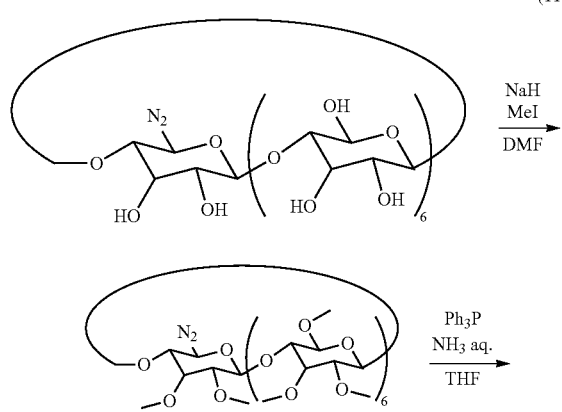

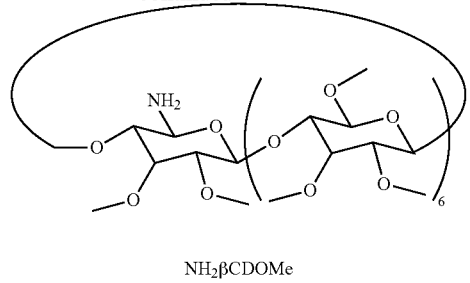

NH$_2$βCDOMe

As a starting material for the host molecules, 6.9 mmol of 6-deoxy-6-monoazido-β-cyclodextrin was added to a round-bottom flask, and 500 mL of dehydrated N,N-dimethylformamide was further added thereto. The mixture was stirred with ice cooling, and 150 mmol of sodium hydride and 150 mmol of methyl iodide were further added thereto, followed by stirring for 12 hours. Thereafter, 20 mL of methanol was added to the round-bottom flask, and the mixture was quenched by addition of 20 mL of water. The resulting solution was dried under reduced pressure with an evaporator, and 100 mL of dichloromethane was added thereto. The mixture was washed with 50 mL of a saturated sodium hydrogencarbonate aqueous solution, 50 mL of an aqueous solution containing 2.5 g of sodium thiosulfate pentahydrate, and 50 mL of saturated saline.

10 g of magnesium sulfate was added to the dichloromethane layer after washing, followed by stirring at room temperature. Thereafter, filtration was performed, and the filtrate was dried with an evaporator. The obtained solids were dissolved in 100 mL of tetrahydrofuran, and 15 mmol of triphenylphosphine and 30 mL of 28% aqueous ammonia were added thereto, followed by stirring at room temperature for 12 hours. Subsequently, the mixture was dried under reduced pressure with an evaporator, and the obtained dried product was dissolved in 100 mL of dichloromethane, followed by washing with 100 mL of water and 100 mL of saturated saline.

10 g of magnesium sulfate was added to the dichloromethane layer after washing, followed by stirring at room temperature. Thereafter, filtration was performed, and the filtrate was dried with an evaporator. The obtained solids were purified by silica column chromatography (eluent composition: dichloromethane:methanol=9:1). This host-group-containing polymerizable monomer is referred to as "NH$_2$βCDOMe."

Figure 16A:
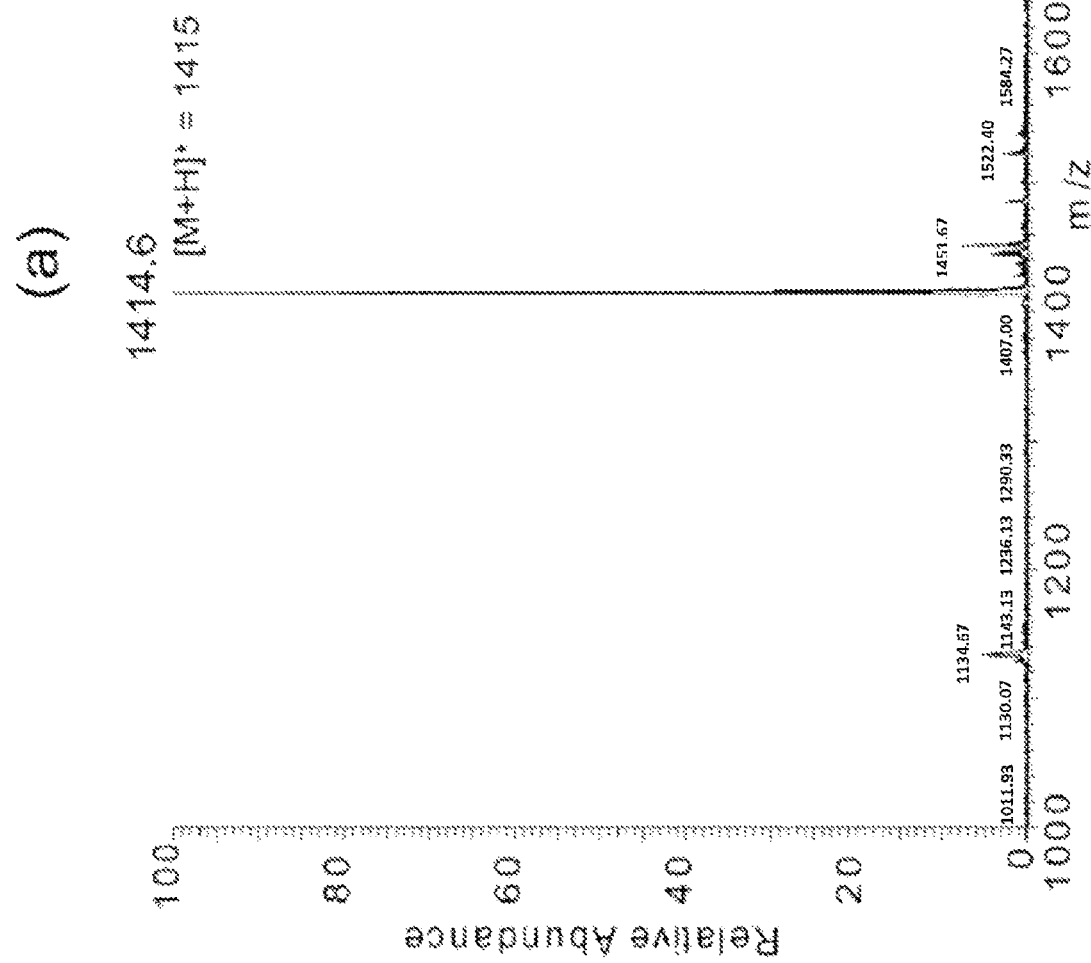
FIG. 16(a) and FIG. 16(b) respectively show the results of the mass spectrum and NMR spectrum of 6-monodeoxytrimethyl-cyclodextrin and 6-monodeoxy-monoamino-trimethyl-cyclodextrin used in Example 11.
Figure 16B:
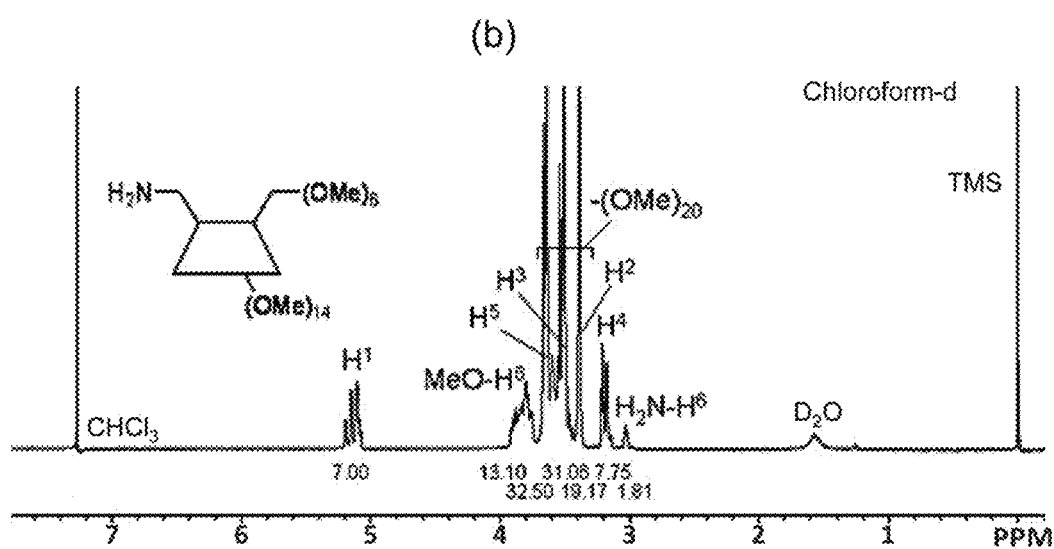

FIG. 16(a) and FIG. 16(b) respectively show the results of the mass spectrum and NMR spectrum of NH$_2$βCDOMe. From these results, formation of the target NH$_2$βCDOMe was confirmed. All of the hydroxy groups (100%) present per molecule of the starting material for the host molecules in NH$_2$βCDOMe were confirmed to have been replaced with methyl.

NH$_2$βCDOMe and 4,4'-dihydroxydiphenylmethane were mixed and dissolved in a 1:1 molar ratio in water at 90° C. The resulting solution was cooled to 25° C. and filtered. The obtained filtrate was freeze-dried, thereby obtaining clathrate compound 2.

Subsequently, the clathrate compound 2, polyethylene glycol diglycidyl ether (Mn=500), and 1,3-propanediol were mixed such that their content was 1 mol %, 98 mol %, and 1 mol %, respectively, thereby obtaining a polymerizable monomer mixture (monomer A2). N,N-dimethylbenzylamine was added as a polymerization initiator to the obtained polymerizable monomer mixture in an amount of 1 wt %, relative to the total amount of the polymerizable monomer mixture. Thereafter, the polymerizable monomer mixture was polymerized at 200° C. for 12 hours, thereby obtaining polymer A2.

Comparative Example 7

A polymer was obtained in the same manner as in Example 11, except that 4,4'-dihydroxydiphenylmethane was used instead of the clathrate compound 2, and that 2-amino-1,3-propanediol was used instead of 1,3-propanediol.

Figure 18:
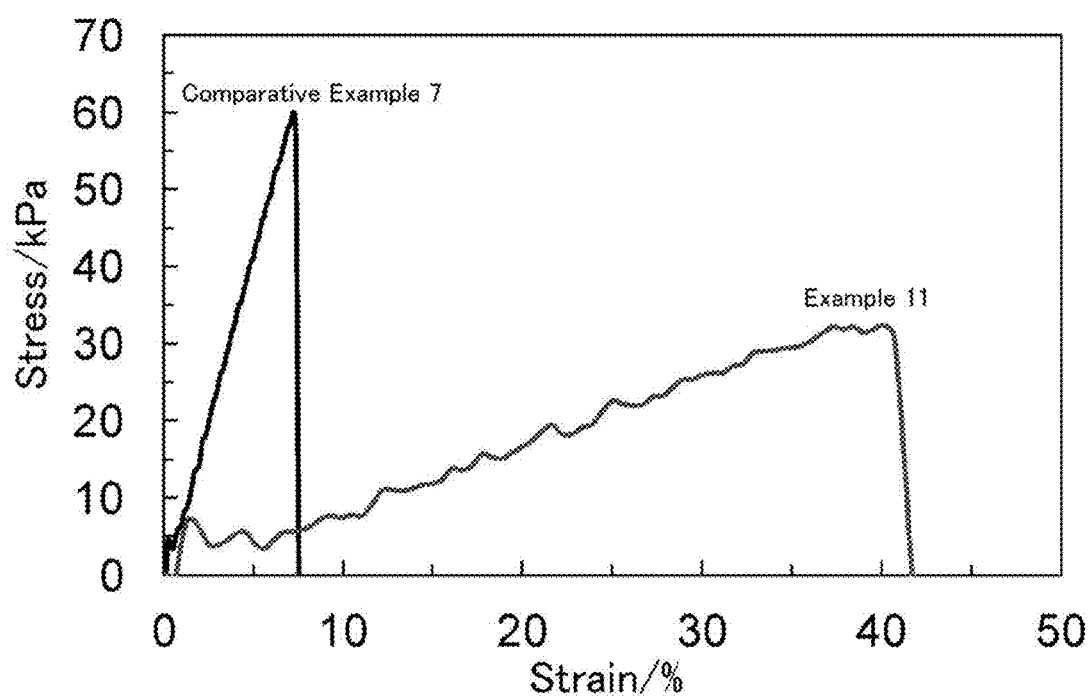
FIG. 18 is a graph showing the results of stress-strain of the macromolecular materials of Example 11 and Comparative Example 7.

FIG. 18 shows the stress-strain curves of the macromolecular materials obtained in Example 11 and Comparative Example 7. The results show that the macromolecular material of Example 11, which was obtained by using the clathrate compound 2, had more excellent toughness and strength than the macromolecular material of Comparative Example 7, which was obtained without using the clathrate compound 2. The fracture energy of the macromolecular material of Example 11 was 6.2 kJ/m$^3$, and the fracture energy of the macromolecular material of Comparative Example 7 was 2.1 kJ/m$^3$. The fracture energy of a macromolecular material as used herein is a value calculated from the area of the stress-strain curve.

Example 12

6-monohydroxy-trimethylcyclodextrin (OHβCDOMe) obtained in Production Example 9-2 was prepared. OHβCDOMe and 4,4'-dihydroxydiphenylmethane were mixed and dissolved in a 1:1 molar ratio in water at 90° C. The resulting solution was cooled to 25° C. and filtered. The obtained filtrate was freeze-dried, thereby obtaining clathrate compound 2 (OHβCDOMe-BPhOH).

Figure 30:
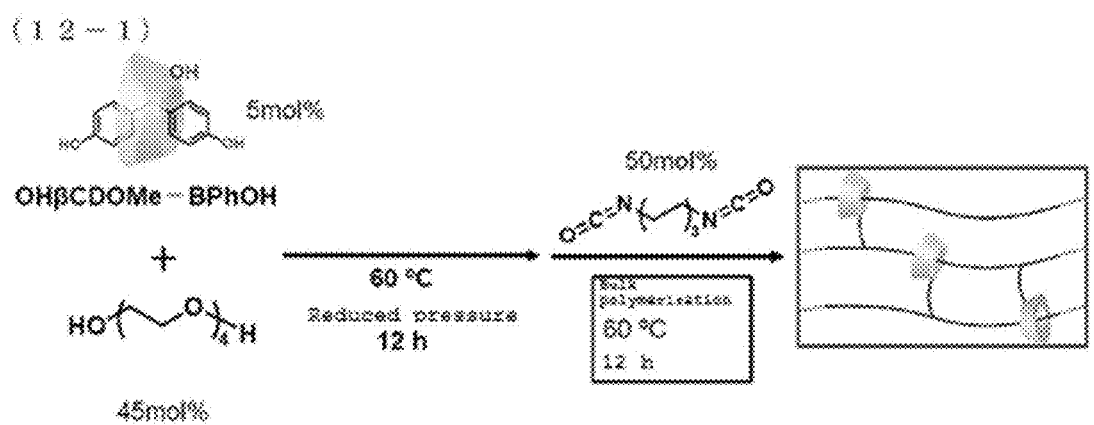
FIG. 30 shows the scheme (12-1) whereby the clathrate compound 2 (OHβCDOMe-BPhOH) (5 mol %) and tetraethylene glycol (45 mol %) were mixed, and the mixture was dried under reduced pressure at 60° C. for 12 hours.

As shown in the following scheme (12-1) shown in FIG. 30, the clathrate compound 2 (OHβCDOMe-BPhOH) (5 mol %) and tetraethylene glycol (45 mol %) were mixed, and the mixture was dried under reduced pressure at 60° C. for 12 hours. Thereafter, hexamethylene diisocyanate (50 mol %) was added thereto, thereby obtaining a polymerizable monomer mixture (monomer A2). The monomer A2 was polymerized at 60° C. under a nitrogen atmosphere for 12 hours, thereby obtaining polymer A2.

Comparative Example 8

Figure 31:
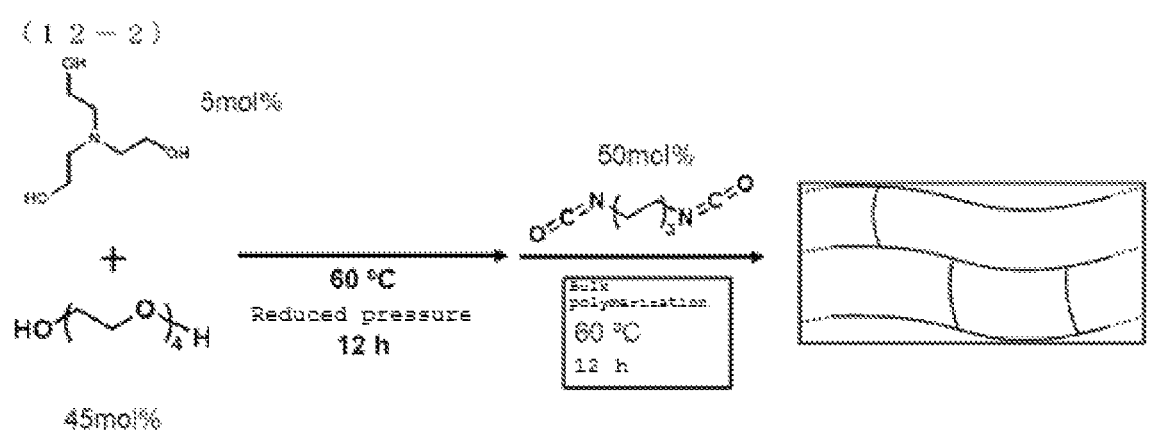
FIG. 31 shows the scheme (12-2) whereby the triethanolamine (5 mol %) and tetraethylene glycol (45 mol %) were mixed, and the mixture was dried under reduced pressure at 60° C. for 12 hours.

As shown in the following scheme (12-2) shown in FIG. 31, a polymer was obtained in the same manner as in Example 12, except that triethanolamine was used instead of the clathrate compound 2 (OHβCDOMe-BPhOH).

Figure 24:
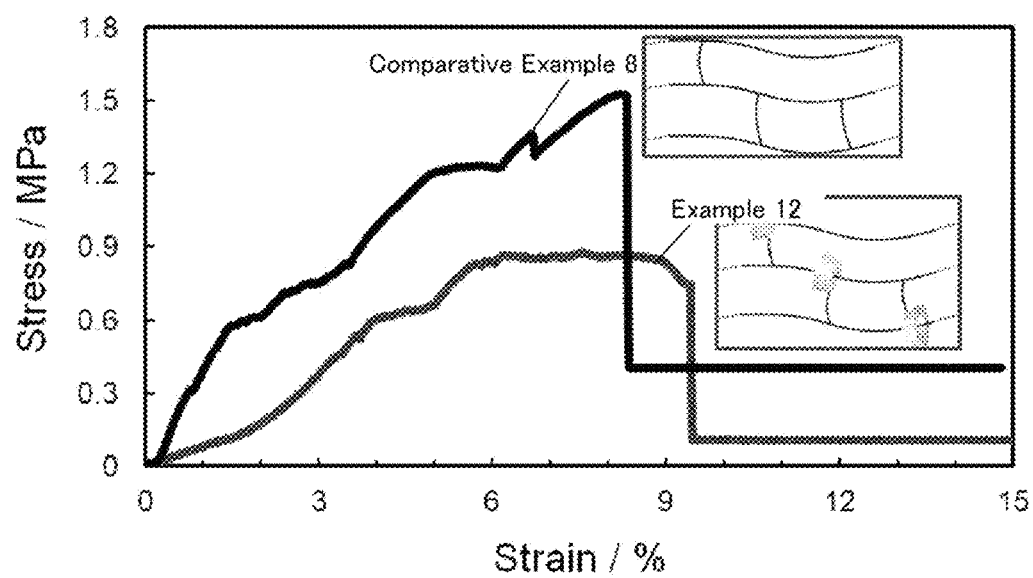
FIG. 24 is a graph showing the results of stress-strain of the macromolecular materials of Example 12 and Comparative Example 8.

FIG. 24 shows the results of the rupture stress of the macromolecular materials of Example 12 and Comparative Example 8. The results of a tensile test of the macromolecular materials obtained in Example 12 and Comparative Example 8 reveal that the strain of the macromolecular material of Example 12 was 9.8%, and the strain of the macromolecular material of Comparative Example 8 was 8.1%. Thus, the macromolecular material of Example 12, which was obtained by using the clathrate compound 2, had more excellent toughness than the macromolecular material of Comparative Example 8, which was obtained without using the clathrate compound 2. This result indicates that in the macromolecular material obtained in Example 12, a movable crosslinked polymer is formed, as schematically shown in scheme (12-1) above.

Example 13

Polymer A was obtained in the same manner as in Example 1, except that N—H-TAcγCDAAmMe obtained in Production Example 6 was used instead of N-Me-TMγCDAAmMe. The polymer A thus obtained is referred to as "BA-TAcγCDAAmMe-AdEtA (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In this Example, x=y=0.5, x=y=1, and x=y=2.

Example 14

Polymer A was obtained in the same manner as in Example 13, except that ethyl acrylate was used instead of n-butyl acrylate. The polymer A thus obtained is referred to as "EA-TAcγCDAAmMe-AdEtA (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In this Example, x=y=0.5, x=y=1, and x=y=2.

Example 15

Polymer A was obtained in the same manner as in Example 15, except that methyl acrylate was used instead of n-butyl acrylate. The polymer A thus obtained is referred to as "MA-TAcγCDAAmMe-AdEtA (x,y)." The alphabetical symbols "x" and "y" are as described above and respectively indicate the amount (mol %) of structural units derived from the host-group-containing polymerizable monomer and the amount (mol %) of structural units derived from the guest-group-containing polymerizable monomer in the polymer A. In this Example, x=y=0.5, x=y=1, and x=y=2.

In EA-TAcγCDAAmMe-AdEtA (0.5, 0.5) obtained in Example 14, the rupture stress was 562 kPa, and the strain was 742%. In EA-TAcγCDAAmMe-AdEtA (1,1) obtained in Example 14, the rupture stress was 796 kPa, and the strain was 596%. In EA-TAcγCDAAmMe-AdEtA (2,2) obtained in Example 14, the rupture stress was 5080 kPa, and the strain was 351%. All of these materials had excellent toughness and strength. The polymers (macromolecular materials) of Examples 13 and 15 are also believed to be excellent in toughness and strength.

Self-Restorability Evaluation

Monomer A1 was prepared by mixing 1 mol % of N—H-TAcγCDAAmMe (a host-group-containing polymerizable monomer) obtained in Production Example 6, 1 mol % of 2-ethyl-2-adamantyl acrylate, and 98 mol % of ethyl acrylate (a third polymerizable monomer). The monomer A1 was subjected to ultrasonic treatment for 1 hour. Subsequently, 1 mol % of IRGACURE 184 was added to the monomer A1 as a polymerization initiator. The monomer A1 was irradiated with ultraviolet rays (λ=365 nm) to perform polymerization A1. The polymerization A1 was performed in such a manner that the monomer A1 was poured onto a butyl rubber sheet that was a test specimen cut out in a dumbbell shape, irradiated with ultraviolet rays from above, and dried in a vacuum oven overnight. Polymer A obtained by this polymerization A1 is referred to as "EA-TAcγCDAAmMe-AdEtA (1,1)."

The test specimen of EA-TAcγCDAAmMe-AdEtA (1,1) was cut at the center into two pieces, and these pieces were kept in contact with each other for 24 hours at room temperature (25° C.) and 80° C.

Figure 20:
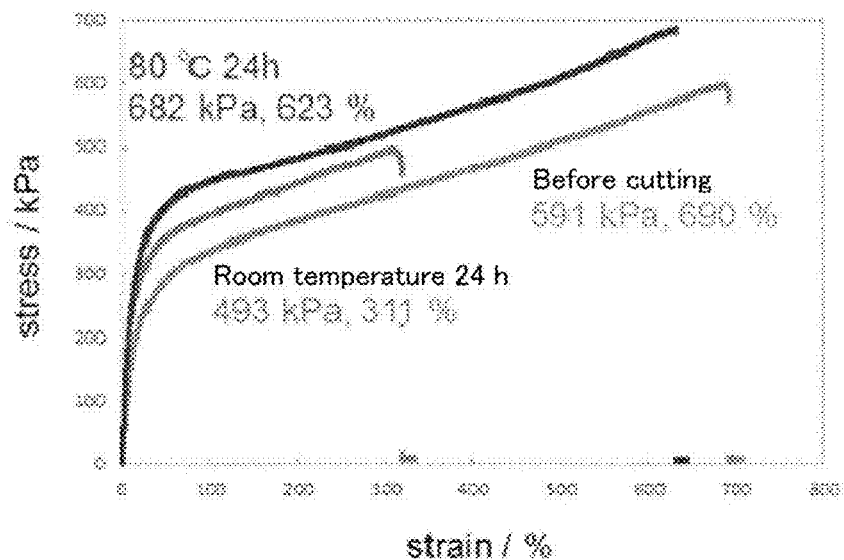
FIG. 20 is a graph showing the results of stress-strain in a test specimen before cutting and after contact in self-restorability evaluation.
Figure 21:
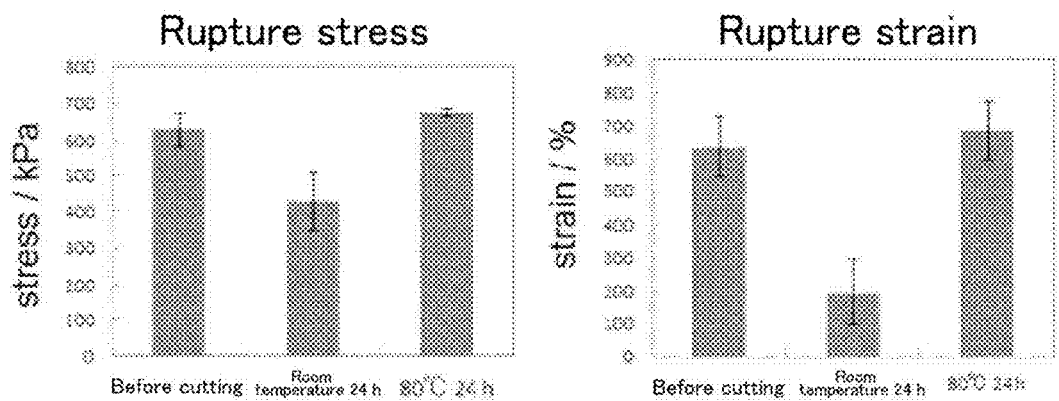
FIG. 21 shows the measurement results of rupture stress and rupture strain in a test specimen before cutting and after contact in self-restorability evaluation.

FIG. 20 shows the stress-strain curves of the test specimen before cutting and the test specimen after contact, and FIG. 21 shows the measurement results of rupture stress and rupture strain. In the case of contact at room temperature, the test specimen exhibited 68% recovery of rupture stress compared to before cutting. In the case of contact at 80° C., the test specimen exhibited 107% recovery of rupture stress compared to before cutting. These results show that EA-TAcγCDAAmMe-AdEtA (1,1) has excellent self-restorability.

The invention claimed is:

1. A host-group-containing polymerizable monomer,
the host group being a monovalent group formed by removing one hydrogen atom or hydroxy group from a cyclodextrin derivative,
the cyclodextrin derivative having such a structure that a hydrogen atom of at least one hydroxy group of a cyclodextrin is replaced with a group selected from the group consisting of a hydrocarbon group, an acyl group, and —CONHR wherein R represents a methyl group or an ethyl group,
the host group being a functional group capable of having a host-guest interaction with a guest group, the host group not clathrating a guest-group-containing polymer,
the cyclodextrin being at least one member selected from the group consisting of α-cyclodextrin, β-cyclodextrin, and γ-cyclodextrin.

2. The host-group-containing polymerizable monomer according to claim 1, wherein the acyl group is an acetyl group.

3. The host-group-containing polymerizable monomer according to claim 1, wherein the hydrocarbon group has 1 to 4 carbon atoms.

4. The host-group-containing polymerizable monomer according to claim 1, which is represented by the following formula (h1):

(h1)

wherein Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group.

5. The host-group-containing polymerizable monomer according to claim 1, which is represented by the following formula (h2):

(h2)

wherein Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group.

6. The host-group-containing polymerizable monomer according to claim 1, which is represented by the following formula (h40):

$$R^{40}\text{-}R^H \quad \text{(h40)}$$

wherein $R^{40}$ represents $NH_2$ or OH, and $R^H$ represents the host group.

7. A macromolecular material comprising a polymer of a polymerizable monomer mixture containing the host-group-containing polymerizable monomer of claim 1.

8. The macromolecular material according to claim 7, wherein the polymerizable monomer mixture contains a polymerizable monomer of a size that can penetrate the host group of the host-group-containing polymerizable monomer.

9. The macromolecular material according to claim 7, further comprising a polymer that has a guest group capable of having a host-guest interaction with the host group.

10. A clathrate compound comprising the host-group-containing polymerizable monomer of claim 1 and a guest-group-containing polymerizable monomer.

11. A clathrate compound comprising the host-group-containing polymerizable monomer of claim 6 and a compound having a functional group capable of undergoing a condensation reaction.

12. A macromolecular material comprising a polymer of a polymerizable monomer containing the clathrate compound of claim 10.

13. A method for producing a macromolecular material, the method comprising performing polymerization of a polymerizable monomer mixture containing the host-group-containing polymerizable monomer of claim 1 to obtain a polymer.

14. The method for producing a macromolecular material according to claim 13, wherein the polymerization is performed in the absence of a solvent.

15. A method for producing the clathrate compound of claim 10, the method comprising mixing the host-group-containing polymerizable monomer and the guest-group-containing polymerizable monomer to obtain the clathrate compound.

16. The host-group-containing polymerizable monomer according to claim 2, wherein the hydrocarbon group has 1 to 4 carbon atoms.

17. The host-group-containing polymerizable monomer according to claim 2, which is represented by the following formula (h1):

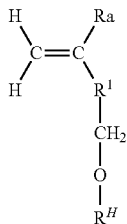 (h1)

wherein Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group.

18. The host-group-containing polymerizable monomer according to claim 2, which is represented by the following formula (h2):

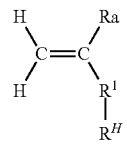 (h2)

wherein Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group.

19. The host-group-containing polymerizable monomer according to claim 2, which is represented by the following formula (h40):

$$R^{40}\text{-}R^H \quad (h40)$$

wherein $R^{40}$ represents $NH_2$ or OH, and $R^H$ represents the host group.

20. A macromolecular material comprising a polymer of a polymerizable monomer mixture containing the host-group-containing polymerizable monomer of claim 2.

* * * * *